United States Patent
Nakayama et al.

(10) Patent No.: US 12,384,864 B2
(45) Date of Patent: Aug. 12, 2025

(54) CURABLE COMPOSITION, CURED SUBSTANCE, OPTICAL MEMBER, AND LENS

(71) Applicant: FUJIFILM Corporation, Tokyo (JP)

(72) Inventors: Takafumi Nakayama, Kanagawa (JP); Naoyuki Morooka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 565 days.

(21) Appl. No.: 17/839,652

(22) Filed: Jun. 14, 2022

(65) Prior Publication Data

US 2022/0315686 A1    Oct. 6, 2022

Related U.S. Application Data

(63) Continuation of application No. PCT/JP2020/047279, filed on Dec. 17, 2020.

(30) Foreign Application Priority Data

Dec. 24, 2019  (JP) ................... 2019-232629

(51) Int. Cl.
| | | |
|---|---|---|
| C08F 222/22 | (2006.01) | |
| C08F 2/50 | (2006.01) | |
| G02B 1/04 | (2006.01) | |

(52) U.S. Cl.
CPC ............. C08F 222/22 (2013.01); C08F 2/50 (2013.01); G02B 1/041 (2013.01)

(58) Field of Classification Search
None
See application file for complete search history.

(56) References Cited

U.S. PATENT DOCUMENTS

| | | | | |
|---|---|---|---|---|
| 11,370,744 B2* | 6/2022 | Nakayama | ............... | C08F 22/22 |
| 11,518,916 B2* | 12/2022 | Nakayama | ......... | C08F 222/1025 |
| 11,873,426 B2* | 1/2024 | Nakayama | ............ | C08F 222/24 |
| 12,173,101 B2* | 12/2024 | Nakayama | ............ | C08F 210/14 |
| 2009/0186163 A1 | 7/2009 | Umebayashi et al. | | |
| 2018/0305486 A1 | 10/2018 | Nakayama et al. | | |
| 2021/0108012 A1 | 4/2021 | Nakayama et al. | | |

FOREIGN PATENT DOCUMENTS

| | | | |
|---|---|---|---|
| JP | 2009-173712 A | 8/2009 | |
| JP | 2015-193676 A | 11/2015 | |
| WO | 2017/115649 A1 | 7/2017 | |
| WO | 2018/168233 A1 | 9/2018 | |
| WO | WO-2020009053 A1 * | 1/2020 | ........... C07D 241/38 |

OTHER PUBLICATIONS

International Search Report dated Mar. 2, 2021 in Application No. PCT/JP2020/047279.
Written Opinion of the International Searching Authority dated Mar. 2, 2021 in Application No. PCT/JP2020/047279.
International Preliminary Report on Patentability dated Jun. 28, 2022 with a Translation of the Written Opinion of the International Searching Authority in Application No. PCT/JP2020/047279.

* cited by examiner

*Primary Examiner* — Sanza L. McClendon
(74) *Attorney, Agent, or Firm* — Sughrue Mion, PLLC

(57) ABSTRACT

Provided is a curable composition containing a polymerizable compound represented by General Formula (A), an acylphosphine oxide photopolymerization initiator, and an amine compound.

$$Ar-(-L-Sp-Pol)_n \quad \text{General Formula (A)}$$

Ar represents an n-valent group containing a nitrogen-containing fused aromatic ring satisfying all items (i) to (iii), as a partial structure.
(i) The nitrogen-containing fused aromatic ring has a fused ring structure in which two or more 6-membered rings are fused.
(ii) The nitrogen-containing fused aromatic ring has at least one nitrogen atom as a ring-constituting atom.
(iii) All ring-constituting atoms have p-orbitals, and all the p-orbitals contribute to aromaticity.
L and Sp each independently represent a single bond or a divalent linking group, Pol represents a hydrogen atom or a polymerizable group, and n represents 1 or 2. The polymerizable compound represented by General Formula (A) contains at least one polymerizable group.

8 Claims, No Drawings

CURABLE COMPOSITION, CURED SUBSTANCE, OPTICAL MEMBER, AND LENS

CROSS-REFERENCE TO RELATED APPLICATIONS

This application is a Continuation of PCT International Application No. PCT/JP2020/047279 filed on Dec. 17, 2020, which claims priority under 35 U.S.C. § 119 (a) to Japanese Patent Application No. 2019-232629 filed in Japan on Dec. 24, 2019. Each of the above applications is hereby expressly incorporated by reference, in its entirety, into the present application.

BACKGROUND OF THE INVENTION

1. Field of the Invention

The present invention relates to a curable composition, a cured substance, an optical member, and a lens.

2. Description of the Related Art

In the related art, glass materials have been used for optical members of imaging modules such as cameras, video cameras, mobile phones with a camera, video phones, or intercoms with a camera. The glass materials have been preferably used from the viewpoints of various optical characteristics and excellent environmental resistance, but the glass materials have a disadvantage in that weight and the size are difficult to reduce and the workability and productivity are poor. On the contrary, resin cured substances can be mass-produced and have excellent workability and thus have been used for various optical members in recent years.

In recent years, with miniaturization of imaging modules, optical members used in imaging modules are required to be miniaturized. However, a problem of chromatic aberration occurs in a case of miniaturization of optical members. Accordingly, in optical members formed of resin cured substances, it has been examined to correct the chromatic aberration by adjusting an Abbe number using a monomer or an additive of a curable composition.

For example, WO2017/115649A discloses a curable composition capable of molding a cured substance which has a low Abbe number (vd) and high partial dispersion ratios (θg and F-Number) as dispersion characteristics of the refractive index by using a monomer having a heteroatom (such as an oxygen atom, a sulfur atom, or a nitrogen atom)-containing skeleton similar to a diphenylfluorene skeleton.

SUMMARY OF THE INVENTION

Since optical members of imaging modules are used in a light irradiation environment such as outdoors, light resistance is required.

As a result of examination conducted by the present inventors, a cured substance obtained from the curable composition that contains a monomer having a nitrogen-containing fused aromatic ring with a specific structure and cured using an acylphosphine oxide photopolymerization initiator is initially colored little and sufficiently satisfies the transmittance required for an optical member of an imaging module. However, it was found that the curable composition is required to improve from the viewpoint of suppressing coloring (that is, a decrease in transmittance) of the cured substance (hereinafter, also referred to as "light resistance") in a case where the cured substance is used and stored in a light irradiation environment such as outdoors for a long period of time.

An object of the present invention is to provide a curable composition that contains a monomer having a nitrogen-containing fused aromatic ring and an acylphosphine oxide photopolymerization initiator, from which a cured substance having excellent light resistance can be obtained. Further, another object of the present invention is to provide a cured substance obtained from the curable composition, and an optical member and a lens containing the cured substance.

That is, the above-described objects of the present invention have been achieved by the following means.

<1> A curable composition comprising: a component A which is a polymerizable compound represented by General Formula (A); a component B which is an acylphosphine oxide photopolymerization initiator; and a component C which is an amine compound, $$\text{Ar}\text{-}(\text{L-Sp-Pol})_n \quad \text{Genera Formula (A)}$$

in the formula, Ar represents an n-valent group containing a nitrogen-containing fused aromatic ring satisfying all items (i) to (iii), as a partial structure, (i) the nitrogen-containing fused aromatic ring has a fused ring structure in which two or more 6-membered rings are fused, (ii) the nitrogen-containing fused aromatic ring has at least one nitrogen atom as a ring-constituting atom, and (iii) all ring-constituting atoms have p-orbitals, and all the p-orbitals contribute to aromaticity, L represents a single bond, —O—, —S—, —C(=O)—, —OC(O)—, —C(=O)O—, —OC(=O)O—, —NR$^{101}$C(=O)—, —C(=O)NR$^{102}$—, —OC(=O)NR$^{103}$—, —NR$^{104}$C(=O)O—, —SC(=O)—, or —C(=O)S—, R$^{101}$, R$^{102}$, R$^{103}$, and R$^{104}$ each independently represent -Sp$^a$-Pol$^3$ or a halogen atom, Sp and Sp$^a$ each independently represent a single bond or a divalent linking group, and Pol and Pol$^3$ each independently represent a hydrogen atom or a polymerizable group, n represents 1 or 2, and in a case where n represents 2, a plurality of L's may be the same as or different from each other, a plurality of Sp's may be the same as or different from each other, and a plurality of Pol's may be the same as or different from each other, where the polymerizable compound represented by General Formula (A) contains at least one polymerizable group.

<2> The curable composition according to <1>, in which the number of nitrogen atoms in the item (ii) is 2 or 3.

<3> The curable composition according to <1> or <2>, in which Ar represents a group represented by any of General Formulae (A1) and (A2-1) to (A2-5), Formula (A1)

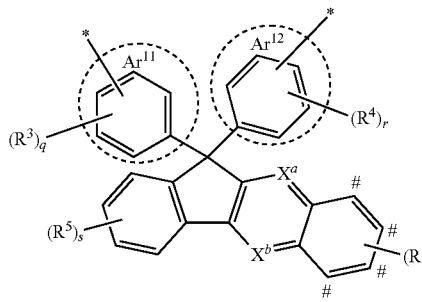

in the formula, $Ar^{11}$ and $Ar^{12}$ each independently represent an aromatic hydrocarbon group having a benzene ring surrounded by a broken line or an aromatic heterocyclic group having a benzene ring surrounded by a broken line as one ring constituting a fused ring, $X^a$ and $X^b$ represent a nitrogen atom or CH, and CH at a position of # may be substituted with a nitrogen atom, where two or three of CH's at positions of $X^a$, $X^b$, and # are nitrogen atoms, $R^3$ to $R^6$ each independently represent a substituent, and q, r, s, and t each independently represent an integer of 0 to 4, and \* represents a bonding position with respect to Pol-Sp-L-.

Formula (A2-1)

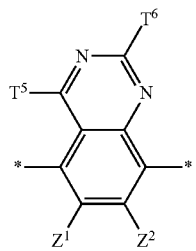

Formula (A2-2)

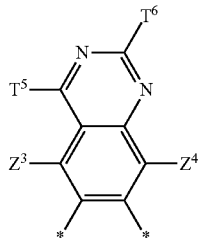

Formula (A2-3)

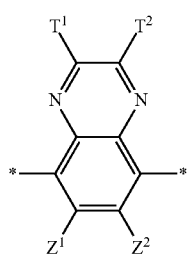

Formula (A2-4)

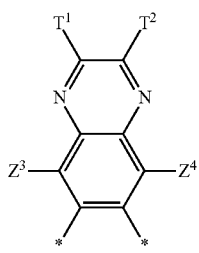

Formula (A2-5)

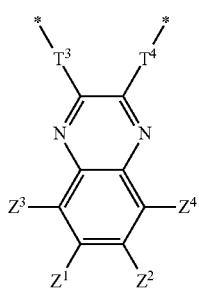

in the formulae, $Z^1$, $Z^2$, $Z^3$, and $Z^4$ each independently represent a hydrogen atom, an aliphatic hydrocarbon group having 1 to 20 carbon atoms which may have a substituent, an alkoxy group having 1 to 20 carbon atoms which may have a substituent, an alkoxycarbonyl group having 1 to 20 carbon atoms which may have a substituent, an alicyclic hydrocarbon group having 3 to 20 carbon atoms which may have a substituent, an aromatic hydrocarbon group having 6 to 20 carbon atoms which may have a substituent, a halogen atom, a cyano group, a nitro group, —$NR^{12}R^{13}$, —$SR^{12}$, or an aromatic heterocyclic group having 5 to 20 ring-constituting atoms which may have a substituent, $Z^1$ and $Z^2$ may be bonded to each other to form an aromatic hydrocarbon ring which may have a substituent or an aromatic heterocyclic ring which may have a substituent, $R^{12}$ and $R^{13}$ each independently represent a hydrogen atom or an alkyl group having 1 to 6 carbon atoms which may have a substituent, $T^1$, $T^2$, $T^5$, and $T^6$ each independently represent a halogen atom, a cyano group, a nitro group, -$L^6$-$Sp^b$-$Pol^6$ an alicyclic hydrocarbon group having 3 to 20 carbon atoms which may have a substituent, an aromatic hydrocarbon group having 6 to 20 carbon atoms which may have a substituent, an aromatic heterocyclic group having 5 to 20 ring-constituting atoms which may have a substituent, —$NR^{12}R^{13}$, or —$SR^{12}$, $T^1$ and $T^2$ may be bonded to each other to form an aromatic hydrocarbon ring which may have a substituent or an aromatic heterocyclic ring which may have a substituent, $L^6$ has the same definition as that for L, $Sp^b$ represents a single bond, a linear alkylene group having 1 to 30 carbon atoms which may have a substituent, or a linear alkylene group having 2 to 30 carbon atoms which may have a substituent and in which one or two or more non-adjacent —$CH_2$-'s are each independently substituted with a group selected from —O—, —S—, —C(=O)—, —OC(=O)—, —C(=O)O—, —OC(=O)O—, —$NR^{201}$C(=O)—, —C(=O)$NR^{202}$—, —OC(=O)$NR^{203}$—, —$NR^{204}$C(=O)O—, —SC(=O)—, and —C(=O)S—, $R^{201}$, $R^{202}$, $R^{203}$, and $R^{204}$ each independently represent -$Sp^c$-$Pol^4$ or a halogen atom, $Sp^c$ represents a single bond, a linear alkylene group having 1 to 30 carbon atoms which may have a substituent, or a linear alkylene group having 2 to 30 carbon atoms which may have a substituent and in which one or two or more non-adjacent —$CH_2$-'s are each independently substituted with a group selected from —O—, —S—, —C(=O)—, —OC(=O)—, —C(=O)O—, —OC(=O)O—, —NHC(=O)—, —C(=O)NH—, —OC(=O)NH—, —NHC(=O)O—, —SC(=O)—, and —C(=O)S—, $Pol^4$ and $Pol^6$ each independently have the same definition as that for Pol, $T^3$ and $T^4$ each independently represent a divalent aromatic hydrocarbon group having 6 to 12 carbon atoms which may have a substituent or a divalent aromatic heterocyclic group which may have a substituent, and

* represents a bonding position with respect to Pol-Sp-L-.

<4> The curable composition according to <3>, in which Ar represents a group represented by General Formula (A1), both $X^a$ and $X^b$ represent a nitrogen atom, and no CH's at positions of # are substituted with a nitrogen atom.

<5> The curable composition according to any one of <1> to <4>, further comprising: a component D which is a compound represented by General Formula (D),

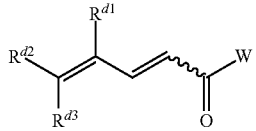

General Formula (D)

in the formula, $R^{d1}$, $R^{d2}$, and $R^{d3}$ each independently represent a hydrogen atom or a substituent, and W represents a hydrogen atom or a substituent, and $R^{d1}$ and $R^{d2}$ or $R^{d2}$ and $R^{d3}$ may be bonded to each other to form a ring which may have a substituent.

<6> A cured substance of the curable composition according to any one of <1> to <5>.

<7> An optical member comprising: the cured substance according to <6>.

<8> A lens comprising: the cured substance according to <6>.

In the present invention, in a case where a plurality of substituents or linking groups (hereinafter, referred to as the substituents or the like) represented by a specific symbol or formula are present or in a case where a plurality of substituents or the like are defined at the same time, the respective substituents or the like may be the same as or different from each other unless otherwise specified. The same also applies to the definition of the number of substituents or the like. Further, in a case where a plurality of substituents or the like are close to each other (particularly in a case where the substituents or the like are adjacent to each other), the substituents or the like may be linked to each other to form a ring unless otherwise specified. Further, rings such as an alicyclic ring, an aromatic ring, and a heterocyclic ring may be fused to form a fused ring unless otherwise specified.

In the present invention, in a case where a molecule has an E-type double bond and a Z-type double bond, the molecule may be either an E isomer or a Z isomer or may be a mixture thereof.

In the present invention, a part of a structure may be changed within a range where the effects of the present invention are not impaired. Furthermore, a compound in which substitution or unsubstitution is not specified may have any substituent within a range where the effects of the present invention are not impaired. The same also applies to substituents and linking groups.

In the present invention, a numerical range shown using "to" denotes a range including numerical values described before and after "to" as a lower limit and an upper limit.

In the present invention, each component may be used alone or in a mixture of two or more kinds thereof.

In the description of the content of each component in the curable composition of the present invention, the solid content in the curable composition of the present invention denotes components remaining in the cured substance obtained from the curable composition of the present invention, in addition to the component A to the component C. In general, the remainder obtained by removing solvents is "solid content".

In the present specification, "(meth)acrylate" denotes any one or both acrylate and methacrylate, and "(meth)acryloyl" denotes any one or both acryloyl and methacryloyl. A monomer in the present invention is a compound distinguished from an oligomer and a polymer and having a weight-average molecular weight of 1000 or less.

In the present invention, an aliphatic hydrocarbon group denotes a group obtained by removing one optional hydrogen atom from a linear or branched alkane, a linear or branched alkene, or a linear or branched alkyne. In the present specification, the aliphatic hydrocarbon group is preferably an alkyl group obtained by removing one optional hydrogen atom from a linear or branched alkane. Examples of the alkyl group include a methyl group, an ethyl group, a propyl group, an isopropyl group, a butyl group, an isobutyl group, a sec-butyl group, a tert-butyl group, a pentyl group, a 1-methylbutyl group, a 3-methylbutyl group, a hexyl group, a 1-methylpentyl group, a 4-methylpentyl group, a heptyl group, a 1-methylhexyl group, a 5-methylhexyl group, a 2-ethylhexyl group, an octyl group, a 1-methylheptyl group, a nonyl group, a 1-methyloctyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group.

Further, in the present invention, an alkyl group having 1 to 12 carbon atoms is preferable, and a methyl group or an ethyl group is particularly preferable as the (unsubstituted) aliphatic hydrocarbon group.

In the present specification, the term alkyl group denotes a linear or branched alkyl group. Examples of the alkyl group include those exemplified above. The same applies to an alkyl group in a group containing the alkyl group (such as an alkoxy group or an alkoxycarbonyl group).

Further, examples of the linear alkylene group in the present invention include a group obtained by removing one hydrogen atom bonded to carbon at a terminal from the linear alkyl group among the above-described alkyl groups.

In the present invention, an alicyclic hydrocarbon ring denotes a saturated hydrocarbon ring (cycloalkane). Examples of the alicyclic hydrocarbon ring include cyclopropane, cyclobutane, cyclopentane, cyclohexane, cycloheptane, cyclooctane, cyclononane, and cyclodecane.

In the present invention, an unsaturated hydrocarbon ring denotes a hydrocarbon ring having a carbon-carbon unsaturated double bond, which is not an aromatic ring. Examples of the unsaturated hydrocarbon ring include indene, indane, and fluorene.

In the present invention, the term alicyclic hydrocarbon group denotes a cycloalkyl group obtained by removing one optional hydrogen atom from a cycloalkane. Examples of the alicyclic hydrocarbon group include a cyclopropyl group, a cyclobutyl group, a cyclopentyl group, a cyclohexyl group, a cycloheptyl group, a cyclooctyl group, a cyclononyl group, and a cyclodecyl group. Among these, a cycloalkyl group having 3 to 12 carbon atoms is preferable.

In the present invention, a cycloalkylene group denotes a divalent group obtained by removing two optional hydrogen atoms from a cycloalkane. Examples of the cycloalkylene group include a cyclohexylene group.

In the present invention, the term aromatic ring denotes any one or both an aromatic hydrocarbon ring and an aromatic heterocyclic ring.

In the present invention, an aromatic hydrocarbon ring denotes an aromatic ring forming a ring only with carbon atoms. The aromatic hydrocarbon ring may be a monocycle or a fused ring. An aromatic hydrocarbon ring having 6 to 14 carbon atoms is preferable as the aromatic hydrocarbon ring. Examples of the aromatic hydrocarbon ring include a benzene ring, a naphthylene ring, an anthracene ring, and a phenanthrene ring. In the present specification, in a case where the aromatic hydrocarbon ring is bonded to another ring, the aromatic hydrocarbon ring may be substituted on another ring as a monovalent or divalent aromatic hydrocarbon group.

In the present invention, in a case where a monovalent group is referred to as an aromatic hydrocarbon group, the monovalent group denotes a monovalent group obtained by removing one optional hydrogen atom from an aromatic hydrocarbon ring. As the monovalent aromatic hydrocarbon group, an aromatic hydrocarbon group having 6 to 14 carbon atoms is preferable, and examples thereof include a phenyl group, a biphenyl group, a 1-naphthyl group, a 2-naphthyl group, a 1-anthracenyl group, a 2-anthracenyl group, a 3-anthracenyl group, a 4-anthracenyl group, a 9-anthracenyl group, a 1-phenanthryl group, a 2-phenanthryl group, a 3-phenanthryl group, a 4-phenanthryl group, and a 9-phenanthryl group. Among the examples, a phenyl group is preferable.

In the present invention, in a case where a divalent group is referred to as an aromatic hydrocarbon group, the divalent group denotes a divalent group obtained by removing one optional hydrogen atom from the above-described monovalent aromatic hydrocarbon group. Examples of the divalent aromatic hydrocarbon group include a phenylene group, a biphenylene group, a naphthylene group, and a phenanthrylene group. Among these, a phenylene group is preferable, and a 1,4-phenylene group is more preferable.

In the present specification, an aromatic heterocyclic ring denotes an aromatic ring whose ring is formed by carbon atoms and heteroatoms. Examples of the heteroatoms include an oxygen atom, a nitrogen atom, and a sulfur atom. The aromatic heterocyclic ring may be a monocycle or a fused ring, and the number of atoms constituting the ring is preferably in a range of 5 to 20 and more preferably in a range of 5 to 14. The number of heteroatoms in the atoms constituting the ring is not particularly limited, but is preferably in a range of 1 to 3 and more preferably 1 or 2. Examples of the aromatic heterocyclic ring include a furan ring, a thiophene ring, a pyrrole ring, an imidazole ring, an isothiazole ring, an isoxazole ring, a pyridine ring, a pyrazine ring, a quinoline ring, a benzofuran ring, a benzothiazole ring, a benzoxazole ring, and those exemplified as the nitrogen-containing fused aromatic ring described below. In the present specification, in a case where the aromatic heterocyclic ring is bonded to another ring, the aromatic heterocyclic ring may be substituted on another ring as a monovalent or divalent aromatic heterocyclic group.

In the present invention, in a case where a monovalent group is referred to as an aromatic heterocyclic group, the monovalent group denotes a monovalent group obtained by removing one optional hydrogen atom from an aromatic heterocyclic ring. Examples of the monovalent aromatic heterocyclic group include a furyl group, a thienyl group, a pyrrolyl group, an imidazolyl group, an isothiazolyl group, an isooxazolyl group, a pyridyl group, a pyrazinyl group, a quinolyl group, a benzofuranyl group (preferably, a 2-benzofuranyl group), a benzothiazolyl group (preferably, a 2-benzothiazolyl group), and a benzoxazolyl group (preferably, a 2-benzoxazolyl group). Among these, a furyl group, a thienyl group, a benzofuranyl group, a benzothiazolyl group, and a benzoxazolyl group are preferable, and a 2-furyl group and a 2-thienyl group are more preferable.

In the present invention, the divalent aromatic heterocyclic group denotes a divalent group obtained by removing two optional hydrogen atoms from an aromatic heterocyclic ring, and examples thereof include a divalent group obtained by removing one optional hydrogen atom from the (monovalent) aromatic heterocyclic group described above.

In the present invention, examples of the halogen atoms include a fluorine atom, a chlorine atom, a bromine atom, and an iodine atom.

The cured substance of the curable composition of the present invention, which is obtained by the curing reaction, has excellent light resistance. The cured substance of the present invention has excellent light resistance. Therefore, even in a case where the optical member and lens of the present invention which contain the cured substance as a constituent member are used in a light irradiation environment such as outdoors for a long period of time, coloring can be suppressed.

DESCRIPTION OF THE PREFERRED EMBODIMENTS

Hereinafter, the present invention will be described in detail. The constituent requirements described below will be described based on representative embodiments and specific examples, but the present invention is not limited to such embodiments.

<Curable Composition>

A curable composition according to the embodiment of the present invention contains a component A which is a polymerizable compound represented by General Formula (A), a component B which is an acylphosphine oxide photopolymerization initiator, and a component C which is an amine compound.

The curable composition according to the embodiment of the present invention may further contain other components in addition to the component A, the component B, and the component C. Specific examples of the other components include additives such as a compound represented by General Formula (D), a (meth)acrylate monomer (monomer other than the component A and the compound represented by General Formula (D)), a thermal radical polymerization initiator, a photoradical polymerization initiator (photoradical polymerization initiator other than the component B), a polymer or a monomer other than the components described above, a dispersant, a plasticizer, a thermal stabilizer, and a release agent.

The polymerizable compound represented by General Formula (A) which is the component A contained in the curable composition according to the embodiment of the present invention contains a nitrogen-containing fused aromatic ring satisfying all the following items (i) to (iii), as a partial structure. It is considered that since the polymer (cured substance) of the component A has a maximum absorption wavelength in an ultraviolet region at a wavelength of approximately 300 to 400 nm, excellent optical characteristics such as a low Abbe number (vd) and high partial dispersion ratios (θg and F-Number) as dispersion characteristics of the refractive index are exhibited. However, the polymer of the component A is likely to be colored due to the nitrogen-containing fused aromatic ring as a partial structure.

As a result of research conducted by the present inventors, it was found that in a case where the curable composition according to the embodiment of the present invention is polymerized and cured using an acylphosphine oxide photopolymerization initiator which is the component B as a photopolymerization initiator, occurrence of coloring in the process of curing the curable composition can be suppressed. However, as a result of further research conducted by the present inventors, it was also found that in a case where the cured substance is stored and used in a light irradiation environment such as outdoors for a long period of time, the cured substance is colored with time and the transmittance of the cured substance is decreased. The present inventors have tried to apply various additives and the like to solve the problem of a decrease in transmittance with time. As a result, it was found that the light resistance is greatly improved by using the component C which is an amine compound in combination. The reason for this is not clear, but is assumed as follows.

Since the nitrogen-containing fused aromatic ring contained in the polymer of the component A as a partial structure exhibits weak basicity, hydrogen ions are added to nitrogen atoms on the nitrogen-containing fused aromatic ring due to an action of an acid generated by photodecomposition of the acylphosphine oxide photopolymerization initiator (generation of a phosphorous acid-based decomposition product), and the addition is considered to be a factor of the decrease in transmittance of the cured substance. It is presumed that the decrease in transmittance can be suppressed by allowing an amine compound to coexist here.

[Component A: Polymerizable Compound Represented by General Formula (A)]

The curable composition according to the embodiment of the present invention contains a polymerizable compound represented by General Formula (A) as the component A.

The polymerizable compound represented by General Formula (A) contains a specific nitrogen-containing fused aromatic ring and a polymerizable group in the structure. The polymerizable compound represented by General Formula (A) is capable of decreasing the Abbe number (vd) of the cured substance formed of the curable composition containing the polymerizable compound and increasing the partial dispersion ratios (θg, F). Since the compound having a nitrogen-containing fused aromatic ring satisfying all the following items (i) to (iii) has absorption in a near-ultraviolet region, the compound exhibits abnormal dispersibility of the refractive index, and thus the chromatic aberration correction function can be enhanced in a case of using the cured substance as a compound lens.

$$Ar(-L-Sp-Pol)_n \quad \text{General Formula (A)}$$

In the formula, Ar represents an n-valent group containing a nitrogen-containing fused aromatic ring satisfying all items (i) to (iii), as a partial structure.

(i) The nitrogen-containing fused aromatic ring has a fused ring structure in which two or more 6-membered rings are fused, (ii) The nitrogen-containing fused aromatic ring has at least one nitrogen atom as a ring-constituting atom.

(iii) All ring-constituting atoms have p-orbitals, and all the p-orbitals contribute to aromaticity.

L represents a single bond, —O—, —S—, —C(=O)—, —OC(=O)—, —C(=O)O—, —OC(=O)O—, —NR$^{101}$C(=O)—, —C(=O)NR$^{102}$—, —OC(=O)NR$^{103}$—, —NR$^{104}$C(=O)O—, —SC(=O)—, or —C(=O)S—.

R$^{101}$, R$^{102}$, R$^{103}$, and R$^{104}$ each independently represent -Sp$^a$-Pol$^3$ or a halogen atom.

Sp and Sp$^a$ each independently represent a single bond or a divalent linking group, and Pol and Pol$^3$ each independently represent a hydrogen atom or a polymerizable group.

n represents 1 or 2.

In a case where n represents 2, a plurality of L's may be the same as or different from each other, a plurality of Sp's may be the same as or different from each other, and a plurality of Pol's may be the same as or different from each other.

Here, the polymerizable compound represented by General Formula (A) contains at least one polymerizable group.

Hereinafter, Ar, L, Sp, and Sp$^a$, and each substituent of Pol and Pol$^3$ will be described.

(1) Ar

In General Formula (A), Ar represents an n-valent group having a nitrogen-containing fused aromatic ring satisfying all the following items (i) to (iii), as a partial structure.

(i) The nitrogen-containing fused aromatic ring has a fused ring structure in which two or more 6-membered rings are fused.

(ii) The nitrogen-containing fused aromatic ring has at least one nitrogen atom (N) as a ring-constituting atom.

(iii) All ring-constituting atoms have p-orbitals, and all the p-orbitals contribute to aromaticity.

That is, the nitrogen-containing fused aromatic ring satisfying the above-described items (i) to (iii) (hereinafter, also simply referred to as "nitrogen-containing fused aromatic ring") is an aromatic heterocyclic ring formed by two or more 6-membered rings being fused, which is an aromatic ring having a nitrogen atom as an atom constituting the aromatic heterocyclic ring.

As the definition of the item (i) described above, the nitrogen-containing fused aromatic ring has preferably a fused ring structure in which two to five 6-membered rings are fused and more preferably a fused ring structure in which two 6-membered rings are fused.

As the definition of the item (ii) described above, from the viewpoint of further improving the light resistance, the nitrogen-containing fused aromatic ring has preferably two or more nitrogen atoms, more preferably two or three nitrogen atoms, and still more preferably two nitrogen atoms as ring-constituting atoms.

The nitrogen-containing fused aromatic ring may have heteroatoms other than the nitrogen atom (N), such as an oxygen atom (O) or a sulfur atom (S), but it is preferable that the nitrogen-containing fused aromatic ring does not have such heteroatoms.

As the definition of the item (iii) described above, all rings (monocycles) constituting the nitrogen-containing fused aromatic ring exhibit aromaticity.

For example, in the group represented by General Formula (A1), the nitrogen-containing fused aromatic ring has a fused ring structure in which two 6-membered rings positioned on a lower right side in the structural formula are fused. That is, a benzene ring that may have $R^5$ and a 5-membered ring positioned on a right side of the benzene ring are not included in the nitrogen-containing fused aromatic ring. This is because one of the carbon atoms constituting the 5-membered ring positioned on the right side of the benzene ring, which may have $R^5$, has a p-orbital that does not contribute to aromaticity and thus the definition of the item (iii) is not satisfied.

Further, a group represented by any of General Formulae (A2-1) to (A2-3) has at least a quinoxaline ring structure as the nitrogen-containing fused aromatic ring, and a group represented by General formula (A2-4) or (A2-5) has at least a quinazoline ring structure as the nitrogen-containing fused aromatic ring. Further, in a case where $T^1$ and $T^2$ or $Z^1$ and $Z^2$ are bonded to each other to form a nitrogen-containing fused aromatic ring satisfying all the items (i) to (iii) together with the quinoxaline ring or the quinazoline ring, the nitrogen-containing fused aromatic ring is configured to include an aromatic ring formed by $T^1$ and $T^2$ or $Z^1$ and $Z^2$ being bonded to each other.

Examples of the nitrogen-containing fused aromatic ring include an isoquinoline ring, a quinoline ring, a phthalazine ring, a naphthyridine ring, a quinoxaline ring, a quinazoline ring, a cinnoline ring, a pyrido[3,4-b]pyrazine ring, a pyrido[2,3-b]pyrazine ring, and a pteridine ring.

Among these, from the viewpoint of further improving the light resistance, a quinoxaline ring or a quinazoline ring is preferable.

The n-valent group (hereinafter, also simply referred to as "n-valent group") containing the nitrogen-containing fused aromatic ring represented by Ar as a partial structure may have a substituent on the nitrogen-containing fused aromatic ring or may be unsubstituted.

Examples of the n-valent group include an n-valent group consisting of a nitrogen-containing fused aromatic ring which may have a substituent.

The position of a bonding site as the n-valent group is not particularly limited, and examples thereof include a bonding site formed by removing one hydrogen atom of any carbon atom constituting the ring of the nitrogen-containing fused aromatic ring (hereinafter, also simply referred to as "bonding site on the nitrogen-containing fused aromatic ring") and a bonding site formed by removing one hydrogen atom of any atom (preferably a carbon atom) in the substituent of the nitrogen-containing fused aromatic ring (hereinafter, also simply referred to as "bonding site on the substituent of the nitrogen-containing fused aromatic ring").

In a case where n represents 1, the bonding site may be a bonding site on the nitrogen-containing fused aromatic ring or a bonding site on the substituent of the nitrogen-containing fused aromatic ring.

In a case where n represents 2, the two bonding sites can be selected from the bonding site on the nitrogen-containing fused aromatic ring and the bonding site on the substituent of the nitrogen-containing fused aromatic ring. In a case where n represents 2, it is preferable that two bonding sites are present on the nitrogen-containing fused aromatic ring or two bonding sites are present on the substituent of the nitrogen-containing fused aromatic ring.

It is preferable that n represents 2.

For example, in a case where the nitrogen-containing fused aromatic ring is a quinoxaline ring or a quinazoline ring, the positions of the bonding sites on the quinoxaline ring or the quinazoline ring are not particularly limited, but two positions selected from a 5-position to a 8-position are preferable, and a combination of a 5-position and a 8-position or a combination of a 6-position and a 7-position is more preferable.

Further, in a case where the bonding site is a bonding site on the substituent of the quinoxaline ring or the quinazoline ring, the position of the substituent having the bonding site and the position of the bonding site are not particularly limited. As the substituent having such a bonding site, an aromatic hydrocarbon group which may have a substituent or an aromatic heterocyclic group which may have a substituent is preferable, an aromatic hydrocarbon group having 6 to 12 carbon atoms which may have a substituent is more preferable, a phenyl group which may have a substituent (a phenylene group which may have a substituent as a state of having a bonding site) is still more preferable, and a phenyl group (a phenylene group as a state of having a bonding site) is particularly preferable. In a case where a phenyl group has a bonding site, it is preferable that the bonding site is positioned at the 4-position (the bonding position with respect to a quinoxaline ring or a quinazoline ring is defined as the 1-position) (that is, a 1,4-phenylene group).

In the n-valent group consisting of a nitrogen-containing fused aromatic ring which may have a substituent, the substituents bonded to adjacent carbon atoms in the nitrogen-containing fused aromatic ring may be bonded to each other to form a ring which may have a substituent. Examples of such a structure include a structure represented by General Formula (A1).

Ar has preferably a structure in which one or two of the aromatic hydrocarbon ring group which may have a substituent and the aromatic heterocyclic group which may have a substituent are directly bonded to the nitrogen-containing fused aromatic ring, more preferably a structure in which one or two of the aromatic hydrocarbon ring groups having 6 to 12 carbon atoms which may have a substituent are directly bonded to the nitrogen-containing fused aromatic ring, and still more preferably a structure in which one or two of the benzene rings are directly bonded to the nitrogen-containing fused aromatic ring.

The structure of directly bonding to the nitrogen-containing fused aromatic ring denotes a structure of bonding to the nitrogen-containing fused aromatic ring via a single bond instead of a linking group.

Among the n-valent groups containing a nitrogen-containing fused aromatic ring represented by Ar as a partial structure, preferred examples of the divalent group include a group represented by General Formula (A1) and a group represented by any of General Formulae (A2-1) to (A2-5).

(Group Represented by General Formula (A1))

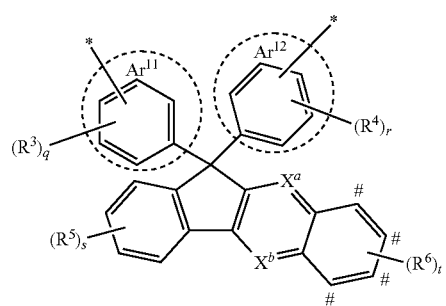

Formula (A1)

In the formula, $Ar^{11}$ and $Ar^{12}$ each independently represent an aromatic hydrocarbon group having a benzene ring surrounded by a broken line or an aromatic heterocyclic group having a benzene ring surrounded by a broken line as one ring constituting a fused ring.

$X^a$ and $X^b$ represent a nitrogen atom or CH, and CH at a position of # may be substituted with a nitrogen atom.

Here, two or three of CH's at positions of $X^a$, $X^b$, and # are nitrogen atoms.

$R^3$ to $R^6$ each independently represent a substituent, and q, r, s, and t each independently represent an integer of 0 to 4.

* represents a bonding position with respect to Pol-Sp-L-.

In a case where $Ar^{11}$ and $Ar^{12}$ represent an aromatic hydrocarbon group having a benzene ring surrounded by a broken line, as the aromatic hydrocarbon group, an aromatic hydrocarbon group having 6 to 18 carbon atoms is preferable, an aromatic hydrocarbon group having 6 to 14 carbon atoms is more preferable, an aromatic hydrocarbon group having 6 to 10 carbon atoms is still more preferable, and a phenylene group formed of only a benzene ring surrounded by a broken line is particularly preferable.

Further, in a case where $Ar^{11}$ and $Ar^{12}$ represent an aromatic heterocyclic group (heteroarylene group) having a benzene ring surrounded by a broken line as one of the rings constituting the fused ring, as the aromatic heterocyclic group, an aromatic heterocyclic group having 9 to 14 ring-constituting atoms is preferable, and an aromatic heterocyclic group having 9 or 10 ring-constituting atoms is more preferable. Examples of the heteroatom constituting the ring of the aromatic heterocyclic group include a nitrogen atom, an oxygen atom, and a sulfur atom.

$Ar^{11}$ and $Ar^{12}$ each independently represent preferably an aromatic hydrocarbon group (arylene group) having a benzene ring surrounded by a broken line and more preferably a phenylene group formed of only a benzene ring surrounded by a broken line.

The substituent represented by $R^3$ to $R^6$ is not particularly limited, and examples thereof include a halogen atom, a halogenated alkyl group, an alkyl group, an alkenyl group, an acyl group, a hydroxy group, a hydroxyalkyl group, an alkoxy group, an aromatic hydrocarbon group, an aromatic heterocyclic group, an aliphatic ring group, and a cyano group.

As the substituent represented by $R^3$ to $R^6$, a halogen atom, an alkyl group, an alkoxy group, an aromatic hydrocarbon group, or a cyano group is preferable, a halogen atom, an alkyl group having 1 to 5 carbon atoms, an alkoxy group having 1 to 5 carbon atoms, a phenyl group, or a cyano group is more preferable, and a halogen atom, a methyl group, a methoxy group, a phenyl group, or a cyano group is still more preferable.

Among these, it is preferable that $R^3$ and $R^4$ each independently represent a methyl group or a methoxy group, and $R^5$ represents preferably a halogen atom, a methyl group, or a methoxy group and more preferably a methyl group. $R^6$ represents preferably a halogen atom, a methyl group, or a methoxy group and more preferably a methyl group.

It is preferable that q and r each independently represent 0 or 1 and more preferable that both q and r represent 0. It is preferable that s and t each independently an integer of 0 to 2 and more preferable that s represents 0 and t represents an integer of 0 to 2.

In regard to the substitution position of $R^6$ in a case where t represents 1 and the substitution position of $R^6$ in a case where t represents 2, the description of the substitution position of $R^6$ in the quinoxaline ring in General Formula (A1-2) is replaced with the description of the substitution position in the fused ring in which the nitrogen atom is represented by $R^a$ and $R^b$ and can be applied thereto.

It is preferable that any one of $X^a$ or $X^b$ represents a nitrogen atom and the other represents CH or both $X^a$ or $X^b$ represent a nitrogen atom and more preferable that both $X^a$ or $X^b$ represent a nitrogen atom.

Further, it is preferable that none of CH's at the positions of # are replaced with a nitrogen atom.

That is, a group represented by General Formula (A1-2) is preferable as the group represented by General Formula (A1).

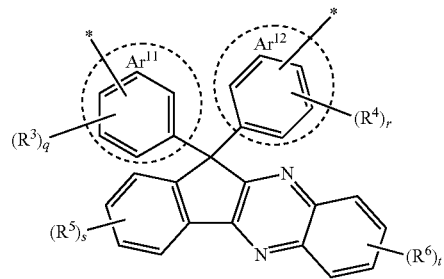

Formula (A1-2)

In the formula, $Ar^{11}$, $Ar^{12}$, $R^3$ to $R^6$, q, r, s, t, and * each have the same definition as that for $Ar^{11}$, $Ar^{12}$, $R^3$ to $R^6$, q, r, s, t, and * in Formula (A1).

The substitution position of $R^6$ is preferably the 6th or 7th position of the formed quinoxaline ring in a case where t represents 1, and the substitution position of $R^6$ is preferably the 6th and 7th positions of the formed quinoxaline ring in a case where t represents 2.

(Group Represented by any of General Formulae (A2-1) to (A2-5))

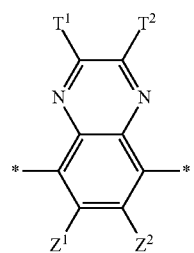

Formula (A2-1)

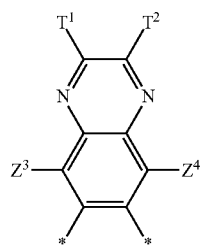

Formula (A2-2)

-continued

Formula (A2-3)

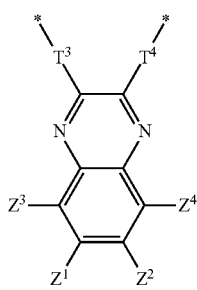

Formula (A2-4)

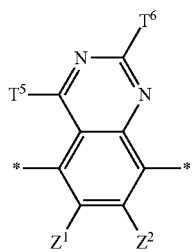

Formula (A2-5)

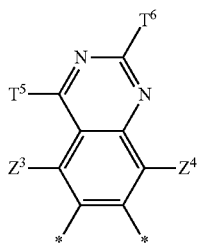

In the formulae, $Z^1$, $Z^2$, $Z^3$, and $Z^4$ each independently represent a monovalent group, such as a hydrogen atom, an aliphatic hydrocarbon group having 1 to 20 carbon atoms which may have a substituent, an alkoxy group having 1 to 20 carbon atoms which may have a substituent, an alkoxycarbonyl group having 1 to 20 carbon atoms which may have a substituent, an alicyclic hydrocarbon group having 3 to 20 carbon atoms which may have a substituent, an aromatic hydrocarbon group having 6 to 20 carbon atoms which may have a substituent, a halogen atom, a cyano group, a nitro group, —NR$^{12}$R$^{13}$—SR$^{12}$, or an aromatic heterocyclic group having 5 to 20 ring-constituting atoms which may have a substituent.

$Z^1$ and $Z^2$ may be bonded to each other to form an aromatic hydrocarbon ring which may have a substituent or an aromatic heterocyclic ring which may have a substituent.

R$^{12}$ and R$^{13}$ each independently represent a hydrogen atom or an alkyl group having 1 to 6 carbon atoms which may have a substituent.

* represents a bonding position with respect to Pol-Sp-L-.

In the description of each substituent in General Formulae (A2-1) to (A2-5), the substituent in the expression of "which may have a substituent" is not particularly limited as long as the substituent is not a group with extremely high releasability (easily decomposable group) such as an acid chloride (—COCl) or -OTf(-O—SO$_2$CF$_3$), and examples thereof include a halogen atom, a hydroxy group, an amino group, a cyano group, a nitro group, a nitroso group, a carboxy group, an alkyl group having 1 to 6 carbon atoms, an alkoxy group having 1 to 6 carbon atoms, an alkoxycarbonyl group having 1 to 6 carbon atoms, an alkylcarbonyloxy group having 1 to 6 carbon atoms, an alkylcarbonyl group having 1 to 6 carbon atoms, an alkylsulfinyl group having 1 to 6 carbon atoms, an alkylsulfonyl group having 1 to 6 carbon atoms, a fluoroalkyl group having 1 to 6 carbon atoms, an alkylsulfanyl group having 1 to 6 carbon atoms, a N-alkylamino group having 1 to 6 carbon atoms, a N,N-dialkylamino group having 2 to 12 carbon atoms, a N-alkylsulfamoyl group having 1 to 6 carbon atoms, and a N,N-dialkylsulfamoyl group having 2 to 12 carbon atoms.

Among these substituents, a halogen atom, a hydroxy group, an alkyl group having 1 to 6 carbon atoms, an alkoxy group having 1 to 6 carbon atoms, and a fluoroalkyl group having 1 to 6 carbon atoms are preferable, and a fluorine atom, a chlorine atom, a bromine atom, a hydroxy group, a methyl group, a methoxy group, and a fluoromethyl group are more preferable.

It is preferable that $Z^1$ and $Z^2$ each independently represent a hydrogen atom or an aliphatic hydrocarbon group having 1 to 20 carbon atoms which may have a substituent or $Z^1$ and $Z^2$ are bonded to each other to form an aromatic hydrocarbon ring which may have a substituent and more preferable that $Z^1$ and $Z^2$ each independently represent a hydrogen atom or a methyl group or $Z^1$ and $Z^2$ are bonded to each other to form a benzene ring.

It is preferable that $Z^2$ and $Z^4$ each independently represent a hydrogen atom or an aliphatic hydrocarbon group having 1 to 20 carbon atoms which may have a substituent and more preferable that $Z^2$ and $Z^4$ each independently represent a hydrogen atom or a methyl group.

$T^1$ and $T^2$ in General Formulae (A2-1) and (A2-2) and $T^5$ and $T^6$ in General Formulae (A2-4) and (A2-5) each independently represent a monovalent group, such as a halogen atom, a cyano group, a nitro group, -L$^6$-Sp$^b$-Pol$^6$, an alicyclic hydrocarbon group having 3 to 20 carbon atoms which may have a substituent, an aromatic hydrocarbon group having 6 to 20 carbon atoms which may have a substituent, an aromatic heterocyclic group having 5 to 20 ring-constituting atoms which may have a substituent, —NR$^{12}$R$^{13}$, or —SR$^{12}$.

L$^6$ has the same definition as that for L. Here, in the description of the linking group exemplified as L, the left side is bonded to a quinoxaline ring or a quinazoline ring and the right side is bonded to Sp$^b$.

L$_6$, represents preferably a single bond, —O—, —OC(=O)—, or —C(=O)O— and more preferably a single bond.

Sp$^b$ represents a single bond, a linear alkylene group having 1 to 30 carbon atoms which may have a substituent, or a linear alkylene group having 2 to 30 carbon atoms which may have a substituent and in which one or two or more non-adjacent —CH$_2$-'s are each independently substituted with a group selected from —O—, —S—, —C(=O)—, —OC(=O)—, —C(=O)O—, —OC(=O)O—, —NR$^{201}$C(=O)—, —C(=O)NR$^{202}$—, —OC(=O)NR$^{203}$—O—, —NR$^{204}$C(=O)O—, —SC(=O)—, and —C(=O)S—.

R$^{201}$, R$^{202}$, R$^{203}$, and R$^{204}$ each independently represent -Sp$^c$-Pol$^4$ or a halogen atom, Sp$^c$ represents a single bond, a linear alkylene group having 1 to 30 carbon atoms which may have a substituent, or a linear alkylene group having 2 to 30 carbon atoms which may have a substituent and in which one or two or more non-adjacent —CH$_2$-'s are each independently substituted with a group selected from —O—, —S—, —C(=O)—, —OC(=O)—, —C(=O)O—, —OC(=O)O—, —NHC(=O)—, —C(=O)NH—, —OC(=O)NH—, —NHC(=O)O—, —SC(=O)—, and —C(=O)S—.

Pol$^4$ and Pol$^6$ each independently have the same definition as that for Pol described below.

It is preferable that $Sp^b$ and $Sp^c$ each independently represent a linear alkylene group having 1 to 10 carbon atoms which may have a substituent or a linear alkylene group having 2 to 10 carbon atoms which may have a substituent and in which one or two or more non-adjacent —$CH_2$-'s are substituted with a group selected from —O—, —C(=O)—, —OC(=O)—, —C(=O)O—, and —OC(=O)O—.

It is preferable that $Pol^4$ and $Pol^6$ represent a hydrogen atom.

Examples of -$L^6$-$Sp^b$-$Pol^6$ include a hydrogen atom, the following groups exemplified as the group represented by -L-Sp-Pol, a group selected from the group consisting of an aliphatic hydrocarbon group having 1 to 20 carbon atoms which may have a substituent and an alkoxy group having 1 to 20 carbon atoms which may have a substituent, and groups containing polymerizable groups at terminals of these groups.

-$Sp^c$-$Pol^4$ represents preferably a hydrogen atom or an alkyl group having 1 to 4 carbon atoms which may have a substituent and more preferably a hydrogen atom or an unsubstituted alkyl group having 1 to 4 carbon atoms.

It is preferable that $R^{201}$, $R^{202}$, $R^{203}$, and $R^{204}$ each independently represent a hydrogen atom, an unsubstituted alkyl group having 1 to 4 carbon atoms, or a halogen atom.

$T^1$ and $T^2$ each independently represent preferably an aromatic hydrocarbon group having 6 to 20 carbon atoms which may have a substituent, an aromatic heterocyclic group having 5 to 20 ring-constituting atoms which may have a substituent, an aliphatic hydrocarbon group having 1 to 20 carbon atoms which may have a substituent, or the following groups exemplified as the group represented by -L-Sp-Pol, more preferably a phenyl group, a biphenyl group, a naphthyl group, an alkyl group having 1 to 6 carbon atoms, a furyl group, or a thienyl group, still more preferably a phenyl group, a 4-biphenyl group, a 1-naphthyl group, a 2-naphthyl group, an alkyl group having 1 to 6 carbon atoms, a 2-furyl group, or a 2-thienyl group, and particularly preferably a phenyl group.

$T^1$ and $T^2$ may be the same as or different from each other, but it is preferable that $T^1$ and $T^2$ are the same as each other. Here, it is also preferable that one of $T^1$ and $T^2$ represents a phenyl group which may have a substituent and the other represents a hydrogen atom or an alkyl group having 1 to 4 carbon atoms.

It is preferable that at least one of $T^1$ or $T^2$ does not represent a hydrogen atom. Further, it is preferable that at least one of $T^1$ or $T^2$ represents an aromatic hydrocarbon group having 6 to 20 carbon atoms which may have a substituent or an aromatic heterocyclic group having 5 to 20 ring-constituting atoms which may have a substituent.

$T^1$ and $T^2$ may be bonded to each other to form an aromatic hydrocarbon ring which may have a substituent or an aromatic heterocyclic ring which may have a substituent. In this case, $T^1$ and $T^2$ are bonded to each other to form preferably an aromatic hydrocarbon ring which may have a substituent, more preferably benzene which may have a substituent, naphthalene which may have a substituent, anthracene which may have a substituent, or phenanthrene which may have a substituent, and still more preferably benzene or phenanthrene.

$T^5$ and $T^6$ each independently represent preferably an aromatic hydrocarbon group having 6 to 20 carbon atoms which may have a substituent, an aromatic heterocyclic group having 5 to 20 ring-constituting atoms which may have a substituent, an aliphatic hydrocarbon group having 1 to 20 carbon atoms which may have a substituent, or the following groups exemplified as the group represented by -L-Sp-Pol, more preferably a hydrogen atom, a phenyl group which may have a substituent, a biphenyl group, a naphthyl group, an alkyl group having 1 to 6 carbon atoms, a furyl group, or a thienyl group, still more preferably a hydrogen atom, a phenyl group, a 4-biphenyl group, a 1-naphthyl group, a 2-naphthyl group, an alkyl group having 1 to 6 carbon atoms, a 2-furyl group, or a 2-thienyl group, and particularly preferably a hydrogen atom or a phenyl group.

$T^5$ and $T^6$ may be the same as or different from each other. It is also preferable that $T^6$ represents any of the above-described preferable substituents and $T^5$ represents a hydrogen atom.

It is preferable that at least one of $T^5$ or $T^6$ does not represent a hydrogen atom. Further, it is preferable that at least one of $T^6$ or $T^6$ represents an aromatic hydrocarbon group having 6 to 20 carbon atoms which may have a substituent or an aromatic heterocyclic group which may have a substituent.

In General Formula (A2-3), $T^3$ and $T^4$ each independently represent a divalent linking group, such as a divalent aromatic hydrocarbon group having 6 to 12 carbon atoms which may have a substituent or a divalent aromatic heterocyclic group which may have a substituent.

$T^3$ and $T^4$ represent preferably a divalent aromatic hydrocarbon group having 6 to 12 carbon atoms which may have a substituent, more preferably a divalent aromatic hydrocarbon group having 6 to 10 carbon atoms, still more preferably a phenylene group, and particularly preferably a 1,4-phenylene group.

$T^3$ and $T^4$ may be the same as or different from each other, but it is preferable that $T^3$ and $T^4$ are the same as each other.

Among groups represented by any of General Formulae (A2-1) to (A2-5), a group represented by any of General Formulae (A2-1) to (A2-3) is more preferable. The reason for this is that synthesis is easily carried out and the raw materials can be obtained at low cost.

As an example of the n-valent group containing a nitrogen-containing fused aromatic ring represented by Ar as a partial structure, a group represented by General Formula (A1) is more preferable, and a group represented by General Formula (A1-2) is still more preferable from the viewpoint of further improving the light resistance.

Hereinafter, in the description of L, Sp, $Sp^a$, Pol, and $Pol^3$, any of Ar's (n-valent groups containing a nitrogen-containing fused aromatic ring as a partial structure) can be preferably used in combination to form a polymerizable compound represented by General Formula (A), unless otherwise specified.

Even in a case where Ar represents a group represented by General Formula (A1), a group represented by General Formula (A1-2), or a group represented by any of General Formulae (A2-1) to (A2-5), the description of L, Sp, $Sp^a$, Pol, and $Pol^3$ can be preferably applied.

(2) L

In General Formula (A), L represents a single bond, —O—, —S—, —C(=O)—, —OC(=O)—, —C(=O)O—, —OC(=O)O—, —$NR^{101}$C(=O)—, —C(=O)—$NR^{102}$—, —OC(=O)$NR^{103}$—, —$NR^{104}$C(=O)O—, —SC(=O)—, or —C(=O)S—. In the description of the linking group above, the left side is bonded to Ar, and the right side is bonded to Sp.

$R^{101}$, $R^{102}$, $R^{103}$, and $R^{104}$ each independently represent -$Sp^a$-$Pol^3$ or a halogen atom, L's each independently represent preferably —O—, —OC(=O)—, —C(=O)O—, —OC(=O)O—, —$NR^{101}$C(=O)—, —C(=O)—$NR^{102}$—, —OC(=O)$NR^{103}$—, or —NR$^{104}$C(=O)O—, more preferably —O—, —OC(=O)—, —OC(=O)O—, or —OC(=O)NR$^{103}$—, and still more preferably —O— or —OC(=O)—.

In a case where n represents 2, a plurality of L's may be the same as or different from each other, but it is preferable that the plurality of L's are the same as each other.

(3) Sp and Sp$^a$

Sp and Sp$^a$ each independently represent a single bond or a divalent linking group.

Examples of the divalent linking group as Sp and Sp$^a$ include a linear alkylene group which may have a substituent, a cycloalkylene group which may have a substituent, a divalent aromatic hydrocarbon group which may have a substituent, and a divalent aromatic heterocyclic group which may have a substituent. Other examples thereof include a linking group in which two or more linking groups selected from a linear alkylene group which may have a substituent, a cycloalkylene group which may have a substituent, a divalent aromatic ring group which may have a substituent, and a divalent aromatic heterocyclic group which may have a substituent are bonded to each other vis a linking group selected from a single bond, —O—, —S—, —C(=O)—, —OC(=O)—, —C(=O)O—, —OC(=O)O—, —NR$^{201}$C(=O)—, —C(=O)NR$^{202}$—, —OC(=O)NR$^{203}$—, —NR$^{204}$C(=O)O—, —SC(=O)—, and —C(=O)S—.

In the description of the linking group, the left side is bonded to L or N (in a case of Sp$^a$), and the right side is bonded to Pol or Pol$^3$ (in a case of Sp$^a$).

R$^{201}$, R$^{202}$, R$^{203}$, and R$^{204}$ each have the same definition as that for R$^{201}$, R$^{202}$, R$^{203}$, and R$^{204}$.

In the description of the substituent in Sp and Sp$^a$, the substituent in the expression of "which may have a substituent" is not particularly limited as long as the substituent is not a group with extremely high releasability (easily decomposable group) such as an acid chloride (—COCl) or -OTf (-O—SO$_2$CF$_3$), and examples thereof include an alkyl group, a cycloalkyl group, an alkoxy group, an acyl group, an acyloxy group, an alkoxycarbonyl group, an amide group, an amino group, a halogen atom, a nitro group, a cyano group, and a substituent formed by combining two or more of the above-described substituents.

The substituent may be a group represented by -Sp$^5$-Pol$^5$. Sp$^5$ and Pol$^5$ each have the same definition as that for Sp and Pol, and the preferable ranges thereof are also the same as described above. The number of substituents is not particularly limited, and the above-described groups may include 1 to 4 substituents. In a case where the above-described groups include two or more substituents, two or more substituents may be the same as or different from each other.

As the divalent linking group represented by Sp, a linear alkylene group having 1 to 30 carbon atoms which may have a substituent, a linking group in which a linear alkylene group having 1 to 30 carbon atoms which may have a substituent and a cycloalkylene group having 3 to 10 carbon atoms which may have a substituent are bonded to each other via a single bond, —O—, —C(=O)—, —OC(=O)—, —C(=O)O—, —OC(=O)O—, —NR$^{201}$C(=O)—, or —C(=O)NR$^{202}$—, or a linear alkylene group having 2 to 30 carbon atoms which may have a substituent and in which one or two or more non-adjacent —CH$_2$-'s are each independently substituted with a group selected from —O—, —S—, —C(=O)—, —OC(=O)—, —C(=O)O—, —OC(=O)O—, —NR$^{201}$C(=O)—, —C(=O)NR$^{202}$—, —OC(=O)NR$^{203}$—, —NR$^{204}$C(=O)O—, —SC(=O)—, and —C(=O)S— is preferable.

In the linear alkylene group having 2 to 30 carbon atoms in which —CH$_2$— is substituted with a group selected from —O—, —S—, —C(=O)—, —OC(=O)—, —C(=O)O—, —OC(=O)O—, —NR$^{201}$C(=O)—, —C(=O)NR$^{202}$—, —OC(=O)NR$^{203}$—, —NR$^{204}$C(=O)O—, —SC(=O)—, and —C(=O)S— (hereinafter, also referred to as "other divalent groups in the present paragraph), it is preferable that other divalent groups are not directly bonded to L. That is, it is preferable that a moiety substituted with other divalent group is not an L side terminal of Sp.

As the divalent linking group represented by Sp, a linear alkylene group having 1 to 20 carbon atoms which may have a substituent, a linking group in which a linear alkylene group having 1 to 20 carbon atoms which may have a substituent and a cycloalkylene group having 3 to 6 carbon atoms which may have a substituent are bonded to each other via —O—, —C(=O)—, —OC(=O)—, —C(=O)O—, or —OC(=O)O—, or a linear alkylene group having 2 to 20 carbon atoms which may have a substituent and in which one or two or more non-adjacent —CH$_2$-'s are each independently substituted with a group selected from —O—, —C(=O)—, —OC(=O)—, —C(=O)O—, —OC(=O)O—, —NR$^{201}$C(=O)—, —C(=O)NR$^{202}$—, —OC(=O)NR$^{203}$—, and —NR$^{204}$C(=O)O— is more preferable, a linear alkylene group having 1 to 10 carbon atoms which may have a substituent, a linking group in which a linear alkylene group having 1 to 10 carbon atoms which may have a substituent and a cycloalkylene group having 3 to 6 carbon atoms which may have a substituent are bonded to each other via —O—, —C(=O)—, —OC(=O)—, or —C(=O)O—, or a linear alkylene group having 2 to 10 carbon atoms which may have a substituent and in which one or two or more non-adjacent —CH$_2$-'s are each independently substituted with a group selected from —O—, —C(=O)—, —OC(=O)—, and —C(=O)O— is still more preferable, and a linear alkylene group having 1 to 10 carbon atoms which has no substituent or has a methyl group as a substituent, a linking group in which a linear alkylene group having 1 to 10 carbon atoms which has no substituent or has a methyl group as a substituent and an unsubstituted cycloalkylene group having 3 to 6 carbon atoms are bonded to each other via —O—, —C(=O)—, —OC(=O)—, or —C(=O)O—, or a linear alkylene group having 2 to 10 carbon atoms which has no substituent or a methyl group as a substituent and in which one or two or more non-adjacent —CH$_2$-'s are each independently substituted with a group selected from —O—, —C(=O)—, —OC(=O)—, and —C(=O)O— is particularly preferable.

In a case where n represents 2, a plurality of Sp's may be the same as or different from each other, but it is preferable that the plurality of Sp's are the same as each other.

In Pol-Sp-L-, it is preferable that Sp and L do not represent a single bond at the same time and more preferable that both Sp and L do not represent a single bond.

In General Formula (A), -L-Sp- represents preferably a structure in which —OC(=O)—C$_2$H$_4$— or —OC(=O)—C$_2$H$_4$— is repeated 2 to 10 times, more preferably a structure in which —OC(=O)—C$_2$H$_4$— is repeated 2 to 5 times, and still more preferably —OC(=O)—C$_2$H$_4$—OC(=O)—C$_2$H$_4$—.

As the divalent linking group represented by Sp$^a$, a single bond or a linear alkylene group having 1 to 10 carbon atoms which may have a substituent is preferable, a linear alkylene group having 1 to 5 carbon atoms which may have a substituent is more preferable, a linear alkylene group having 1 to 3 carbon atoms which may have a substituent is still more preferable, and an unsubstituted linear alkylene group having 1 to 3 carbon atoms is particularly preferable.

(4) Pol and $Pol^3$

Pol and $Pol^3$ each independently represent a hydrogen atom or a polymerizable group.

Examples of the polymerizable group include a polymerizable group represented by any of Formulae (Pol-1) to (Pol-6).

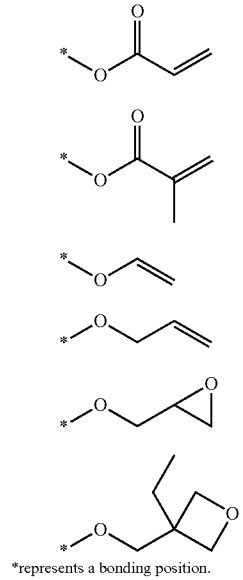

*represents a bonding position.

Among these, a (meth)acryloyloxy group represented by Formula (Pol-1) or (Pol-2) is preferable, and a methacryloyloxy group represented by Formula (Pol-2) is more preferable.

Pol represents preferably a polymerizable group and more preferably a (meth)acryloyloxy group. In particular, from the viewpoint of improving the moist heat durability of a lens formed from the curable composition of the present invention, it is particularly preferable that Pol represents a methacryloyloxy group.

In a case where a plurality of Pol's are present, the plurality of Pol's may be the same as or different from each other, but it is preferable that the plurality of Pol's are the same as each other.

The polymerizable compound represented by General Formula (A) contains at least one polymerizable group. It is preferable that the polymerizable compound represented by General Formula (A) contains at least two polymerizable groups. The upper limit of the number of polymerizable groups contained in the polymerizable compound represented by General Formula (A) is not particularly limited, but is, for example, preferably 4 or less.

The polymerizable compound represented by General Formula (A) has preferably a polymerizable group as at least Pol and more preferably a polymerizable group only as Pol.

It is preferable that $Pol^3$ represents a hydrogen atom.

$-Sp^a-Pol^3$ represents preferably a hydrogen atom or an alkyl group having 1 to 4 carbon atoms which may have a substituent and more preferably a hydrogen atom or an unsubstituted alkyl group having 1 to 4 carbon atoms.

In the polymerizable compound represented by General Formula (A), in a case where a plurality of Pol-Sp-L-'s are present, the plurality of Pol-Sp-L-'s may be the same as or different from each other, but it is preferable that Pol-Sp-L-'s are the same as each other.

Examples of specific structures of Pol-Sp-L- include the following structures.

R represents a hydrogen atom or a methyl group. Further, * represents a bonding position with respect to Ar.

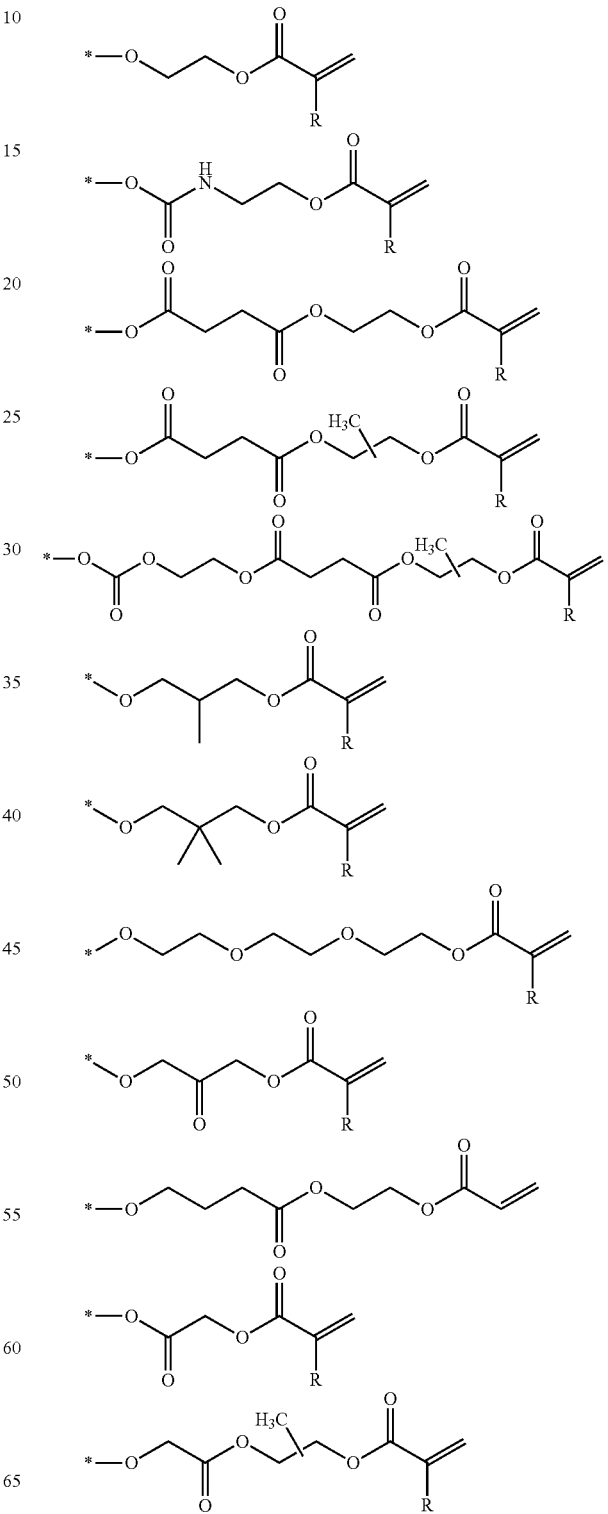

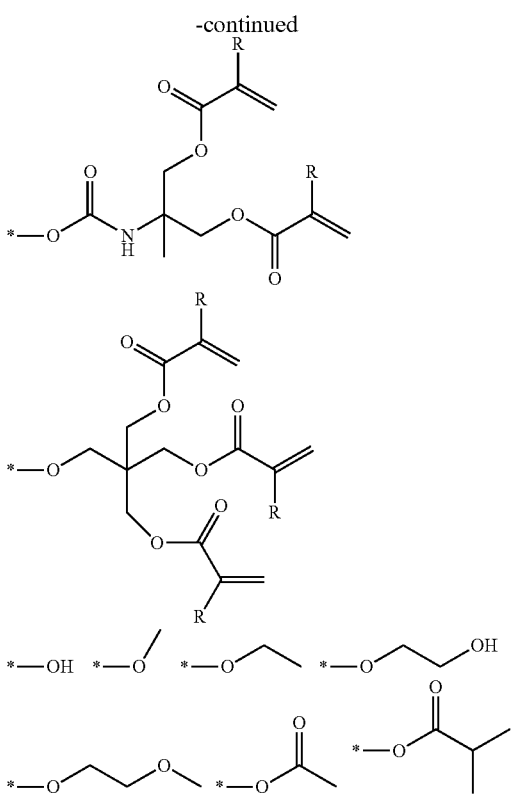

In the present specification, the structure represented by the following notation indicates an isopropylene structure.

The isopropylene structure may be any of two structural isomers in which a methyl group is bonded to any one carbon atom constituting an ethylene group or in the form of a mixture of such structural isomers.

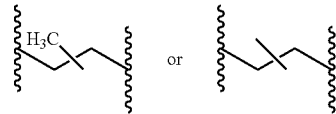

As described above, in a case where a linear alkylene group has a structure in which a substituent is substituted in the polymerizable compound represented by General Formula (A), structural isomers having different substitution positions of the substituent are present. The polymerizable compound represented by General Formula (A) may be a mixture of such structural isomers.

It is preferable that the polymerizable compound represented by General Formula (A) is a non-liquid crystal compound.

Hereinafter, specific examples of the polymerizable compound represented by General Formula (A), which is preferably used in the curable composition according to the embodiment of the present invention, will be shown, but the present invention is not limited to the following compounds. In the following structural formulae, Me represents a methyl group, Et represents an ethyl group, iPr represents an i-propyl group, nPr represents an n-propyl group, nBu represents an n-butyl group, and tBu represents a t-butyl group.

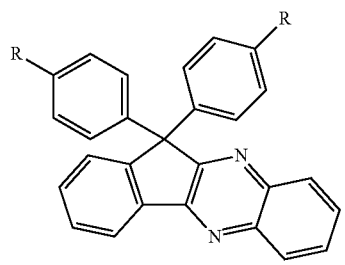

(A-1)

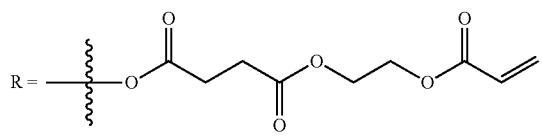

(A-2)

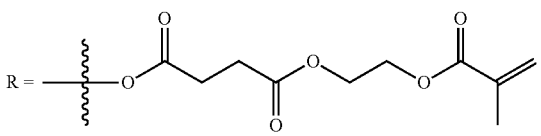

(A-3)

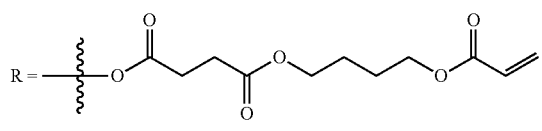

(A-4)

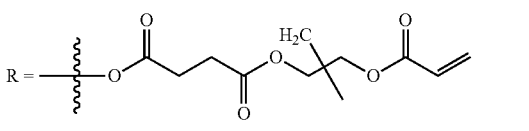

(A-5)

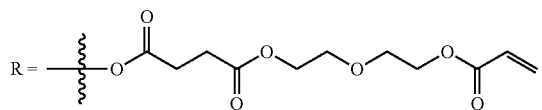

(A-6)

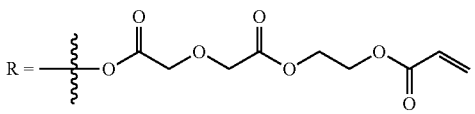

-continued
(A-7)
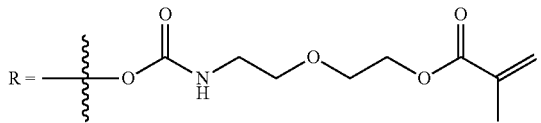
(A-8)
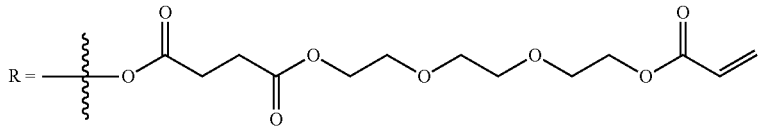
(A-9)
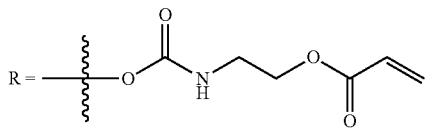
(A-10)
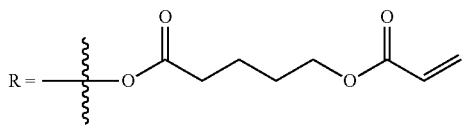
(A-11)
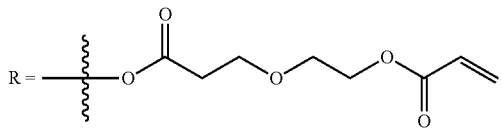
(A-12)
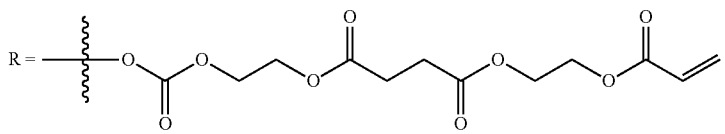
(A-13)
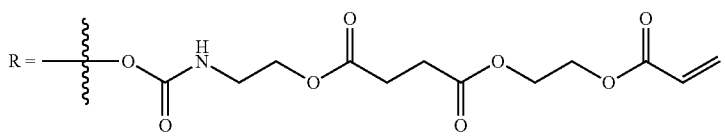
(A-14)
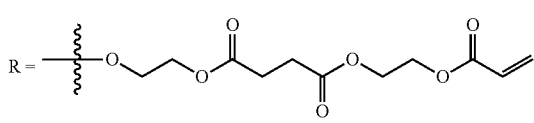
(A-15)
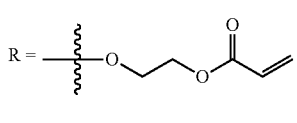
(A-16)
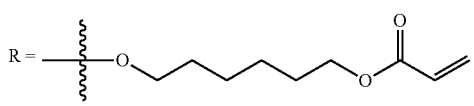
(A-17)
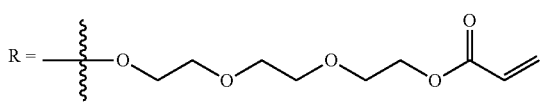
(A-18)
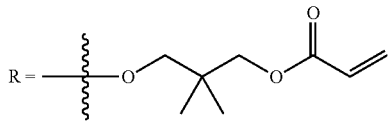
(A-19)
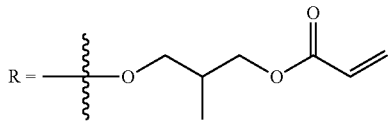
(A-20)
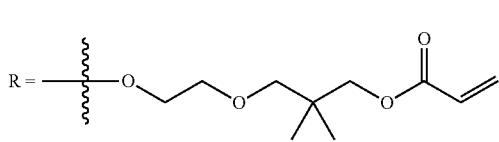
(A-21)
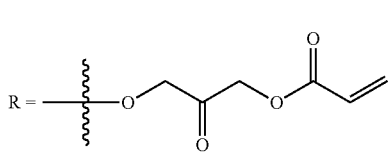
(A-22)
(A-23)

-continued
(A-24)
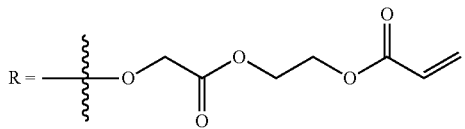
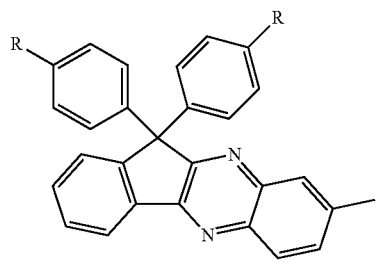
(A-25)
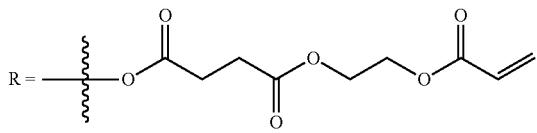
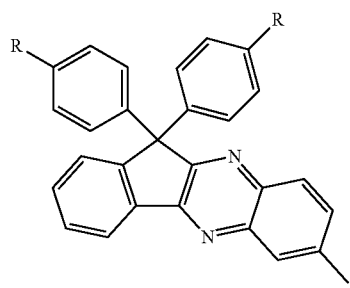
(A-26)
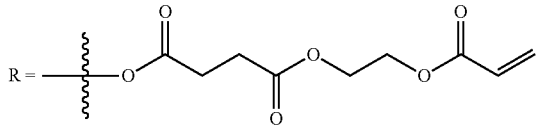
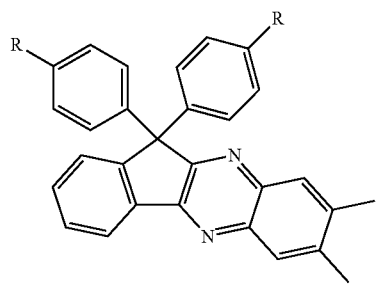
(A-27)
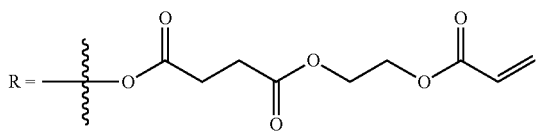
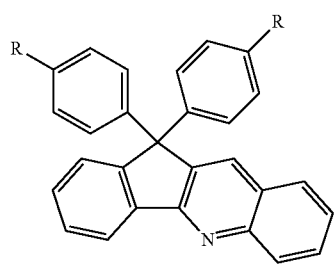

-continued
(A-28)
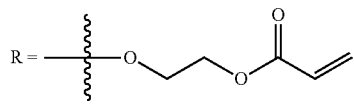
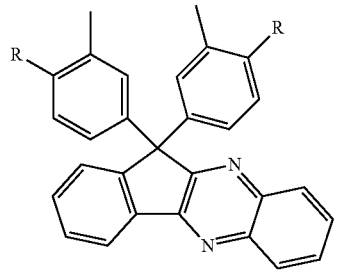
(A-29)
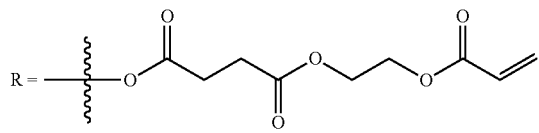
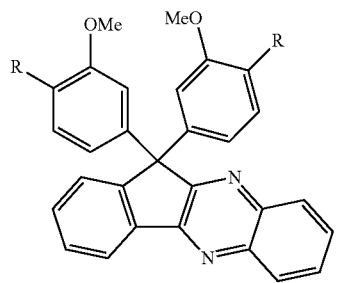
(A-30)
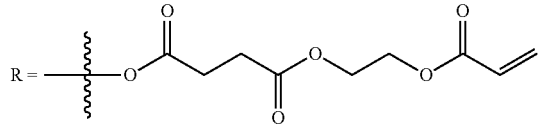
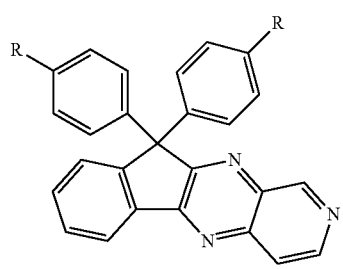
(A-31)
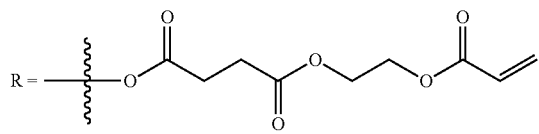
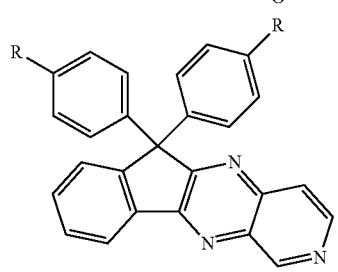

-continued
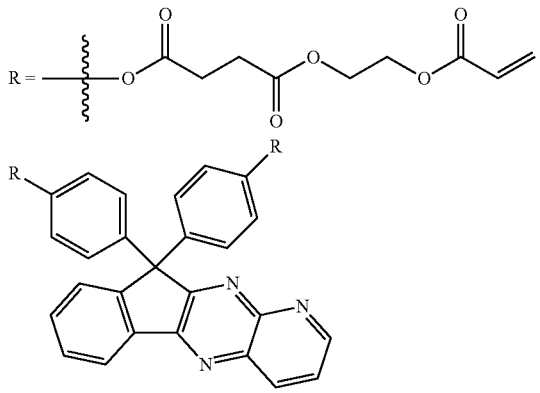
(A-32)
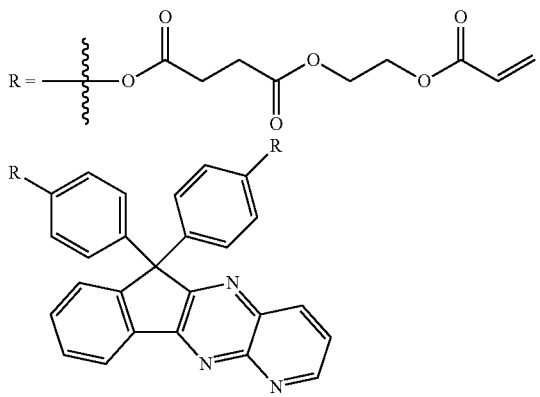
(A-33)
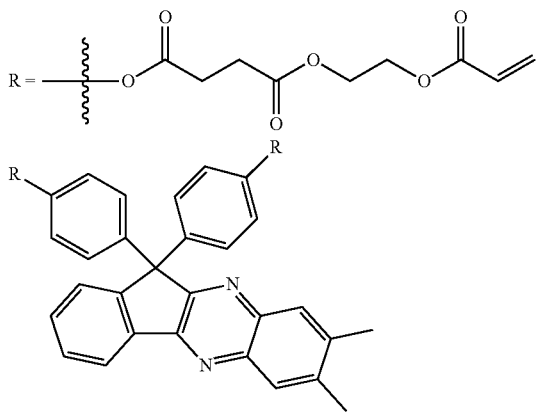
(A-34)
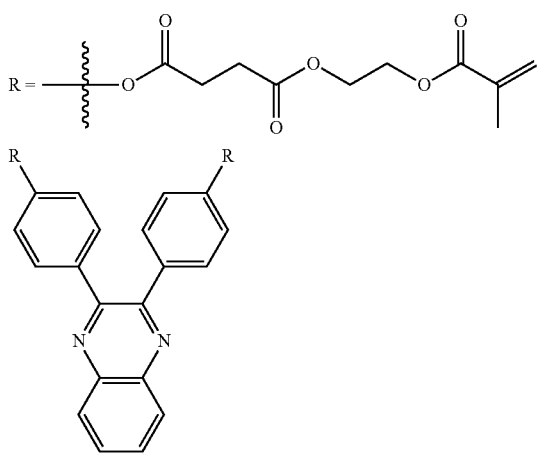
(A-35)

-continued
(I-1)
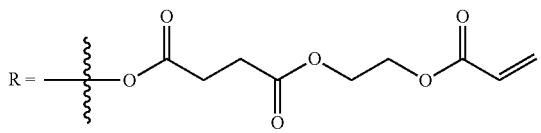
(I-2)
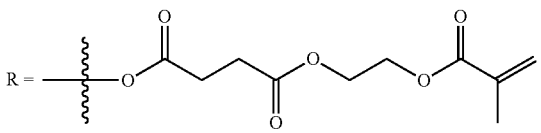
(I-3)
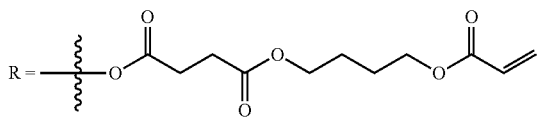
(I-4)
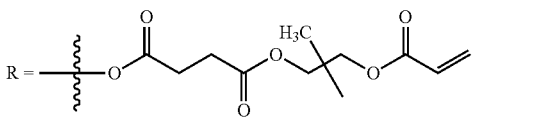
(I-5)
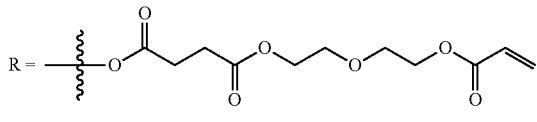
(I-6)
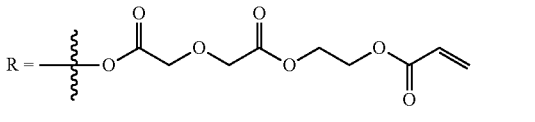
(I-7)
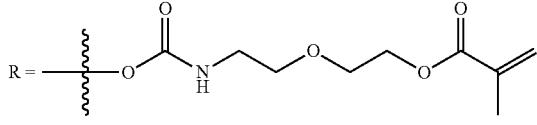
(I-8)
(I-9)
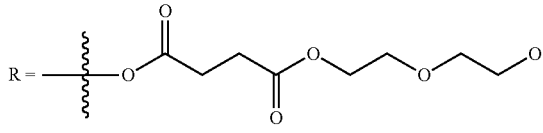
(I-10)
(I-11)
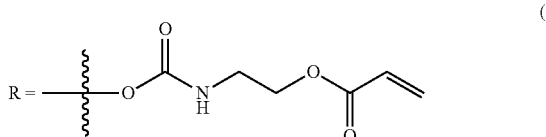
(I-12)
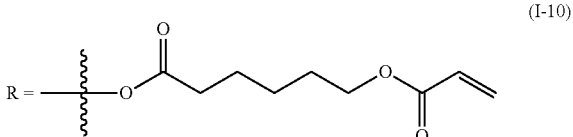
(I-13)
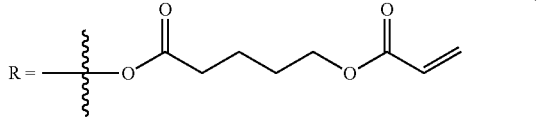
(I-14)
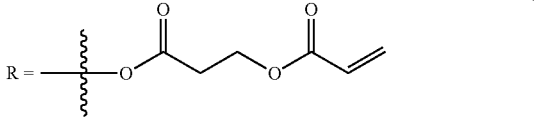
(I-15)
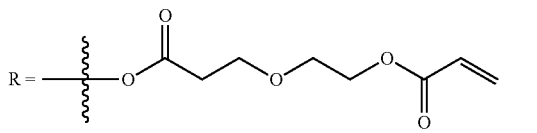
(I-16)
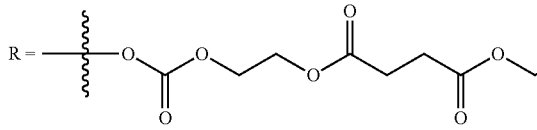
(I-17)

-continued
(I-18)
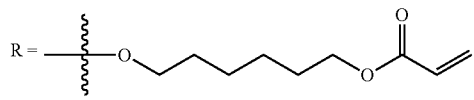
(I-19)
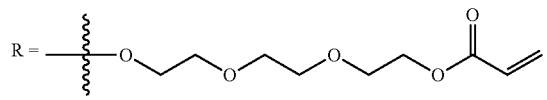
(I-20)
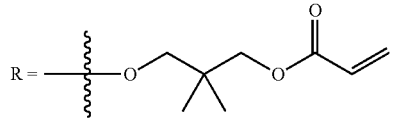
(I-21)
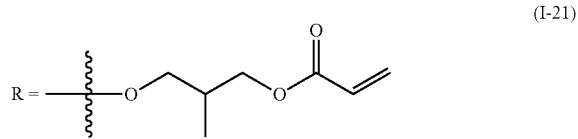
(I-22)
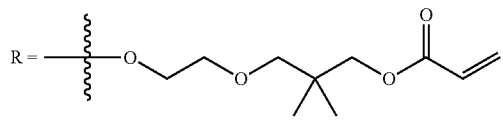
(I-23)
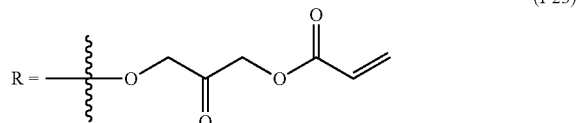
(I-24)
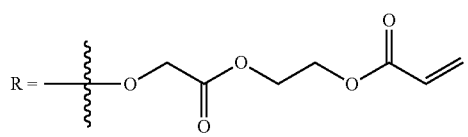
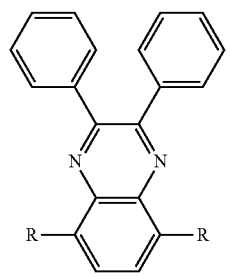
(II-1)
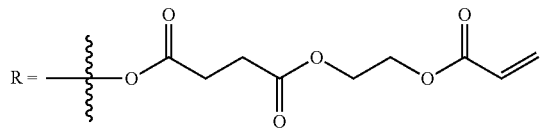
(II-2)
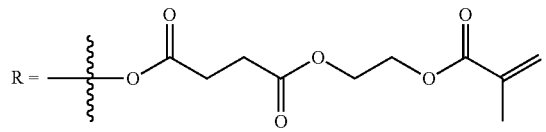
(II-3)
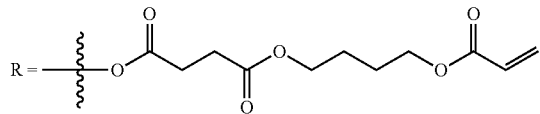
(II-4)
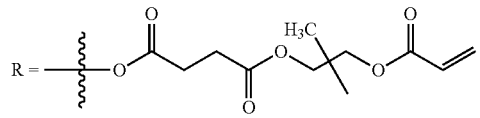
(II-5)
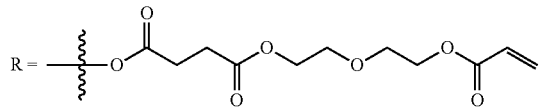
(II-6)
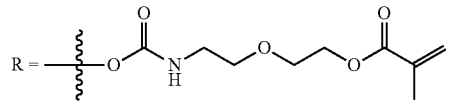
(II-7)
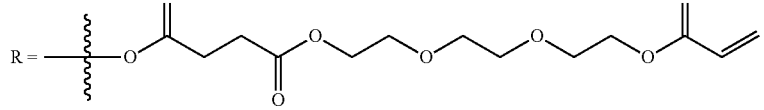
(II-8)

-continued
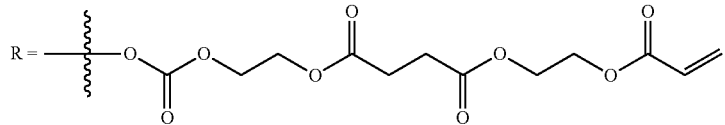
(II-9)
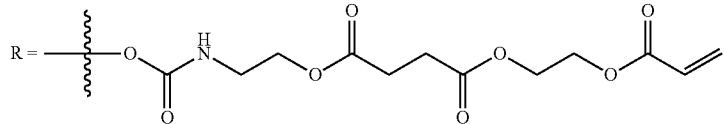
(II-10)
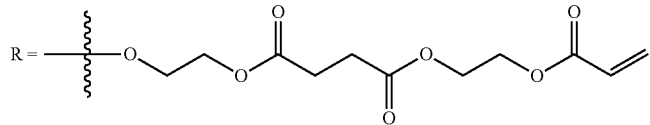
(II-11)
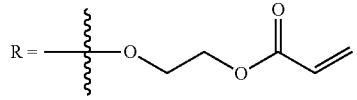
(II-12)
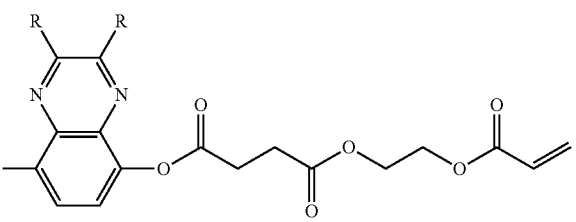
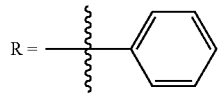 (III-1)
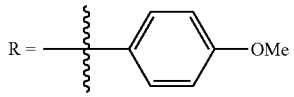 (III-2)
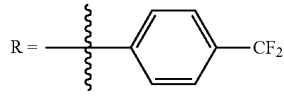 (III-3)
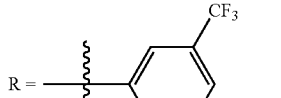 (III-4)
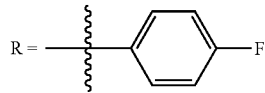 (III-5)
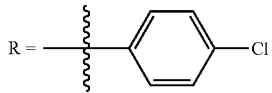 (III-6)
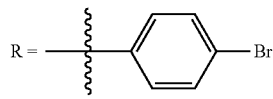 (III-7)
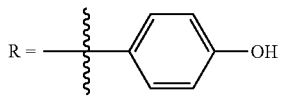 (III-8)
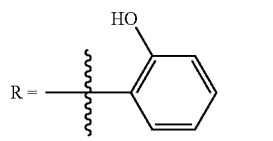 (III-9)
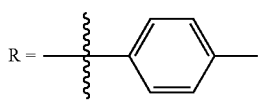 (III-10)
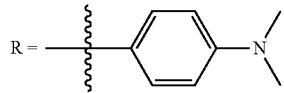 (III-11)

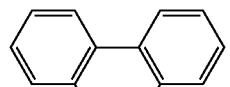
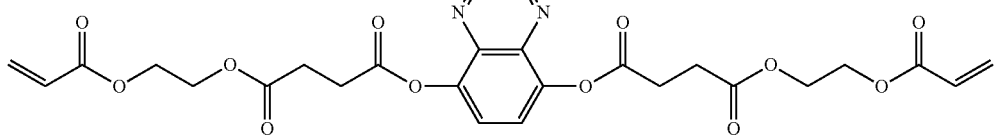
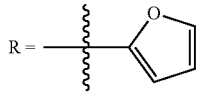
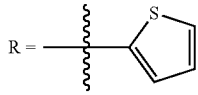
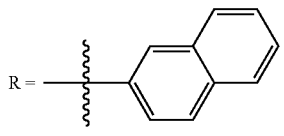
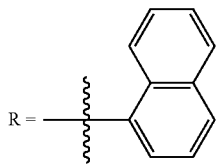
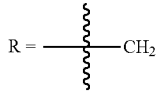
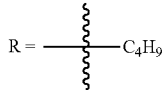
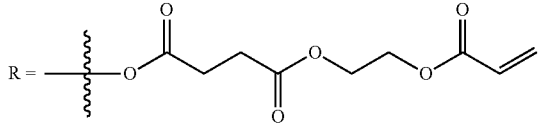
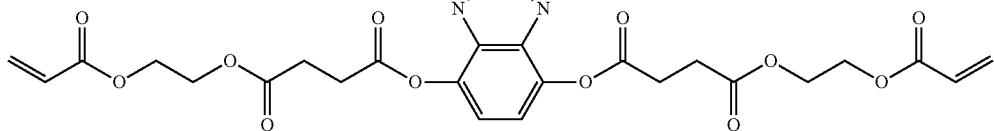
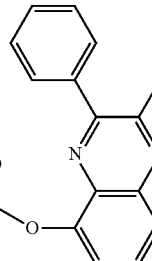
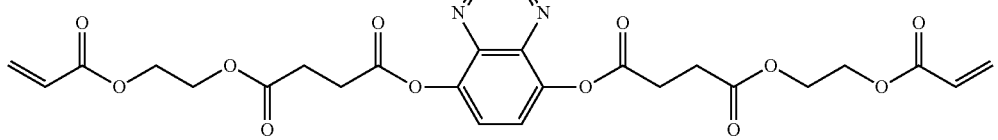

-continued
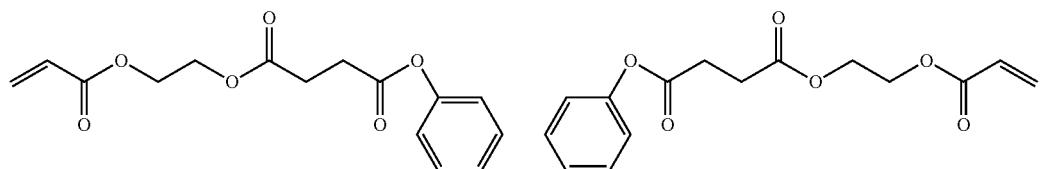
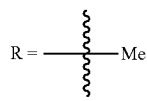 (IV-1)
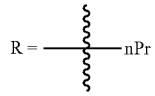 (IV-3)
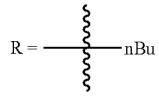 (IV-5)
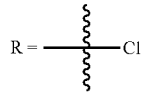 (IV-7)
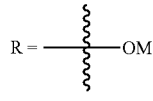 (IV-9)
(IV-2) R = —B
(IV-4) R = —iPr
(IV-6) R = —tBu
(IV-8) R = —F
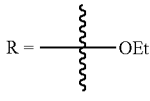 (IV-10)
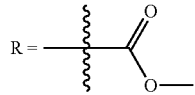 (IV-11)
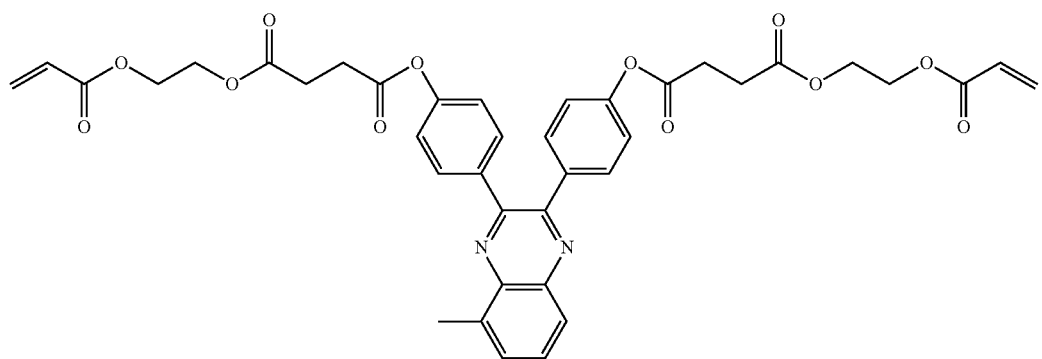 (IV-12)

(IV-13)
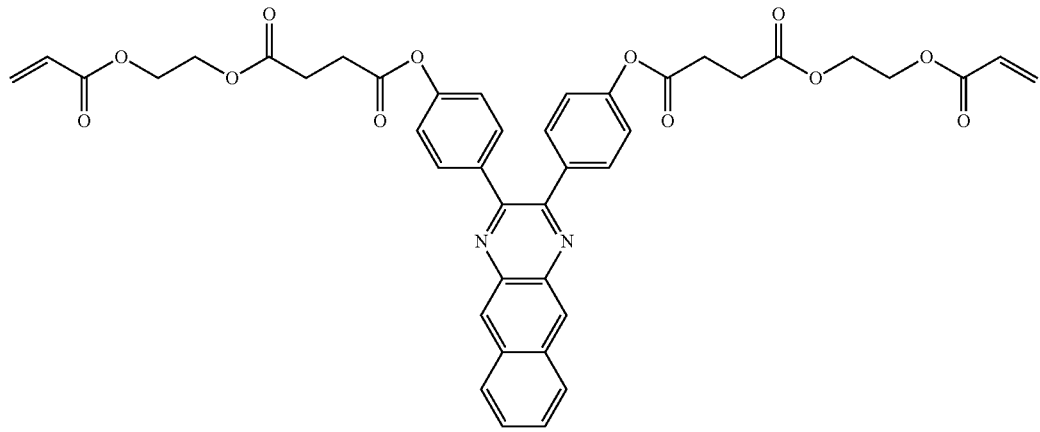
(IV-14)
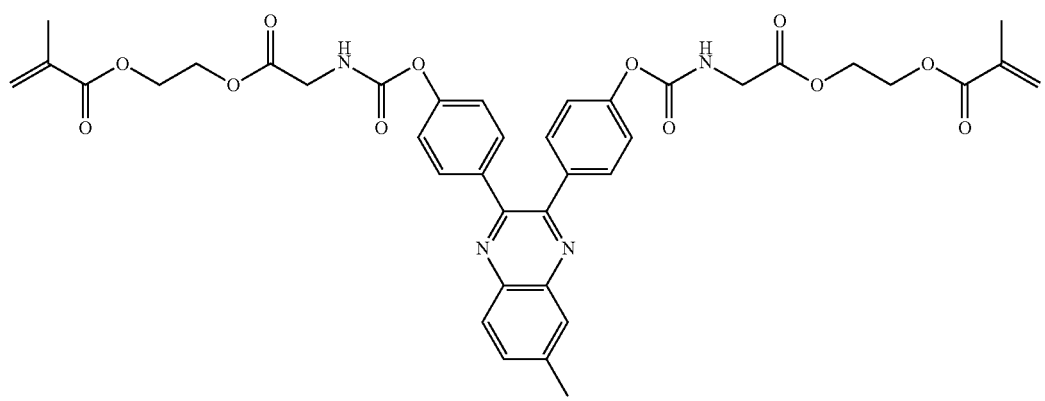
(IV-15)
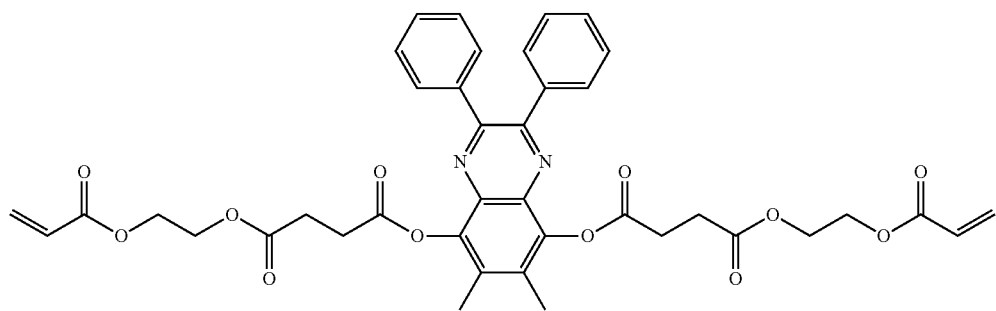
(IV-16)
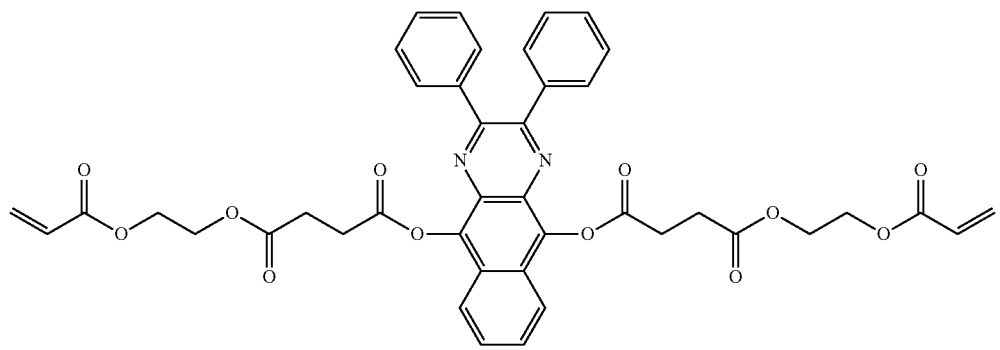

-continued
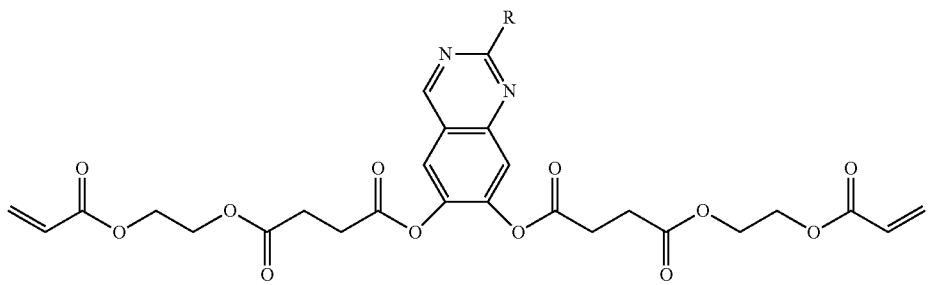
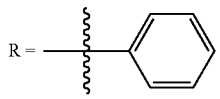 (V-1)
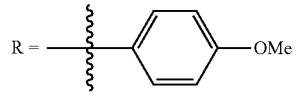 (V-2)
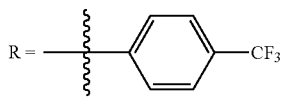 (V-3)
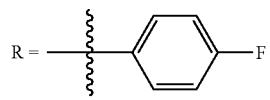 (V-4)
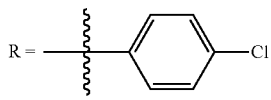 (V-5)
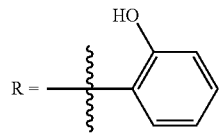 (V-6)
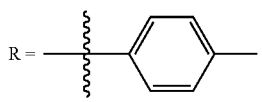 (V-7)
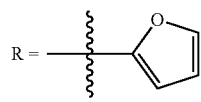 (V-8)
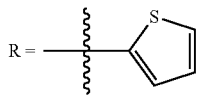 (V-9)
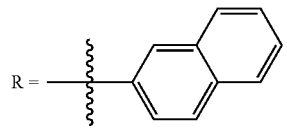 (V-10)
 (V-11)
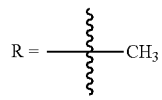 (V-12)
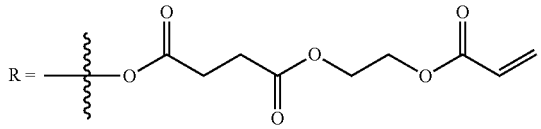 (V-13)
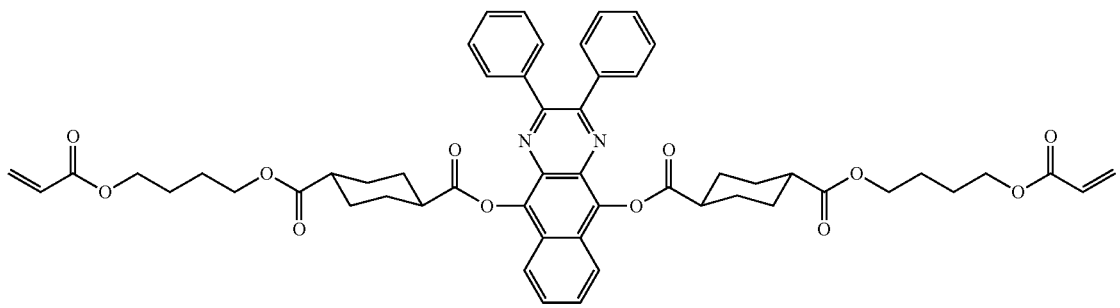 (VI-1)

-continued (VI-2)

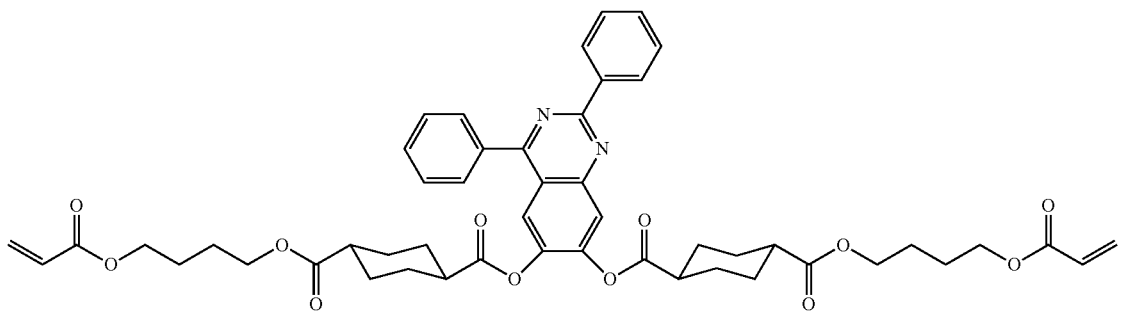

Further, the polymerizable compound represented by General Formula (A) has one or two or more asymmetric carbons in some cases, either the (R)-form or the (S)-form can be each independently employed for the stereochemistry of asymmetric carbons. Further, the polymerizable compound represented by General Formula (A) may be a mixture of optical isomers or stereoisomers such as diastereoisomers. That is, the polymerizable compound represented by General Formula (A) may be any kind of stereoisomer, any mixture of stereoisomers, or a racemic body.

A method of obtaining the compound represented by General Formula (A) is not particularly limited, and a commercially available product or a compound obtained by synthesis may be used. In a case where the compound is obtained by synthesis, a method of producing the compound represented by General Formula (A) is not particularly limited, and the compound can be produced using a method of the related art with reference to the methods in examples described below.

The content of the compound represented by General Formula (A) in the curable composition according to the embodiment of the present invention is preferably in a range of 30% to 99% by mass, more preferably in a range of 35% to 99% by mass, and still more preferably in a range of 40% to 99% by mass with respect to the total solid content of the curable composition. In a case where the content of the polymerizable compound represented by General Formula (A) is in the above-described range, partial dispersion ratios ($\theta$g, F) higher than partial dispersion ratios ($\theta$g, F) to be expected are likely to be achieved in the cured substance having a predetermined Abbe number.

The curable composition may contain two or more kinds of polymerizable compounds represented by General Formula (A). In a case where the curable composition contains two or more kinds of polymerizable compounds represented by General Formula (A), it is preferable that the total content thereof is in the above-described range.

[Component B: Acylphosphine Oxide Photopolymerization Initiator]

The curable composition according to the embodiment of the present invention contains an acylphosphine oxide photopolymerization initiator as the component B.

In the curable composition according to the embodiment of the present invention, the acylphosphine oxide photopolymerization initiator as the component B generates a radically active species by light irradiation and acts on the polymerizable compound represented by General Formula (A) as the component A so that the polymerization (curing) reaction proceeds to obtain a cured substance.

As the acylphosphine oxide photopolymerization initiator, an acylphosphine oxide compound that has been typically used as a photopolymerization initiator can be used without particular limitation.

As the acylphosphine oxide photopolymerization initiator (hereinafter, also simply referred to as "acylphosphine oxide compound"), a monoacylphosphine oxide compound having a structure represented by Formula (b-1) or a bisacylphosphine oxide compound having a structure represented by Formula (b-2) is preferable.

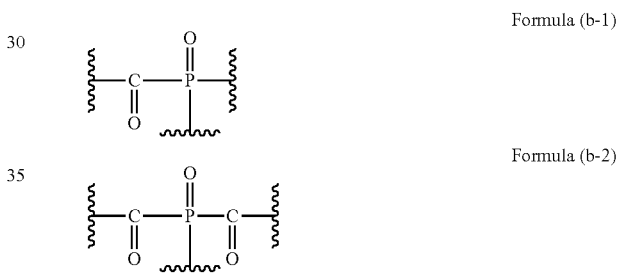

Formula (b-1)

Formula (b-2)

As the acylphosphine oxide compound, a monoacylphosphine oxide compound represented by Formula (b-3) or a bisacylphosphine oxide compound represented by Formula (b-4) is more preferable, and a bisacylphosphine oxide compound represented by Formula (b-4) is still more preferable from the viewpoint of obtaining more excellent photocuring sensitivity.

(Monoacylphosphine Oxide Compound Represented by Formula (b-3))

Formula (b-3)

In the formula, $R^{b1}$, $R^{b2}$, and $R^{b3}$ each independently represent an aryl group (aromatic hydrocarbon group) which may have a group selected from a methyl group and an ethyl group as a substituent.

The number of carbon atoms constituting the aromatic ring of the aryl group that can be employed as $R^{b1}$ to $R^{b3}$ is not particularly limited, but is, for example, preferably in a range of 6 to 14 and more preferably in a range of 6 to 10.

In a case where the aryl group that can be employed as $R^{b1}$ to $R^{b3}$ has a substituent, the number of the substituents is not particularly limited, but is preferably in a range of 1 to 5 and more preferably in a range of 1 to 3.

In a case where the aryl group that can be employed as $R^{b1}$ to $R^{b3}$ has a plurality of substituents, the kind of the substituent may be a methyl group alone, an ethyl group alone, or both a methyl group and an ethyl group. Among these, it is preferable that the kind of the substituents is a methyl group alone.

As the unsubstituted aryl group that can be employed as $R^{b1}$ to $R^{b3}$, a phenyl group is preferable.

As the aryl group having a substituent that can be employed as $R^{b1}$ to $R^{b3}$, a phenyl group having a methyl group as a substituent is preferable, a phenyl group having 1 to 3 methyl groups as a substituent is more preferable, and a 2,4,6-trimethylphenyl group is still more preferable.

As the monoacylphosphine oxide compound represented by Formula (b-3), a compound in which $R^{b1}$ to $R^{b3}$ each independently represent a phenyl group which may have a methyl group as a substituent is preferable, and a compound in which $R^{b2}$ and $R^{b3}$ represent a phenyl group and $R^{b1}$ represents a phenyl group having 1 to 3 methyl groups is more preferable.

Among these, 2,4,6-trimethylbenzoyldiphenylphosphine oxide is preferable as the monoacylphosphine oxide compound represented by Formula (b-3).

(Bisacylphosphine Oxide Compound Represented by Formula (b-4))

Formula (b-4)

In the formula, $R^{b4}$, $R^{b5}$, and $R^{b6}$ each independently an aryl group (aromatic hydrocarbon group) which may have a group selected from a methyl group and an ethyl group as a substituent.

$R^{b4}$ and $R^{b5}$ each have the same definition as that for $R^{b1}$, and $R^{b6}$ has the same definition as that for $R^{b2}$.

As the bisacylphosphine oxide compound represented by Formula (b-4), a compound in which $R^{b4}$ to $R^{b6}$ each independently represent a phenyl group which may have a methyl group as a substituent is preferable, and a compound in which $R^{b6}$ represents a phenyl group and $R^{b4}$ and $R^{b5}$ each independently represent a phenyl group which may have one to three methyl groups is more preferable.

Among these, as the bisacylphosphine oxide compound represented by Formula (b-4), bis(2,4,6-trimethylbenzoyl)phenylphosphine oxide is preferable.

The content of the component B in the curable composition according to the embodiment of the present invention is preferably in a range of 0.01% to 1% by mass, and from the viewpoint of further improving the light resistance and further improving the transmittance, more preferably in a range of 0.01% to 0.5% by mass and still more preferably in a range of 0.01% to 0.3% by mass with respect to the total solid content of the curable composition.

[Component C: Amine Compound]

The curable composition according to the embodiment of the present invention contains an amine compound (hereinafter, also simply referred to as "amine compound") as the component C. The polymerizable compound represented by General Formula (A) which has an amine structure is classified into the component A. Further, the amine compound may be a photoradical polymerization initiator having an amine structure, but in a case where a photoradical polymerization initiator other than the component B remains in the cured substance, it is preferable that the amine compound is not a photoradical polymerization initiator having an amine structure because the quality of the cured substance may change due to photodecomposition.

The amine compound can improve the light resistance of the cured substance obtained from the curable composition according to the embodiment of the present invention. Although it is presumed, the light resistance is considered to be improved due to the presence of the amine compound which leads to suppression of the addition of hydrogen ions to the nitrogen atoms in the nitrogen-containing fused aromatic ring of the polymerizable compound represented by General Formula (A) and to suppression of a decrease in the transmittance.

The amine compound may be any of a primary amine compound, a secondary amine compound, and a tertiary amine compound.

Here, the classification of the primary, secondary, and tertiary is made by whether a structure in which some hydrogen atoms of ammonia ($NH_3$) are substituted with an aliphatic group or an aromatic group is present. A structure in a case where the number of substituted hydrogen atoms is one is denoted as a primary amine structure, a structure in a case where the number of substituted hydrogen atoms is two is denoted as a secondary amine structure, and a structure in a case where the number of substituted hydrogen atoms is three is denoted as a tertiary amine structure.

The aliphatic group may be of chain-like or alicyclic and may have a heteroatom (such as a nitrogen atom, an oxygen atom, or a sulfur atom) as a ring-constituting atom of an alicycle as long as the atom bonded to the nitrogen atom is a carbon atom. Specifically, the aliphatic group is an alkyl group (including a cycloalkyl group, hereinafter, the same applies to the description of the component C), an alkenyl group (including a cycloalkenyl group, hereinafter, the same applies to the description of the component C), an alkynyl group (including a cycloalkynyl group, hereinafter, the same applies to the description of the component C), and a heterocyclic group in which the atom bonded to the nitrogen atom in the amine structure is a carbon atom (hereinafter, simply referred to as "heterocyclic group" in the description of the amine compound as the component C).

The term aromatic group is used to include an aromatic heterocyclic group in which the atom bonded to the nitrogen atom is a carbon atom, in addition to an aromatic hydrocarbon group.

The above-described aliphatic group and aromatic group may be unsubstituted or may further have a substituent.

In a case where the amine compound is a secondary or tertiary amine compound, the substituents on the nitrogen atom in the amine structure may or may not form a ring by being bonded to each other, but it is preferable that the substituents do not form a ring by being bonded to each other. However, the ring formed by the substituents being bonded to each other is not an aromatic heterocyclic ring. In a case where an aromatic heterocyclic ring is used, the effect of suppressing a decrease in the transmittance of the cured substance is considered to be small.

From the viewpoint of suppressing side reactions of the amine compound with a polymerizable compound such as the polymerizable compound represented by General Formula (A) and further improving the transmittance, it is preferable that the amine compound is a tertiary amine compound.

The amine compound may be a compound having at least one amine structure in a molecule, and the number of amine structures is not particularly limited. In a case of a compound having two or more amine structures in a molecule, the classification of the compound into the primary to tertiary amine structures is determined by the smallest series of amine structures in the compound. For example, in a case of a compound having both a tertiary amine structure and a secondary amine structure in a molecule, the compound is defined as the secondary amine compound.

Among the substituents of the nitrogen atom in the amine structure, examples of the aliphatic group include an alkyl group, an alkenyl group, an alkynyl group, and a heterocyclic group in which the atom bonded to the nitrogen atom is a carbon atom, and examples of the aromatic group include an aryl group and a heteroaryl group.

Among the substituents of the nitrogen atom in the amine structure, examples of the group other than the aliphatic group or the aromatic group include a halogen atom (such as a fluorine atom, a bromine atom, a chlorine atom, or an iodine atom), a hydroxy group, an alkoxy group, an aryloxy group, an alkylthio group, an arylthio group, an acyl group, an acyloxy group, an alkoxycarbonyl group, and an aryloxycarbonyl group.

Among the substituents of the nitrogen atom in the amine structure described above, the alkyl group, the alkenyl group, the alkynyl group, the heterocyclic group, the aryl group, the heteroaryl group, the alkoxy group, the aryloxy group, the alkylthio group, the arylthio group, the acyl group, the acyloxy group, the alkoxycarbonyl group, and the aryloxycarbonyl group may be unsubstituted or may further have a substituent.

Preferred examples of the heteroatoms of the heterocyclic group and the heteroaryl group as the ring-constituting atoms include a nitrogen atom, an oxygen atom, and a sulfur atom, and the number of heteroatoms contained in a ring-constituting atom is, for example, preferably in a range of 1 to 3. The number of ring members is not particularly limited as long as it can be employed, and for example, the number of ring members of the heterocyclic group is preferably in a range of 3 to 6, and the number of ring members of the heteroaryl group is preferably 5 or 6. Further, a monocyclic ring or a fused ring may be employed.

The substituent that the substituent of the nitrogen atom in the amine structure may further have is not particularly limited as long as the effect of the present invention can be obtained, and examples thereof include groups selected from a halogen atom (such as a fluorine atom, a bromine atom, a chlorine atom, or an iodine atom), a hydroxy group, an alkyl group, an alkenyl group, an alkynyl group, a heterocyclic group (here, the position of the bonding site is not limited to a carbon atom), an aryl group, a heteroaryl group (here, the position of the bonding site is not limited to a carbon atom), an alkoxy group, an aryloxy group, an alkylthio group, an arylthio group, an acyl group, an acyloxy group, an alkoxycarbonyl group, and an aryloxycarbonyl group, groups obtained by combining two or more of these groups, and polymerizable groups.

The description of the polymerizable group in Pol in General Formula (A) can be applied to the polymerizable group, and preferred examples thereof include a (meth) acryloyloxy group, a (meth)acryloylamino group, and a vinyl group.

In a case where a plurality of substituents of the nitrogen atom in the amine structure are present in a compound, the substituents may be the same as or different from each other.

The amine compound may be an aliphatic amine compound or an aromatic amine compound, but is preferably an aliphatic amine compound from the viewpoint of the ability to capture acids such as hydrogen ions.

Here, the aliphatic amine compound is a compound which contains at least one aliphatic group as a substituent of the nitrogen atom in the amine structure and contains no aromatic group. Further, the aromatic amine compound is a compound which contains at least one aromatic group as a substituent of the nitrogen atom in the amine structure.

From the viewpoint of further improving the light resistance, it is preferable that the amine compound is a tertiary aliphatic amine compound.

As described above, from the viewpoint of the ability to capture acids such as hydrogen ions, the pKa of the conjugate acid of the amine compound is preferably greater than the pKa of the conjugate acid of the polymerizable compound represented by General Formula (A) as the component A (hereinafter, also simply referred to as "pKa of the conjugate acid of the component A"), more preferably pKa+1 or greater of the conjugate acid of the component A, and still more preferably pKa+2 or greater of the conjugate acid of the component A.

The molecular weight (Mw) of the amine compound is preferably in a range of 90 to 5000, more preferably in a range of 100 to 5000, still more preferably in a range of 120 to 3000, and particularly preferably in a range of 150 to 1000.

In a case where a cured substance and the like are prepared using the curable composition according to the embodiment of the present invention, from the viewpoint that the amine compound is present in the cured substance after the heating step so that the effects of the present invention are exhibited, the boiling point (bp) of the amine compound at an atmospheric pressure (1013.25 hPa) is preferably 100° C. or higher, more preferably 150° C. or higher, and still more preferably 200° C. or higher.

(Primary Amine Compound)

Examples of the primary amine compound include an amine compound containing an alkyl group having 6 or more carbon atoms (preferably an alkyl group having 6 to 30 carbon atoms and more preferably an alkyl group having 6 to 20 carbon atoms), an amine compound containing an alkenyl group having 6 or more carbon atoms (preferably an alkenyl group having 6 to 30 carbon atoms and more preferably an alkenyl group having 6 to 20 carbon atoms), an amine compound containing an alkenyl group having 6 or more carbon atoms (preferably an alkynyl group having 6 to 30 carbon atoms and more preferably an alkynyl group having 6 to 20 carbon atoms), an amine compound containing an alicyclic hydrocarbon group having 6 or more carbon atoms (preferably a cycloalkyl group having 6 to 20 carbon atoms and more preferably a cycloalkyl group having 6 to 16 carbon atoms), and an amine compound containing an aryl group having 6 or more carbon atoms (preferably an aryl group having 6 to 20 carbon atoms and more preferably an aryl group having 6 to 16 carbon atoms), as a substituent of the nitrogen atom in the amine structure.

Each substituent of the nitrogen atom in the amine structure may be unsubstituted or may have a substituent.

In the amine compound, the number of carbon atoms in each substituent denotes the number of carbon atoms as an unsubstituted group.

Examples of the substituent that each substituent of the nitrogen atom in the amine structure may have include an alkyl group having 1 or more carbon atoms, an alkenyl group having 2 or more carbon atoms, an alkynyl group having 2 or more carbon atoms, an aryl group having 6 or more carbon atoms, a halogen atom (such as a fluorine atom, a bromine atom, a chlorine atom, or an iodine atom), a hydroxy group, an alkoxy group having 1 or more carbon atoms, an aryloxy group having 6 or more carbon atoms, an alkylthio group having 1 or more carbon atoms, an arylthio group having 6 or more carbon atoms, an acyl group having 1 or more carbon atoms, an acyloxy group having 2 or more carbon atoms, an alkoxycarbonyl group having 2 or more carbon atoms, and an aryloxycarbonyl group having 7 or more carbon atoms. The number of these groups is not particularly limited and may be one or two or more.

The number of carbon atoms of each substituent that each substituent of the nitrogen atom in the above amine structure may have is as follows.

The number of carbon atoms of the alkyl group is preferably in a range of 1 to 15 and more preferably in a range of 1 to 10, the number of carbon atoms of the alkenyl group is preferably in a range of 2 to 15 and more preferably in a range of 2 to 10, the number of carbon atoms of the alkynyl group is preferably in a range of 2 to 15 and more preferably in a range of 2 to 10, and the number of carbon atoms of the aryl group is preferably in a range of 6 to 20 and more preferably in a range of 6 to 16. The description of the number of carbon atoms of the alkyl group can be preferably applied to the number of carbon atoms of the alkyl group moiety in the alkoxy group, the alkylthio group, the acyl group, the acyloxy group, and the alkoxycarbonyl group. Further, the description of the number of carbon atoms of the aryl group can be preferably applied to the number of carbon atoms of the aryl group moiety in the aryloxy group, the arylthio group, and the aryloxycarbonyl group.

(Secondary Amine Compound)

Examples of the secondary amine compound include an amine compound containing a total of two groups selected from an alkyl group having 3 or more carbon atoms (preferably an alkyl group having 3 to 20 carbon atoms and more preferably an alkyl group having 3 to 20 carbon atoms), an alkenyl group having 3 or more carbon atoms (preferably an alkenyl group having 3 to 30 carbon atoms and more preferably an alkenyl group having 3 to 20 carbon atoms), an alkynyl group having 3 or more carbon atoms (preferably an alkynyl group having 3 to 30 carbon atoms and more preferably an alkynyl group having 3 to 20 carbon atoms), an alicyclic hydrocarbon group having 3 or more carbon atoms (preferably a cycloalkyl group having 3 to 20 carbon atoms and more preferably a cycloalkyl group having 6 to 16 carbon atoms), and an aryl group having 6 or more carbon atoms (preferably an aryl group having 6 to 20 carbon atoms and more preferably an aryl group having 6 to 16 carbon atoms), as a substituent of the nitrogen atom in the amine structure.

Each substituent of the nitrogen atom in the amine structure may be unsubstituted or may have a substituent.

The description of the substituent that each substituent of the nitrogen atom in the amine structure of the primary amine compound may have can be applied to the substituent that each substituent of the nitrogen atom in the amine structure.

The two substituents of the nitrogen atom in the amine structure may be the same as or different from each other.

(Tertiary Amine Compound)

Examples of the tertiary amine compound include an amine compound containing a total of three groups selected from an alkyl group, an alkenyl group, an alkynyl group, an aryl group, a heterocyclic group (which may be aliphatic or aromatic), and an alicyclic hydrocarbon group (which may be saturated or unsaturated), as three substituents of the nitrogen atom on the amine.

The total number of carbon atoms of the three substituents is preferably in a range of 4 to 30, more preferably in a range of 6 to 25, and still more preferably in a range of 8 to 20.

The description of the heterocyclic group and the heteroaryl group in the substituent of the nitrogen atom in the amine structure can be preferably applied to the heterocyclic group by setting the number of carbon atoms constituting the ring to 4 or greater. The number of carbon atoms constituting the ring is preferably in a range of 4 to 15 and more preferably in a range of 4 to 9. The number of atoms constituting the ring is preferably 5 to 16, more preferably 5 to 10.

As the alicyclic hydrocarbon group, a cycloalkyl group is preferable, and the number of carbon atoms thereof is preferably in a range of 3 to 20 and more preferably in a range of 6 to 16.

The description of the number of carbon atoms in each substituent that each substituent of the nitrogen atom in the amine structure of the primary amine compound may have can be preferably applied to the number of carbon atoms of the alkyl group, the alkenyl group, the alkynyl group, and the aryl group.

Each substituent of the nitrogen atom in the amine structure may be unsubstituted or may have a substituent.

The description of the substituent that each substituent of the nitrogen atom in the amine structure of the primary amine compound may have can be applied to the substituent that each substituent of the nitrogen atom in the amine structure.

The three substituents of the nitrogen atom in the amine structure may be the same as or different from each other.

The content of the amine compound as the component C in the curable composition according to the embodiment of the present invention is preferably in a range of 0.01% to 2% by mass, and from the viewpoint of further improving the light resistance, more preferably in a range of 0.01% to 1.0% by mass and still more preferably in a range of 0.01% to 0.7% by mass with respect to the total solid content of the curable composition.

Further, the blending amount of the component C with respect to 1 part by mass of the component B in the curable composition according to the embodiment of the present invention is preferably in a range of 0.1 to 20 parts by mass, more preferably in a range of 0.3 to 15 parts by mass, and still more preferably in a range of 0.5 to 10 parts by mass.

As a specific amine compound, a compound represented by General Formula (C) is preferable.

General Formula (C)

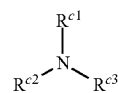

In the formula, $R^{c1}$ represents a group selected from an unsubstituted alkyl group having 4 or more carbon atoms (which may be chain-like or cyclic, and the number of carbon atoms is preferably in a range of 4 to 30 and more preferably in a range of 4 to 20), an aryl group having 6 or more carbon atoms (the number of carbon atoms is preferably in a range of 6 to 20 and more preferably in a range of 6 to 16), and a heterocyclic group having 4 or more carbon atoms constituting the ring (which may be aliphatic or aromatic, and the description of the heterocyclic group and the heteroaryl group can be preferably applied), a hydroxyalkyl group having 2 or more carbon atoms (the number of carbon atoms is preferably in a range of 2 to 6 and more preferably in a range of 2 to 4), and an alkyl group having 2 or more carbon atoms which has a (meth)acryloyloxy group as a substituent (the number of carbon atoms does not include the number of carbon atoms in the (meth)acryloyloxy group, and the number of carbon atoms is preferably in a range of 2 to 6 and more preferably in a range of 2 to 4) or a group obtained by combining two or more of these groups.

$R^{c2}$ and $R^{c3}$ each independently represent a hydrogen atom, an acyclic alkyl group having 1 or more carbon atoms (preferably 1 to 10 carbon atoms and more preferably 1 to 6 carbon atoms), an aryl group having 6 or more carbon atoms (preferably 6 to 20 carbon atoms and more preferably 6 to 16 carbon atoms), or a hydroxyalkyl group having 2 or more carbon atoms (preferably 2 to 6 carbon atoms and more preferably 2 to 4 carbon atoms).

Here, in a case where the number of carbon atoms of $R^{c1}$ is less than 6, both $R^{c2}$ and $R^{c3}$ do not represent a hydrogen atom at the same time.

Further, a compound in which the amine compounds represented by Formula (C) are linked to each other in the form of removing hydrogen atoms from any substituent of $R^{c1}$ to $R^{c3}$ to form two or more multimers is also preferable.

As the compound represented by Formula (C), it is preferable that $R^{c1}$ represents a group selected from an unsubstituted alkyl group having 4 or more carbon atoms, an aryl group having 6 or more carbon atoms, a heterocyclic group having 4 or more carbon atoms constituting the ring, a hydroxyalkyl group having 2 or more carbon atoms, and an alkyl group having 2 or more carbon atoms which has a (meth)acryloyloxy group as a substituent or a group obtained by combining two or more of these substituents and $R^{c2}$ and $R^{c3}$ each independently represent an acyclic alkyl group having 1 or more carbon atoms, an aryl group having 6 or more carbon atoms, or a hydroxyalkyl group having 2 or more carbon atoms and more preferable that $R^{c1}$ represents a group selected from an unsubstituted alkyl group having 4 or more carbon atoms, a heterocyclic group having 4 or more carbon atoms constituting the ring (here, a heteroaryl group is excluded), a hydroxyalkyl group having 2 or more carbon atoms, and an alkyl group having 2 or more carbon atoms which has a (meth)acryloyloxy group as a substituent or a group obtained by combining two or more of these groups and $R^{c2}$ and $R^{c3}$ each independently represent an acyclic alkyl group having 1 or more carbon atoms or a hydroxyalkyl group having 2 or more carbon atoms from the viewpoint of further improving the light resistance.

More specific examples of the compound represented by Formula (C) includes the following amine compounds. The term "hydrogen" in the table below denotes a hydrogen atom.

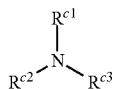

| | $R^{c1}$ | $R^{c2}$ | $R^{c3}$ |
|---|---|---|---|
| (C-1) | n--Butyl group | n-Butyl group | Hydrogen |
| (C-2) | n-Butyl group | n-Butyl group | Methyl group |
| (C-3) | n-Butyl group | n-Butyl group | 2-Hydroxyethyl group |
| (C-4) | Isobutyl group | Isobutyl group | Isobutyl group |
| (C-5) | Phenyl group | Phenyl group | Hydrogen |
| (C-6) | Phenyl group | Phenyl group | Methyl group |
| (C-7) | Phenyl group | Methyl group | Methyl group |
| (C-8) | 4-Pyridyl group | Methyl group | Methyl group |
| (C-9) | 1-Naphthyl group | Methyl group | Methyl group |
| (C-10) | 2-Naphthyl group | Methyl group | Methyl group |
| (C-11) | Benzyl group | Methyl group | Methyl group |
| (C-12) | n-Dodecyl group | Hydrogen | Hydrogen |
| (C-13) | Benzyl group | 2-Hydroxyethyl group | 2-Hydroxyethyl group |
| (C-14) | Cyclohexyl group | Methyl group | Methyl group |
| (C-15) | (2-Hydroxyethoxy)ethyl group | Methyl group | Methyl group |

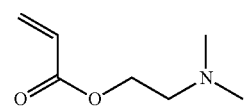

(C-16)

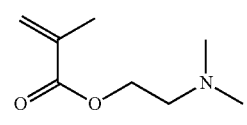

(C-17)

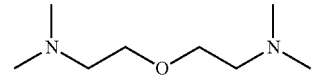

(C-18)

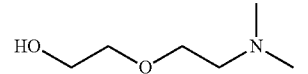

(C-19)

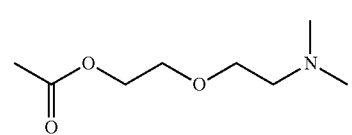

(C-20)

[Component D: Compound Represented by General Formula (D)]

It is preferable that the curable composition according to the embodiment of the present invention contains a compound represented by General Formula (D).

The curable composition according to the embodiment of the present invention contains a compound represented by General Formula (D) in addition to the component A which is the polymerizable compound having a nitrogen-containing fused aromatic ring represented by General Formula (A) as a partial structure, the component B which is the acylphosphine oxide photopolymerization initiator, and the component C which is the amine compound, and thus the obtained cured substance has more excellent light resistance.

Without being bound by any particular theory, in a case where the curable composition according to the embodiment of the present invention further contains a compound represented by General Formula (D), since energy transfer occurs from the polymerizable compound represented by General Formula (A) which is excited by absorbing light to the compound represented by General Formula (D) in the obtained cured substance and the state of the compound represented by General Formula (A) is returned to a ground state, the photoreaction (photodegradation) of the compound represented by General Formula (A) is considered to be suppressed.

That is, it is presumed that the compound represented by General Formula (D) acts as a quencher.

(Compound Represented by General Formula (D))

The compound represented by General Formula (D) is an unsaturated carbonyl compound and has a diene structure or a double bond directly bonded to an aromatic ring.

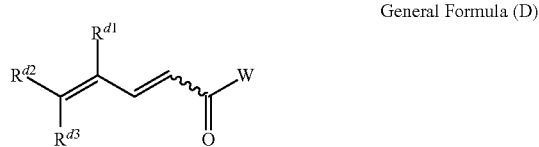

General Formula (D)

in the formula, $R^{d1}$, $R^{d2}$, and $R^{d3}$ each independently represent a hydrogen atom or a substituent, and W represents a hydrogen atom or a substituent, and $R^{d1}$ and $R^{d2}$ or $R^{d2}$ and $R^{d3}$ may be bonded to each other to form a ring which may have a substituent.

The wavy line denotes that a cis structure or a trans structure may be employed.

Examples of the substituents that can be employed as $R^{d1}$ to $R^{d3}$ include an alkyl group which may have a substituent, an alkenyl group which may have a substituent, an aromatic hydrocarbon group which may have a substituent, an aromatic heterocyclic group which may have a substituent, a cycloalkyl group which may have a substituent, a cycloalkenyl group which may have a substituent, an alkoxy group which may have a substituent, and an alkenyloxy group which may have a substituent.

Hereinafter, the number of carbon atoms and the like of the substituents that can be employed as $R^{d1}$ to $R^{d3}$ will be described in detail. In the compound represented by General Formula (D), hereinafter, the number of carbon atoms of the substituent denotes the number of carbon atoms in a case of an unsubstituted substituent. Further, in a case of a substituent having a substituent, the number of carbon atoms of the substituent denotes the number of carbon atoms in a state where a substituent is not present (that is, an unsubstituted state).

The number of carbon atoms of the alkyl group that can be employed as $R^{d1}$ to $R^{d3}$ is preferably in a range of 1 to 6, more preferably in a range of 1 to 4, and still more preferably 1 or 2.

The number of carbon atoms of the alkenyl group that can be employed as $R^{d1}$ to $R^{d3}$ is preferably in a range of 2 to 6, more preferably in a range of 2 to 4, and still more preferably 2.

The number of carbon atoms of the aromatic hydrocarbon group that can be employed as $R^{d1}$ to $R^{d3}$ is preferably in a range of 6 to 14, more preferably in a range of 6 to 10, and still more preferably 6.

The number of carbon atoms of the cycloalkyl group that can be employed as $R^{d1}$ to $R^{d3}$ is preferably in a range of 3 to 15, more preferably in a range of 5 to 12, and still more preferably in a range of 6 to 10.

The number of carbon atoms of the cycloalkenyl group that can be employed as $R^{d1}$ to $R^{d3}$ is preferably in a range of 4 to 15, more preferably in a range of 5 to 12, and still more preferably in a range of 6 to 10.

The description of the aromatic heterocyclic group at the beginning can be preferably applied to the aromatic heterocyclic group that can be employed as $R^{d1}$ to $R^{d3}$.

The numbers of carbon atoms of the alkoxy group and the alkenyloxy group that can be employed as $R^{d1}$ to $R^{d3}$ are the same as the description of the numbers of carbon atoms of the alkyl group and the alkenyl group that can be employed as $R^{d1}$ to $R^{d3}$.

In the examples of the substituents that can be employed as $R^{d1}$ to $R^{d3}$, examples of the substituent that each substituent may have include an alkoxy group having 1 to 6 carbon atoms, a halogen atom (such as a fluorine atom, a chlorine atom, or a bromine atom), a hydroxy group, a cyano group, a nitro group, a nitroso group, a carboxy group, an alkoxycarbonyl group having 2 to 6 carbon atoms, an alkylcarbonyloxy group with 2 to 6 carbon atoms, and an alkylcarbonyl group having 2 to 6 carbon atoms, and a crosslinkable group. Among these, a halogen atom, a cyano group, an alkylcarbonyloxy group, a hydroxy group, an alkoxy group, or a crosslinkable group is preferable.

The description of the polymerizable group in Pol in the General Formula (A) can be applied to the examples of the crosslinkable group, and preferred examples thereof include a (meth)acryloyloxy group, a (meth)acryloylamino group, and a vinyl group.

Hereinafter, the same applies to the crosslinkable group in the compound represented by General Formula (D), (D1), or (D2).

$R^{d1}$ and $R^{d2}$, or $R^{d2}$ and $R^{d3}$ may be bonded to each other to form a ring. In particular, it is preferable that $R^{d1}$ and $R^{d2}$ are bonded to each other to form a ring.

In a case where $R^{d1}$ and $R^{d2}$, and $R^{d2}$ and $R^{d3}$ do not form a ring by being bonded to each other, it is preferable that $R^{d1}$ and $R^{d3}$ represent a hydrogen atom and $R^{d2}$ represents an alkyl group or an aryl group.

Examples of the ring formed by $R^{d1}$ and $R^{d2}$ being bonded to each other include an aromatic hydrocarbon ring, an aromatic heterocyclic ring, and an unsaturated hydrocarbon ring, and specific examples thereof include a benzene ring, a cyclohexene ring, and a tetrahydrofuran ring. Among these, a benzene ring is preferable.

Examples of the ring formed by $R^{d2}$ and $R^{d3}$ being bonded to each other include a saturated hydrocarbon ring and an unsaturated hydrocarbon ring, and examples thereof include a cyclohexane ring and a cyclohexene ring.

The ring formed by $R^{d1}$ and $R^{d2}$ or $R^{d2}$ and $R^{d3}$ being bonded to each other may be unsubstituted or may have a substituent.

Examples of the substituent that the ring formed by $R^{d1}$ and $R^{d2}$ or $R^{d2}$ and $R^{d3}$ being bonded to each other may have include an alkyl group, an alkenyl group, an aliphatic ring group, an alkoxy group, an alkenyloxy group, an alkylcarbonyloxy group, a hydroxy group, a halogen atom (such as a fluorine atom, a chlorine atom, or a bromine atom), a cyano group, and a crosslinkable group.

The description of the corresponding substituent in the description of each substituent that can be employed as $R^{d1}$ to $R^{d3}$ can be preferably applied to each substituent that the above-described ring may have.

As the substituent that the ring formed by $R^{d1}$ and $R^{d2}$ or $R^{d2}$ and $R^{d3}$ being bonded to each other may have, an alkoxy group having 1 to 6 carbon atoms, a halogen atom, a hydroxy group, a cyano group, an alkylcarbonyloxy group having 2 to 6 carbon atoms, or a crosslinkable group is preferable.

Examples of the substituent that can be employed as W include an alkyl group that may have a substituent, an alkoxy group that may have a substituent, an aryloxy group that may have a substituent, an alkenyloxy group that may have a substituent, a hydroxy group, and a crosslinkable group.

The description of the corresponding substituent in the description of each substituent that can be employed as $R^{d1}$ to $R^{d3}$ can be preferably applied to each substituent that can be employed as W.

In the examples of the substituent that can be employed as W, examples of the substituent that each substituent may have include an alkoxy group having 1 to 6 carbon atoms, a halogen atom (such as a fluorine atom, a chlorine atom, or a bromine atom), a hydroxy group, an aromatic hydrocarbon group, and a crosslinkable group.

The description of the alkoxy group having 1 to 6 carbon atoms and the aromatic hydrocarbon group that can be preferably employed as $R^{d1}$ to $R^{d3}$ can be preferably applied to the alkoxy group having 1 to 6 carbon atoms and the aromatic hydrocarbon group that the substituent which can be employed as W may have.

W represents a hydrogen atom, an alkyl group which may have a substituent, an alkoxy group which may have a substituent, an aryloxy group which may have a substituent, an alkenyloxy group which may have a substituent, a hydroxy group, or a crosslinking group and more preferably an alkyl group which may have a substituent, an alkoxy group which may have a substituent, an aryloxy group which may have a substituent, a hydroxy group, or a crosslinking group.

In the compound represented by General Formula (D), the wavy line portion in the formula may have a cis structure or a trans structure, but a trans structure is preferable.

That is, it is preferable that the compound represented by General Formula (D) is a compound represented by General Formula (D1). $R^{d1}$ to $R^{d3}$ and W in the following formula each have the same definition as that for $R^{d1}$ to $R^{d3}$ and W in Formula (D).

General Formula (D1)

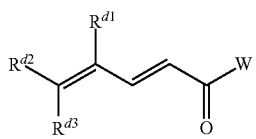

From the viewpoint of further improving the light resistance, it is more preferable that the compound represented by General Formula (D) is a compound represented by General Formula (D2).

General Formula (D2)

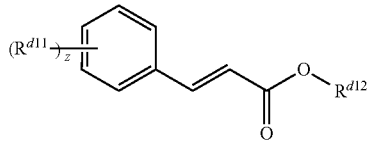

In the formula, $R^{d11}$ represents a substituent, $R^{d12}$ represents a hydrogen atom or a substituent, and z represents an integer of 0 to 5.

Examples of the substituent as $R^{d11}$ include an alkyl group, an alkenyl group, an alkoxy group, an alkenyloxy group, an alkylcarbonyloxy group, a cyano group, a halogen atom, and a hydroxy group. Further, these groups may be further substituted with a crosslinkable group.

The description of the alkyl group, the alkenyl group, the alkoxy group, the alkenyloxy group, the alkylcarbonyloxy group, and the halogen atom in the description of the substituent that the ring formed by $R^{d1}$ and $R^{d2}$ or $R^{d2}$ and $R^{d3}$ being bonded to each other may have can be preferably applied to the alkyl group, the alkenyl group, the alkoxy group, the alkenyloxy group, the alkylcarbonyloxy group, and the halogen atom that can be employed as $R^{d11}$.

In a case where z represents 2 or greater, a plurality of $R^{d11}$'s may be the same as or different from each other.

Examples of the substituent that can be employed as $R^{d12}$ include an alkyl group, an alkenyl group, and an aromatic hydrocarbon group. These groups may be further substituted with a crosslinkable group.

The description of the alkyl group in the alkoxy group, the alkenyl group in the alkenyloxy group, and the aromatic hydrocarbon group (aryl group) in the aryloxy group in the description of the substituent that can be employed as W can be preferably applied to the alkyl group, the alkenyl group, and the aromatic hydrocarbon group that can be employed as $R^{d12}$.

z represents preferably an integer of 0 to 5, more preferably an integer of 0 to 2, and still more preferably an integer of 0 or 1.

The compound represented by General Formula (D) may be a polymer polymerized via a crosslinkable group contained in any of $R^{d1}$ to $R^{d3}$.

The polymer may be a polymer formed of a single monomer or may be a copolymer formed of two or more kinds of monomers.

As the two or more kinds of monomers constituting the copolymer, other monomers may be used as long as the polymer includes a compound represented by General Formula (D) and containing a crosslinkable group. Examples thereof include a styrene-based monomer such as styrene, α-methylstyrene, vinyltoluene, or t-butylstyrene; a (meth) acrylic acid ester such as methyl (meth)acrylate, ethyl (meth)acrylate, n-butyl (meth)acrylate, isobutyl (meth)acrylate, isopentyl (meth)acrylate, n-hexyl (meth)acrylate, isooctyl (meth)acrylate, 2-ethylhexyl (meth)acrylate, n-octyl (meth)acrylate, isononyl (meth)acrylate, n-decyl (meth) acrylate, isodecyl (meth)acrylate, or isobornyl (meth)acrylate; an unsaturated carboxylic acid such as (meth)acrylic acid, itaconic acid, crotonic acid, isocrotonic acid, or maleic acid; α-olefin such as ethylene, propylene, 1-butene, 2-methyl-1-butene, 1-pentene, 4-methyl-1-pentene, 1-hexene, 1-octene, 1-decene, or 1-octadecene; and norbornene.

Hereinafter, specific examples of the compound represented by General Formula (D) which is preferably used in the curable composition according to the embodiment of the present invention are shown below, but examples are not limited to the following compounds.

(D-1)

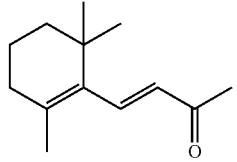

-continued
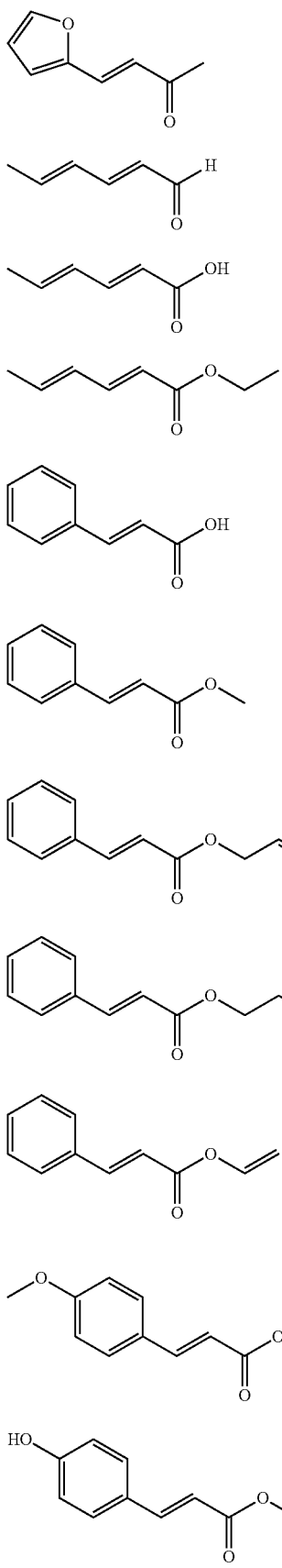
(D-2)
(D-3)
(D-4)
(D-5)
(D-6)
(D-7)
(D-8)
(D-9)
(D-10)
(D-11)
(D-12)
-continued
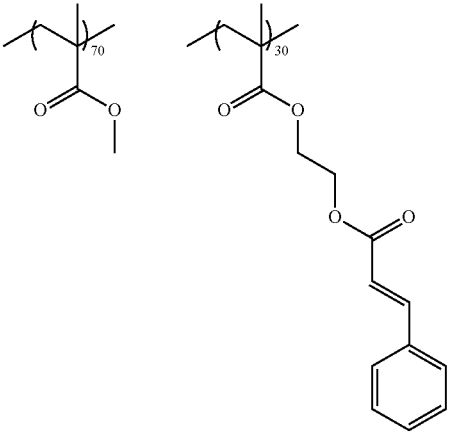
(D-13)
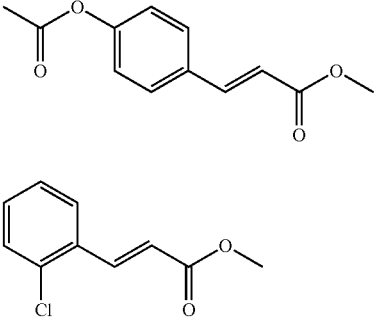
(D-14)
(D-15)
(D-16)
(D-17)
(D-18)
(D-19)
(D-20)

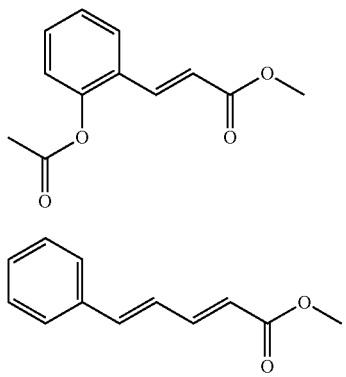

(D-21)

(D-22)

In a case where the curable composition according to the embodiment of the present invention contains a compound represented by General Formula (D), the content of the compound represented by General Formula (D) in the curable composition according to the embodiment of the present invention is preferably in a range of 1% to 30% by mass, more preferably in a range of 2% to 25% by mass, still more preferably in a range of 3% to 20% by mass, and particularly preferably in a range of 3% to 10% by mass with respect to the total solid content of the curable composition. In a case where the content of the compound represented by General Formula (D) is set to be in the above-described preferable range, the cured substance obtained from the curable composition according to the embodiment of the present invention can achieve both light resistance and optical characteristics (a low Abbe number and high partial dispersion ratios).

Further, the content of the compound represented by General Formula (D) in the curable composition according to the embodiment of the present invention is preferably in a range of 1 to 40 parts by mass, more preferably in a range of 2 to 30 parts by mass, and still more preferably in a range of 3 to 25 parts by mass with respect to 100 parts by mass of the component A.

[(Meth)Acrylate Monomer]

The curable composition according to the embodiment of the present invention may contain a (meth)acrylate monomer. The (meth)acrylate monomer may be a polyfunctional (meth)acrylate monomer containing two or more (meth) acryloyl groups in a molecule or may be a monofunctional (meth)acrylate monomer containing one (meth)acryloyl group in a molecule.

Examples of the (meth)acrylate monomer used in the present invention include a monomer 1 (phenoxyethyl acrylate), a monomer 2 (benzyl methacrylate), a monomer 3 (tricyclodecanedimethanol diacrylate), a monomer 4 (dicyclopentanyl acrylate), a monomer 5 (1,6-hexanediol diacrylate), a monomer 6 (1,6-hexanediol dimethacrylate), a monomer 7 (benzyl acrylate), a monomer 8 (isobornyl methacrylate), a monomer 9 (dicyclopentanyl methacrylate), or a monomer 10 (dodecyl methacrylate). Further, specific examples of the (meth)acrylate monomer include (meth) acrylate monomers described in paragraphs 0037 to 0046 of JP2012-107191A.

The molecular weight of the (meth)acrylate monomer is preferably in a range of 100 to 500.

Hereinafter, specific examples of the (meth)acrylate monomer preferably used in the curable composition according to the embodiment of the present invention will be shown, but the present invention is not limited to the following compounds.

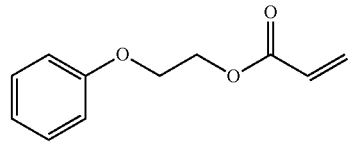

(M-1)

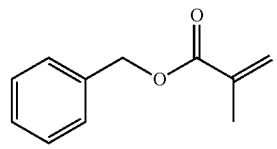

(M-2)

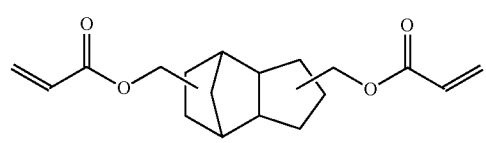

(M-3)

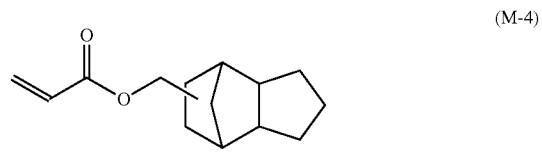

(M-4)

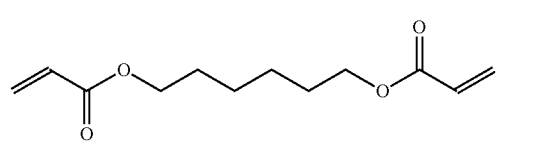

(M-5)

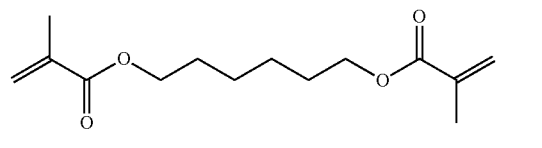

(M-6)

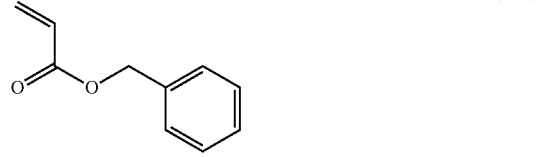

(M-7)

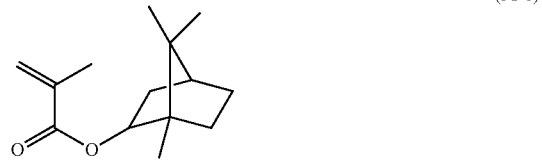

(M-8)

(M-9)

(M-10)

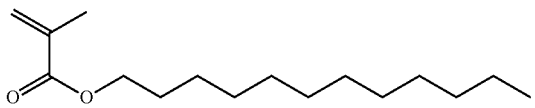

The method of obtaining the (meth)acrylate monomer is not particularly limited, and the (meth)acrylate monomer may be obtained commercially or produced synthetically. In a case where the (meth)acrylate monomer is commercially available, preferred examples thereof include VISCOAT #192 PEA (monomer 1) (manufactured by Osaka Organic Chemical Industry Ltd.), Light Ester Bz (monomer 2) (manufactured by Kyocisha Chemical Co., Ltd.), A-DCP (monomer 3) (manufactured by Shin-Nakamura Chemical Co., Ltd.), FA-513AS (monomer 4) (manufactured by Hitachi Chemical Co., Ltd.), A-HD-N (monomer 5) (manufactured by Shin-Nakamura Chemical Co., Ltd.), HD-N (monomer 6) (manufactured by Shin-Nakamura Chemical Co., Ltd.), FA-BZA (monomer 7) (manufactured by Hitachi Chemical Co., Ltd.), Light Ester IB-X (monomer 8) (manufactured by Kyoeisha Chemical Co., Ltd.), FA-513M (monomer 9) (manufactured by Hitachi Chemical Co., Ltd.), and Light Ester L (monomer 10) (manufactured by Kyoeisha Chemical Co., Ltd.).

In a case where the curable composition contains a (meth)acrylate monomer, the content of the (meth)acrylate monomer is preferably in a range of 1% to 80% by mass, more preferably in a range of 2% to 50% by mass, and still more preferably in a range of 3% to 40% by mass with respect to the total solid content of the curable composition. The function of relieving the stress in a case where the cured substance is thermally changed can be adjusted by adjusting the amount of the (meth)acrylate monomer in the curable composition.

[Polymer Containing Radically Polymerizable Group in Side Chain]

The curable composition according to the embodiment of the present invention may further contain a polymer containing a radically polymerizable group in a side chain, in addition to the above-described compound. The polymer containing a radically polymerizable group in a side chain functions to increase the viscosity of the curable composition, and thus the polymer can also be referred to as a thickener or a thickening polymer. The polymer containing a radically polymerizable group in a side chain can be added for adjusting the viscosity of the curable composition.

The polymer containing a radically polymerizable group in a side chain may be a homopolymer or a copolymer. Among these, it is preferable that the polymer containing a radically polymerizable group in a side chain is a copolymer. In a case where the polymer containing a radically polymerizable group in a side chain is a copolymer, it is sufficient for a copolymer component on at least one side to have a radically polymerizable group. In addition, in the case where the polymer containing a radically polymerizable group in a side chain is a copolymer, it is more preferable that the polymer is a copolymer having a monomer unit containing a radically polymerizable group in a side chain and a monomer unit containing an aromatic hydrocarbon group in a side chain.

The above-described copolymer may be a copolymer in any of a random form, a block form, or the like.

Examples of the radically polymerizable group include a (meth)acrylate group, a vinyl group, a styryl group, and an allyl group. In the polymer containing a radically polymerizable group in a side chain, the content of a structural unit containing a radically polymerizable group is preferably in a range of 5% to 100% by mass, more preferably in a range of 10% to 90% by mass, and still more preferably in a range of 20% to 80% by mass.

Specific examples of the polymer containing a radically polymerizable group in a side chain which is preferably used in the present invention are shown below, but the polymer containing a radically polymerizable group in a side chain is not limited to the following structures. Each of the specific examples shown below is a copolymer, and each copolymer has two or three structural units described in close proximity. For example, the specific example described on the top left end is an allyl methacrylate-benzyl methacrylate copolymer.

In the following structural formulae, Ra and Rb each independently represent a hydrogen atom or a methyl group. Further, a plurality of Ra's in one polymer may be the same as or different from each other. In addition, n represents an integer of 0 to 10, preferably 0 to 2, and more preferably 0 or 1. The amount ratio of each structural unit in the copolymer is not particularly limited, and the description above can be preferably applied to the content of the structural unit containing a radically polymerizable group in the copolymer.

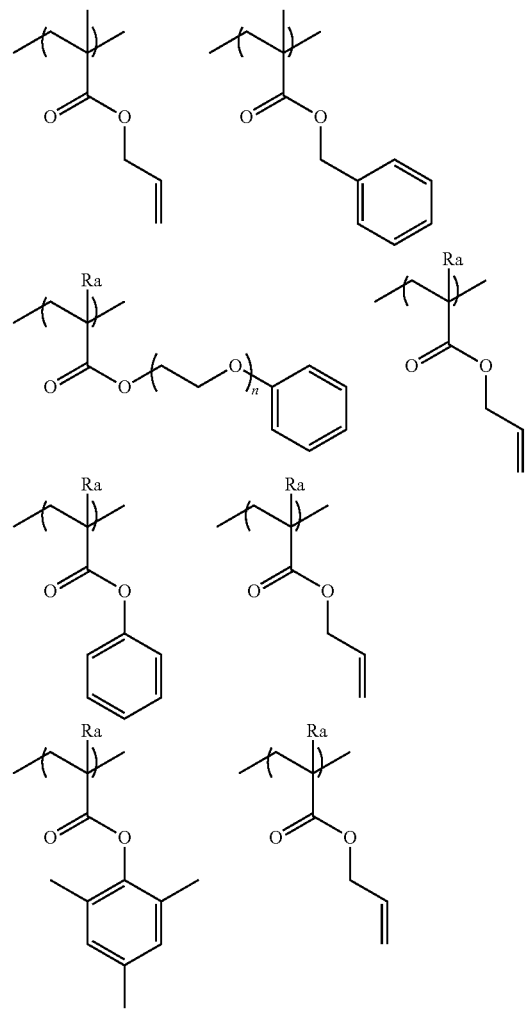

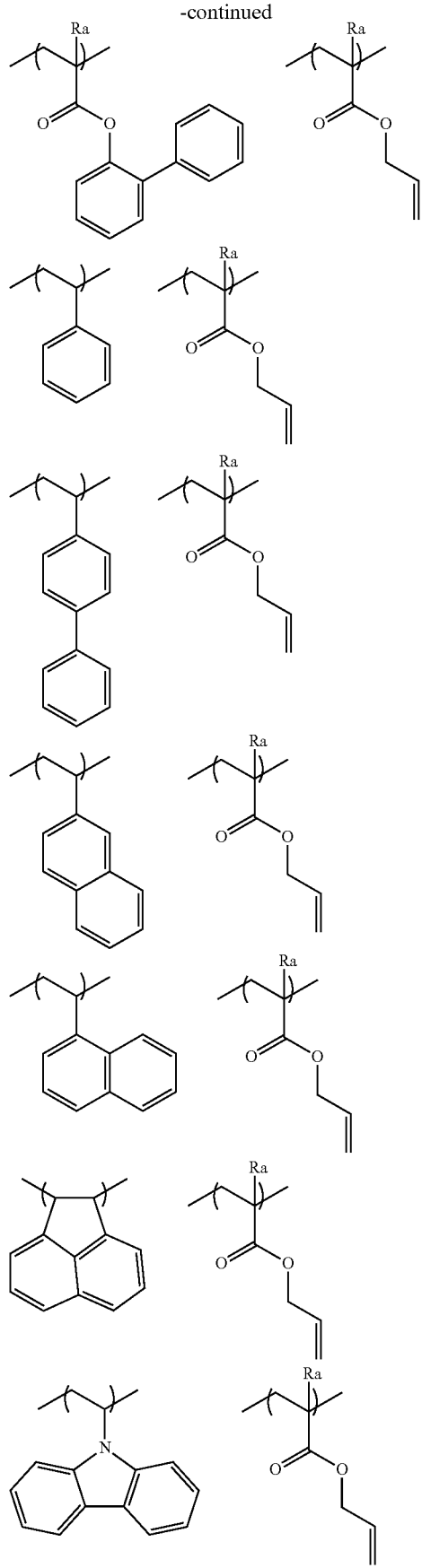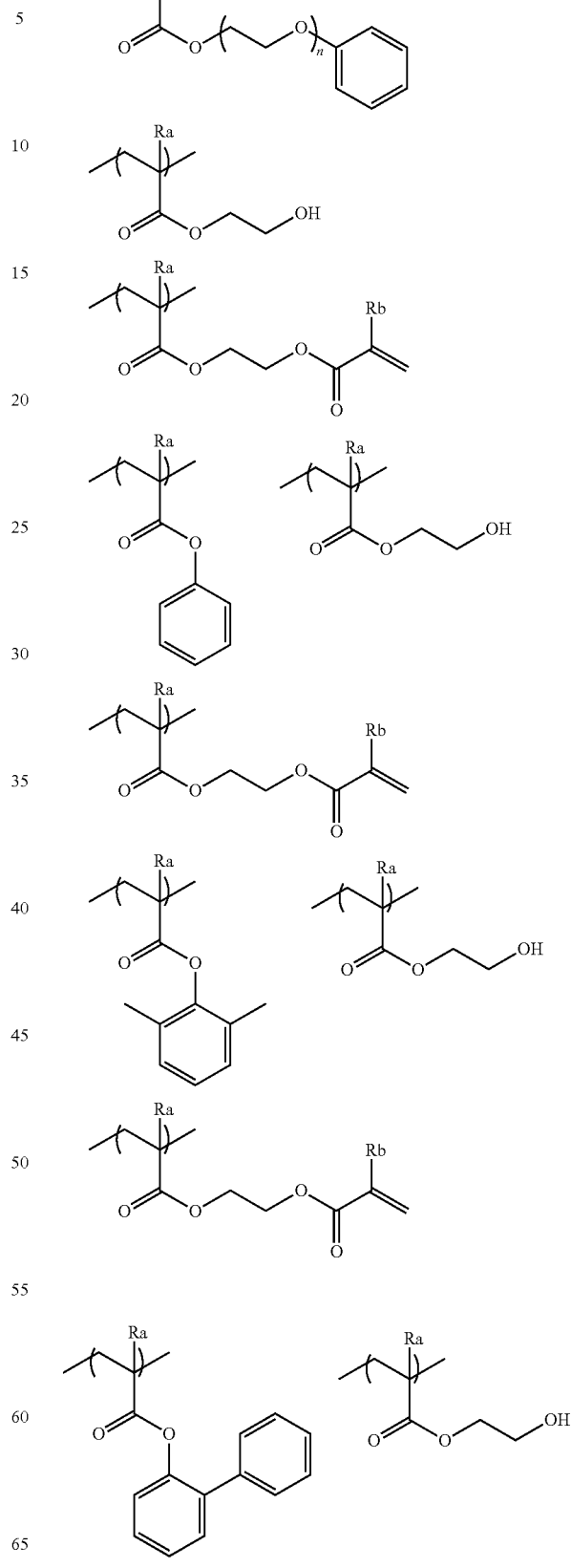

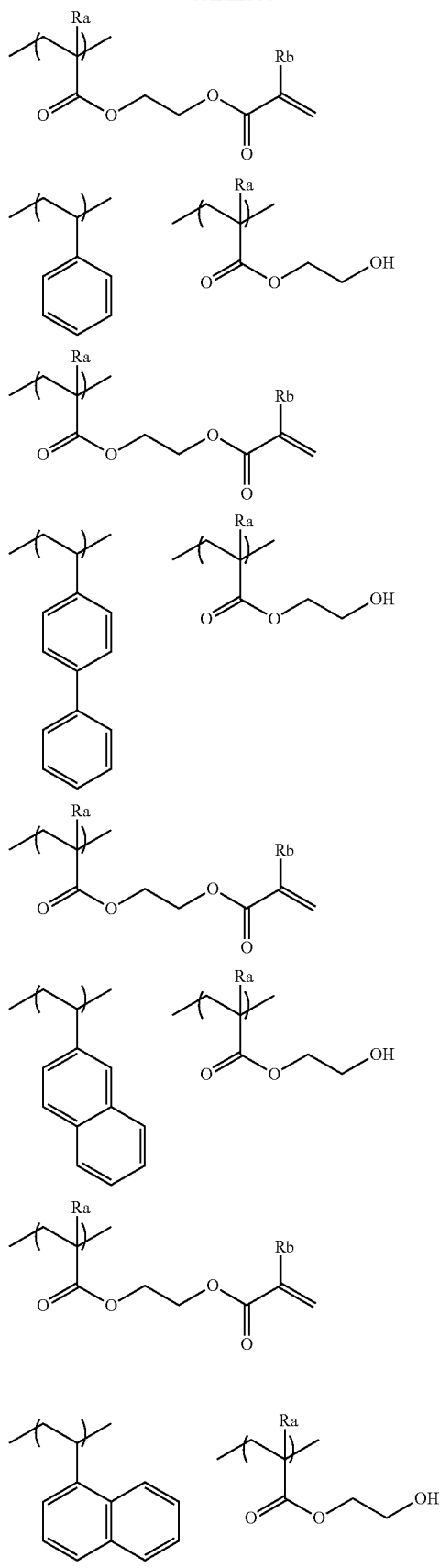
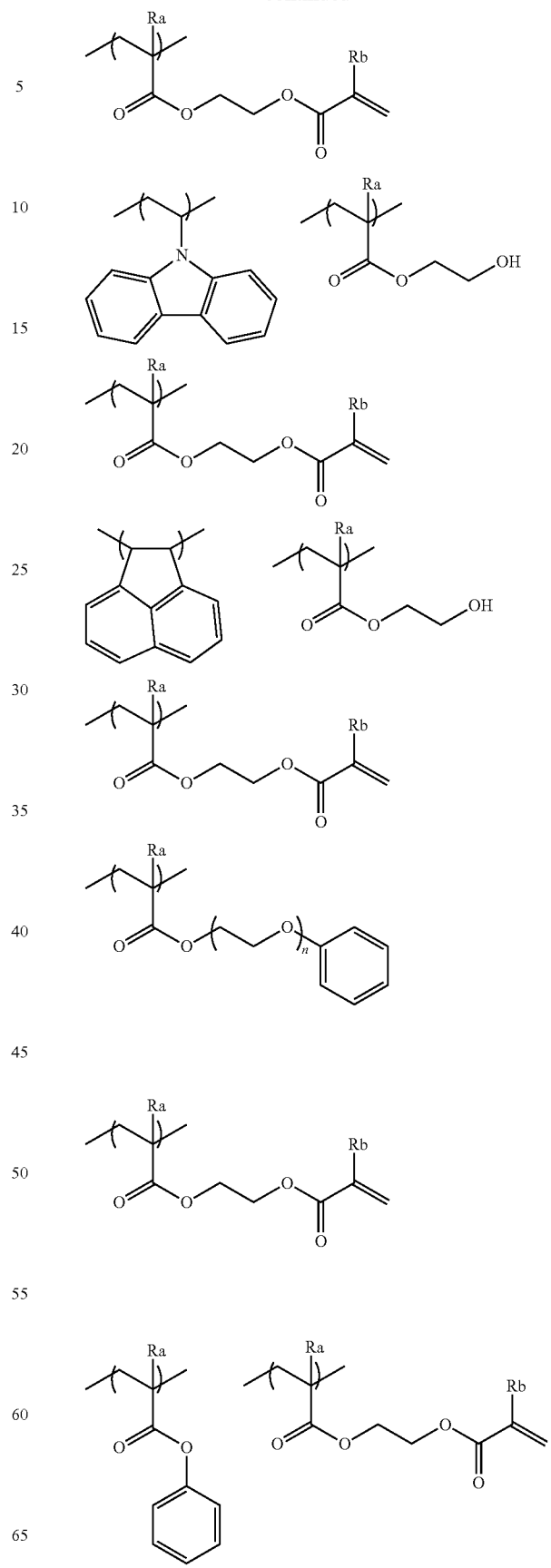

-continued

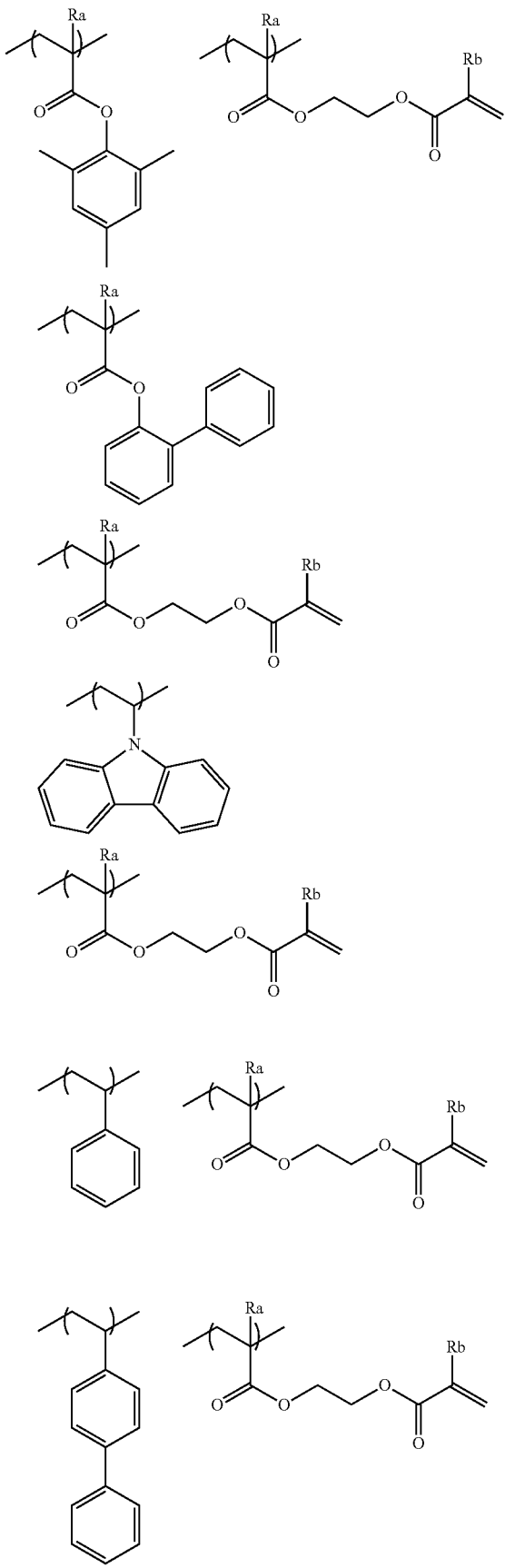

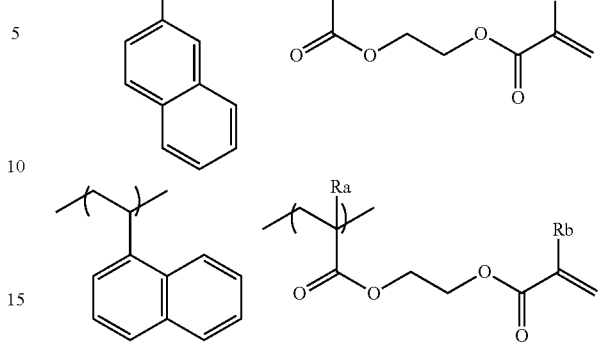

The molecular weight (weight-average molecular weight) of the polymer containing a radically polymerizable group in a side chain is preferably in a range of 1,000 to 10,000,000, more preferably in a range of 5,000 to 300,000, and still more preferably in a range of 10,000 to 200,000. Further, the glass transition temperature of the polymer containing a radically polymerizable group in a side chain is preferably in a range of 50° C. to 400° C., more preferably in a range of 70° C. to 350° C., and still more preferably in a range of 100° C. to 300° C.

The content of the polymer containing a radically polymerizable group in a side chain is preferably 40% by mass or less, more preferably 30% by mass or less, and still more preferably 25% by mass or less with respect to the total solid content of the curable composition. Further, the content of the polymer containing a radically polymerizable group in a side chain may be 0% by mass, and an aspect in which the polymer containing a radically polymerizable group in a side chain is not added is also preferable.

[Polymerization Initiator]

The curable composition according to the embodiment of the present invention may contain a thermal radical polymerization initiator in addition to the acylphosphine oxide photopolymerization initiator which is the component B and and may contain a photoradical polymerization initiator other than the acylphosphine oxide photopolymerization initiator which is the component B.

(Thermal Radical Polymerization Initiator)

It is preferable that the curable composition according to the embodiment of the present invention contains a thermal radical polymerization initiator. The curable composition according to the embodiment of the present invention is thermally polymerized by the action of the thermal polymerization initiator so that a cured substance exhibiting excellent heat resistance can be molded.

As the thermal radical polymerization initiator, a compound typically used as a thermal radical polymerization initiator can be appropriately used under the conditions of the thermal polymerization step described below. Examples thereof include an organic peroxide, and specifically, the following compounds can be used.

Examples of the thermal radical polymerization initiator include 1,1-di(t-hexylperoxy)cyclohexane, 1,1-di(t-butylperoxy)cyclohexane, 2,2-di(4,4-di-(t-butylperoxy)cyclohexyl)propane, t-hexylperoxyisopropyl monocarbonate, t-butylperoxy-3,5,5-trimethylhexanoate, t-butylperoxy laurate, dicumyl peroxide, di-t-butyl peroxide, t-butylperoxy-2-ethylhexanoate, di-t-hexyl peroxide, t-hexylperoxy-2-ethylhexanoate, cumene hydroperoxide, t-butyl hydroperoxide, t-butylperoxy-2-ethylhexyl, and 2,3-dimethyl-2,3-diphenylbutane.

The content of the thermal radical polymerization initiator is preferably in a range of 0.01% to 5% by mass, more preferably in a range of 0.02% to 3% by mass, still more preferably in a range of 0.03% to 2% by mass, and particularly preferably in a range of 0.05% to 1% by mass with respect to the total solid content of the curable composition according to the embodiment of the present invention.

(Photoradical Polymerization Initiator)

The curable composition according to the embodiment of the present invention may contain photoradical polymerization initiators other than the component B (hereinafter, also referred to as "other photoradical polymerization initiators") in addition to the acylphosphine oxide photopolymerization initiator that is the component B.

As the other photoradical polymerization initiators, compounds typically used as a photoradical polymerization initiator can be used without particular limitation as long as the effects of the present invention can be obtained and the performance required for a cured substance to be obtained is satisfied. Specifically, the following compounds can be used. Examples thereof include 1-phenyl-2-hydroxy-2-methyl-propan-1-one, 1-hydroxycyclohexyl phenyl ketone, 1-(4-isopropylphenyl)-2-hydroxy-2-methylpropan-1-one, 1,2-diphenylethandione, methylphenyl glyoxylate, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2,2-dimethoxy-1,2-diphenylethan-1-one, and 2-methyl-1-(4-methylthiophenyl)-2-morpholinopropan-1-one.

The content of the other photoradical polymerization initiators can be appropriately adjusted and determined without particular limitation as long as the effects of the present invention can be obtained and the performance required for the obtained cured substance is satisfied.

It is preferable that the curable composition according to the embodiment of the present invention contains both a photoradical polymerization initiator and a thermal radical polymerization initiator. In this case, the total content of the photoradical polymerization initiator and the thermal radical polymerization initiator is preferably in a range of 0.02% to 5% by mass, more preferably in a range of 0.03% to 3% by mass, and still more preferably in a range of 0.04% to 2% by mass with respect to the total solid content of the curable composition according to the embodiment of the present invention.

The content of the photoradical polymerization initiator in the calculation of the total content is the content of the acylphosphine oxide photopolymerization initiator which is the component B or the total content of the acylphosphine oxide photopolymerization initiator which is the component B and other photoradical polymerization initiators which may be contained in the curable composition.

[Other Additives and the Like]

The curable composition according to the embodiment of the present invention may contain polymers or monomers other than the above-described components and additives such as dispersants, plasticizers, heat stabilizers, and release agents within a range not departing from the gist of the present invention.

The viscosity of the curable composition according to the embodiment of the present invention is preferably 20,000 mPa·s or less, more preferably 15,000 mPa·s or less, still more preferably 13,000 mPa·s or less, and particularly preferable 10,000 mPa·s or less. By setting the viscosity of the curable composition to be in the above-described range, the handleability in a case of molding the cured substance can be enhanced, and thus a high-quality cured substance can be formed. The viscosity of the curable composition is preferably 2,000 mPa·s or greater, more preferably 3,000 mPa·s or greater, still more preferably 4,000 mPa·s or greater, and particularly preferable 5,000 mPa·s or greater.

<Cured Substance>

A cured substance having a low Abbe number and high partial dispersion ratios and also exhibiting excellent light resistance can be obtained by curing the curable composition according to the embodiment of the present invention.

The Abbe number (νd) and partial dispersion ratios (θg, F) of the cured substance are values measured using a Kalnew precision refractometer KPR-2000 (manufactured by Shimadzu Device Corporation). Specifically, the curable composition is injected into a transparent glass mold having a diameter of 20 mm and a thickness of 2 mm, the transparent glass mold is irradiated with ultraviolet rays at an irradiation dose of 1000 mJ/cm² from above in an atmosphere with an oxygen concentration of 1% or less to mold the cured substance (ultraviolet irradiation step), and the Abbe number (νd) and the partial dispersion ratios (θg, F) are measured for th cured substance. The Abbe number (νd) and the partial dispersion ratios (θg, F) of the cured substance are calculated by the following equations. Further, a heating step may be employed in addition to the ultraviolet irradiation step in a case of molding the cured substance. In this case, examples of the heating step include heating at 200° C. for 30 minutes in an atmosphere with an oxygen concentration of 1% or less.

$$\nu d = (nd-1)/(nF-nC)$$

$$\theta g, F = (ng-nF)/(nF-nC)$$

Here, nd represents a refractive index at a wavelength of 587.56 nm, nF represents a refractive index at a wavelength of 486.13 nm, nC represents a refractive index at a wavelength of 656.27 nm, and ng represents a refractive index at a wavelength of 435.83 nm.

The Abbe number of the cured substance according to the embodiment of the present invention is not particularly limited, but is preferably 35 or less, more preferably 30 or less, still more preferably 29 or less, and particularly preferably 28 or less. In addition, the Abbe number of the cured substance according to the embodiment of the present invention is not particularly limited, but is preferably 1 or greater, more preferably 3 or greater, still more preferably 5 or greater, and particularly preferably 7 or greater.

The partial dispersion ratios θg and F of the cured substance according to the embodiment of the present invention are not particularly limited, but are preferably 0.65 or greater, more preferably 0.70 or greater, and still more preferably 0.75 or greater. Further, the partial dispersion ratios θg and F of the cured substance according to the embodiment of the present invention are not particularly limited, but are preferably 2 or less, more preferably 1.8 or less, and still more preferably 1.7 or less.

The cured substance obtained from the curable composition according to the embodiment of the present invention is required to have performance of having no absorption in a visible light region, that is, being transparent in a case of being used as a lens.

The cured substance obtained from the curable composition according to the embodiment of the present invention has substantially no absorption in a long wavelength range of the visible light region, and the transmittance decreases toward a short wavelength side. Therefore, the transparency of the cured substance obtained from the curable composition according to the embodiment of the present invention can be evaluated by measuring the transmittance at a wavelength of 430 nm.

The transmittance of the cured substance according to the embodiment of the present invention at a wavelength of 430 nm is a value measured using an ultraviolet-visible spectrophotometer (for example, UV-2600 (trade name, manufactured by Shimadzu Corporation)). Specifically, the transmittance of the cured substance at a wavelength of 430 nm, which has a thickness of approximately 1 mm and is prepared in the same manner as that for the measurement sample of the cured substance with the Abbe number (νd) and the partial dispersion ratios (θg, F) except that a transparent glass mold having a diameter of 20 mm and a thickness of 1 mm is used, is measured.

Further, a light irradiation test for evaluating the light resistance of the cured substance is performed based on the xenon light irradiation test described in the examples below.

Hereinafter, preferable values of the transmittance of the cured substance at a wavelength of 430 nm will be described.

The transmittance of the cured substance according to the embodiment of the present invention immediately after preparation, that is, the transmittance before the light irradiation test is not particularly limited, but is preferably 80% or greater, more preferably 82% or greater, still more preferably 83% or greater, and particularly preferably 85% or greater.

Further, the transmittance of the cured substance according to the embodiment of the present invention after the light irradiation test is not particularly limited, but is preferably 65% or greater, more preferably 68% or greater, still more preferably 70% or greater, particularly preferably 75% or greater, and most preferably 80% or greater.

A decrease in the transmittance of the cured substance according to the embodiment of the present invention before and after the light irradiation test is not particularly limited, but is preferably 15% or less, more preferably 12% or less, still more preferably 10% or less, particularly preferably 6% or less, and most preferably 3% or less.

The decrease in the transmittance before and after the light irradiation test is calculated by subtracting the value of the transmittance after the light irradiation test from the value of the transmittance before the light irradiation test.

[Method of Producing Cured Substance]

The cured substance can be produced by a method including a step of photocuring the curable composition according to the embodiment of the present invention and preferably further including a step of thermally curing the curable composition. It is preferable that the method of producing a cured substance includes a step of forming a semi-cured substance by irradiating the curable composition with light or heating the curable composition and a step of forming a cured substance by irradiating the obtained semi-cured substance with light or heating the obtained semi-cured substance. Here, the method necessarily includes a step of curing the composition by irradiation with light.

[Step of Forming Semi-Cured Substance]

It is preferable that the step of forming a semi-cured substance includes a transfer step. The transfer step is a step of pressing a mold against the curable composition. In the transfer step, one of a pair of molds is pressed to the curable composition injected into the other mold so that the curable composition is pressed and stretched.

It is preferable that the mold used in the method of producing a cured substance is a mold that has been subjected to a chromium nitride treatment. In this manner, satisfactory mold releasability can be obtained in the release step to be subsequently performed and thus the production efficiency of the optical member can be improved.

Examples of the chromium nitride treatment include a method of forming a chromium nitride film on a surface of a mold. Examples of the method of forming a chromium nitride film on a surface of a mold include a chemical vapor deposition (CVD) method and a physical vapor deposition (PVD) method. The CVD method is a method of reacting a raw material gas containing chromium with a raw material gas containing nitrogen at a high temperature to form a chromium nitride film on a surface of a substrate. Further, the PVD method is a method of forming a chromium nitride film on a surface of a substrate by using arc discharge (arc type vacuum vapor deposition method). The arc type vacuum vapor deposition method is a method of disposing, for example, a cathode (evaporation source) made of chromium in a vacuum container, causing arc discharge between the cathode and a wall surface of the vacuum vessel via a trigger to evaporate the cathode to ionize the metal using arc plasma at the same time, applying a negative voltage to a substrate, and adding a reaction gas (for example, nitrogen gas) to the vacuum vessel at approximately several tens of m Torr (1.33 Pa) to react the ionized metal with the reaction gas on the surface of the substrate so that a film of a compound is formed. The chromium nitride treatment on a surface of a mold in the present invention is carried out by the CVD method or the PVD method described above.

Here, the mold is typically formed by combining two molds so that the contents can be heated while being pressurized, and injection of a low-viscosity composition into the mold may cause leakage to a mold clearance. Therefore, it is preferable that the curable composition injected into the mold has a certain level of viscosity or greater. In order to adjust the viscosity of the curable composition, a polymer containing the above-described radically polymerizable group in a side chain may be added to the curable composition.

A step of forming a semi-cured substance is provided after the step of pressing the mold. The semi-cured substance is obtained by semi-curing the curable composition injected into the mold. In the step of forming a semi-cured substance, light irradiation or heating is performed. In the present specification, such a step can also be referred to as a semi-curing step.

In the semi-curing step, at least one of light irradiation or heating is performed on the curable composition according to the embodiment of the present invention. In the semi-curing, there is usually no difference in the Abbe number and the partial dispersion ratios (θg, F) of the finally obtained cured substance regardless of whether light irradiation has been performed or heating has been performed. In the semi-curing step, it is preferable that a semi-cured substance having a complex viscosity of $10^5$ to $10^8$ mPa·s at 25° C. and a frequency of 10 Hz is formed.

Here, the term "semi-cured substance" in the present specification denotes a substance obtained by polymerizing the curable composition, in a state of not being a complete solid with a certain degree of fluidity. In a case where the complex viscosity of the polymer of the curable composition at 25° C. and a frequency of 10 Hz is in a range of $10^5$ to $10^8$ mPa·s, the polymer is a semi-cured substance. That is, a semi-cured substance can be regarded as a product having a complex viscosity of less than $1.0 \times 10^9$ mPa·s as the upper limit of the complex viscosity at 25° C. and a frequency of 10 Hz. Meanwhile, the term "cured substance" denotes a substance cured by polymerizing the curable composition, in a state of being a complete solid.

The light used for light irradiation is preferably ultraviolet rays or visible light and more preferably ultraviolet rays. For example, a metal halide lamp, a low-pressure mercury lamp, a high-pressure mercury lamp, an ultrahigh-pressure mercury lamp, a sterilization lamp, a xenon lamp, a light emitting diode (LED) light source lamp, or the like is suitably used. In a case of performing light irradiation, a short wavelength cut filter (for example, LU0422 (trade name), manufactured by Asahi Spectra Co., Ltd.) may be used. As the atmosphere during the light irradiation, an air or inert gas substituted atmosphere is preferable, and an atmosphere in which air is substituted with nitrogen until the oxygen concentration reaches 1% or less is more preferable.

In a case where a heating semi-curing step is provided in the semi-curing step, it is preferable that the heating and semi-curing are performed such that the complex viscosity of the semi-cured substance after being heated at 25° C. and a frequency of 10 Hz reaches $10^5$ to $10^8$ mPa·s.

The present invention may relate to a semi-cured substance produced by the method described above. Such a semi-cured substance can be preferably used for the method of producing a cured substance described below. Here, the preferable range of the complex viscosity of the semi-cured substance is the same as the preferable range of the complex viscosity of the semi-cured substance in the above-described step of forming the semi-cured substance.

After the light irradiation step, the semi-cured substance may not contain the photoradical polymerization initiator containing the component B at all because the photoradical polymerization initiator is entirely consumed or the photoradical polymerization initiator containing the component B may remain in the semi-cured substance.

Further, the glass transition temperature of the semi-cured substance is preferably in a range of −150° C. to 0° C., more preferably in a range of −50° C. to 0° C., and still more preferably in a range of −20° C. to 0° C.

[Step of Forming Cured Substance]

It is preferable that the step of forming the cured substance includes a polymerization step of placing the semi-cured substance in a molding mold, deforming the substance under pressure, and heating the substance for thermal polymerization or irradiating the substance with light for photopolymerization to obtain a cured substance. In the present specification, such a step can also be referred to as a curing step. Further, the light irradiation conditions and the heating conditions in the step of forming the cured substance are the same as the conditions in the semi-cured step described above.

In a case where the curing step is a thermal polymerization step, the molding mold used in the polymerization step is also referred to as a thermoforming molding mold. It is preferable that the thermoforming molding mold is typically configured to combine two molding molds such that the contents can be heated while being pressurized. Further, in the method of producing a cured substance, it is more preferable to use a mold as a molding mold in the thermal polymerization step of obtaining a cured substance. As such a thermoforming molding mold, for example, the mold described in JP2009-126011A can be used. Further, it is preferable that the mold is a mold that has been subjected to a chromium nitride treatment.

In the thermal polymerization step, the semi-cured substance placed in the molding mold is deformed under pressure and heated and thermally polymerized to obtain a cured substance. Here, the semi-cured substance may be deformed under pressure and heated at the same time, heated after being deformed under pressure, or deformed under pressure after being heated. Among these, it is preferable that the semi-cured substance is deformed under pressure and heated at the same time. Further, it is also preferable that the semi-cured substance is deformed under pressure and heated at the same time and further heated at a high temperature after the pressurization is stabilized.

In the thermal polymerization step, the semi-cured substance is heated at a temperature of 150° C. or higher and cured to obtain a cured substance.

The heating temperature thereof is 150° C. or higher, preferably in a range of 160° C. to 270° C., more preferably in a range of 165° C. to 250° C., and still more preferably in a range of 170° C. to 230° C.

In the curing step, it is preferable that the semi-cured substance is heated and deformed under pressure at the same time. In this manner, the inverted shape of the inner surface of the mold can be accurately transferred to the cured substance.

The pressure for the deformation under pressure is preferably in a range of 0.098 MPa to 9.8 MPa, more preferably in a range of 0.294 MPa to 4.9 MPa, and still more preferably in a range of 0.294 MPa to 2.94 MPa.

The time for the thermal polymerization is preferably in a range of 30 to 1000 seconds, more preferably in a range of 30 to 500 seconds, and still more preferably in a range of 60 to 300 seconds. As the atmosphere during the thermal polymerization, an air or inert gas substituted atmosphere is preferable, and an atmosphere in which air is substituted with nitrogen until the oxygen concentration reaches 1% or less is more preferable.

After the curing step, a releasing step is provided. In a case where thermal polymerization is performed in the curing step, it is preferable that the mold is separated from the cured substance in the temperature range of 150° C. to 250° C. in the releasing step. By setting the temperature in the releasing step to be in the above-described range, the mold can be easily separated from the cured substance, and the production efficiency can be improved.

Hereinbefore, the example of the method of producing the cured substance according to the embodiment of the present invention has been described, the configuration of the present invention is not limited thereto and can be appropriately changed within a range not departing from the scope of the present invention. For example, the mold used in the transfer step and the semi-curing step may be used as it is in the curing step, and the curing step may be performed by separating the mold from the semi-cured substance after the semi-curing step and moving the semi-cured substance to another mold (thermoforming molding mold). In this case, it is preferable that the mold used in the semi-curing step and the curing step is subjected to the above-described chromium treatment.

Further, in the semi-curing step, the curable composition in the mold may be irradiated with light and heated at the same time. In this manner, a semi-cured substance having a desired degree of curing can be reliably obtained.

[Semi-Cured Substance]

The semi-cured substance can be formed by semi-curing the curable composition. It is preferable that the semi-cured substance is produced by the method of producing a semi-cured substance. Further, it is preferable that the semi-cured substance has a complex viscosity of $10^5$ to $10^8$ mPa·s at 25° C. and a frequency of 10 Hz.

The cured substance according to the embodiment of the present invention may be formed by curing the semi-cured substance described above.

<Optical Member>

The cured substance according to the embodiment of the present invention can be preferably used for an optical member.

The type of optical member is not particularly limited, but the cured substance can be suitably used especially for optical members that transmit light (so-called passive optical members). Examples of an optical function device provided with such an optical member include various display devices (such as liquid crystal displays and plasma displays), various projector devices (such as overhead projectors (OHP), and liquid crystal projectors), optical fiber communication devices (such as optical waveguides and optical amplifiers), and imaging devices such as cameras and videos.

Examples of the passive optical members include lenses, prisms, prism sheets, panels (plate-like molded bodies), films, optical waveguides (such as film-like or fiber-like optical waveguides), optical discs, and sealants of LEDs. The passive optical member may be provided with an optional coating layer or an optional additional functional layer, as necessary. For example, the passive optical member may be provided with a protective layer that prevents mechanical damage to a coating surface caused by friction or abrasion, a light-absorbing layer that absorbs light having an undesirable wavelength which is a factor of deterioration of inorganic particles, base materials, and the like, a permeation blocking layer that suppresses or prevents permeation of reactive low molecules such as moisture or oxygen gas, an antiglare layer, an antireflection layer, a low-refractive index layer, or the like. Specific examples of the coating layer include a transparent conductive film or gas barrier film consisting of an inorganic oxide coating layer or inorganic nitride coating layer, and a gas barrier film or hard coating film consisting of an organic material coating layer. As a coating method for forming the coating layer, a known coating method such as a vacuum deposition method, a CVD method, a sputtering method, a dip coating method, or a spin coating method can be used.

[Lens Base Material]

The optical member may be a lens base material. That is, a lens base material can be produced by using the curable composition according to the embodiment of the present invention. In the present specification, "lens base material" denotes a single member capable of exhibiting a lens function. The lens base material produced by using the curable composition according to the embodiment of the present invention has a small Abbe number and high partial dispersion ratios and exhibits excellent light resistance. It is preferable that the refractive index of the lens base material is optionally adjusted by appropriately adjusting the kind of monomer constituting the curable composition, and thus a lightweight lens base material having high refractivity and high light transmittance can be obtained.

A film or a member may be provided on a surface or in the periphery of the lens base material depending on the use environment and the applications of the lens. For example, a protective film, an antireflection film, a hard coating film, or the like can be formed on the surface of the lens base material. In addition, the lens base material produced by using the cured substance according to the embodiment of the present invention can be formed into a compound lens laminated with one or more of other lens base materials (hereinafter, also referred to as "other lens base materials") selected from a glass lens base material and a plastic lens base material.

Such a compound lens can be produced by, for example, photocuring the curable composition according to the embodiment of the present invention to form a semi-cured substance on the other lens base materials and heating the obtained semi-cured substance to form a cured substance. The description above can be preferably applied to the semi-curing step and the step of forming the cured substance. Since the curable composition according to the embodiment of the present invention has excellent light resistance and excellent photocuring sensitivity, a high-quality compound lens can be obtained. In the present invention, excellent photocuring sensitivity denotes that a gel-like or rubber-like semi-cured substance can be obtained from a liquid curable composition by a photocuring reaction.

The periphery of the lens base material may be fitted to be fixed to a base material holding frame or the like. Here, such films, frames, and the like are members to be added to the lens base material, and therefore these members are distinguished from the lens base material itself in the present specification.

In a case where the lens base material is used for lenses, the lens base material may be used alone as a lens or the above-described films or frames and other lens base materials may be added thereto and used as a lens. The kind and the shape of the lens formed of the lens base material are not particularly limited, but the maximum thickness thereof is preferably in a range of 0.1 to 10 mm. The maximum thickness thereof is more preferably in a range of 0.1 to 5 mm and still more preferably 0.15 to 3 mm. Further, it is preferable that the lens base material has a circular shape with a maximum diameter of 1 to 1000 mm. The maximum diameter thereof is more preferably in a range of 2 to 200 mm and still more preferably in a range of 2.5 to 100 mm.

It is preferable that the lens base material is used for imaging lenses such as mobile phones or digital cameras, shooting lenses such as TVs or video cameras, in-vehicle lenses, and endoscope lenses.

<Cemented Lens>

A cemented lens can be produced by adhering the lens base material or the lens produced by using the curable composition according to the embodiment of the present invention to another lens with an adhesive for a lens.

[Other Lenses]

The kind of other lenses is not particularly limited, and examples thereof include a disk-shaped convex lens, a concave lens, a meniscus lens, an aspheric lens, a cylindrical lens having a cylindrical lens surface, a ball lens, and a rod lens. In addition, the material of other lenses is not particularly limited, and a glass lens, a resin lens, or a compound lens may be used.

(Glass Lens)

As a glass lens, known glass lenses can be used without limitation. Examples of commercially available glass lenses include BK7 (trade name, manufactured by Ohara Corporation).

Similar glass lenses can also be used even in a case where a compound lens includes a glass lens.

(Resin Lens and Compound Lens)

A resin lens denotes a lens consisting of a resin cured substance.

In the present specification, the compound lens denotes a lens having a layer consisting of glass and a resin layer. The resin layer is a layer consisting of a resin cured substance. Each layer of the compound lens may be a lens (single lens), and in this case, it is preferable that optical axes of each single lens (a line connecting curvature centers of both spherical surfaces) coincide with each other. The compound lens may have a resin layer on a surface thereof or therein.

[Adhesive for Lens]

As an adhesive for a lens, known lenses can be used without limitation.

As the adhesive for a lens, it is particularly preferable to use an adhesive for a lens which contains a compound represented by General Formula (1). The adhesive for a lens which contains a compound represented by General Formula (1) absorbs ultraviolet rays, but is still excellent in fastness with respect to ultraviolet irradiation, and thus a cured substance with high light stability can be obtained as a cemented lens by using the adhesive for a lens. Further, an adhesive layer formed of the adhesive for a lens which contains a compound represented by General Formula 1 has high heat shock resistance.

(Compound Represented by General Formula (1))

$$Pol^1-Sp^e-L^1-Ar^{21}-L^2-Sp^f-Pol^2 \quad \text{General Formula (1)}$$

In the formula, $Ar^{21}$ represents an aromatic ring group represented by any of General Formulae (21-1) to (21-4).

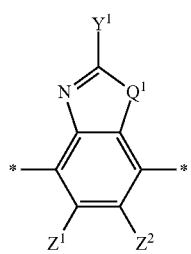

Formula (21-1)

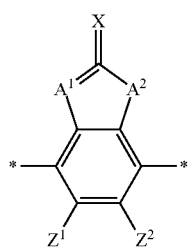

Formula (21-2)

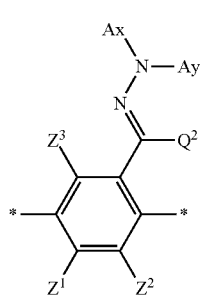

Formula (21-3)

-continued

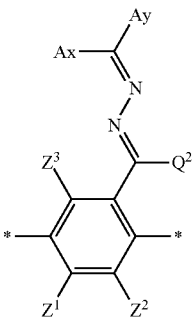

Formula (21-4)

In the formulae, $Q^1$ represents —S—, —O—, or $NR^{11}$—, and $R^{11}$ represents a hydrogen atom or an alkyl group having 1 to 6 carbon atoms.

$Y^1$ represents an alkyl group having 1 to 6 carbon atoms which may have a substituent, an aromatic hydrocarbon group having 6 to 12 carbon atoms which may have a substituent, or an aromatic heterocyclic group having 3 to 12 carbon atoms which may have a substituent.

$Z^1$, $Z^2$, and $Z^3$ each independently represent a hydrogen atom, an aliphatic hydrocarbon group having 1 to 20 carbon atoms which may have a substituent, an alkoxy group having 1 to 20 carbon atoms which may have a substituent, an alicyclic hydrocarbon group having 3 to 20 carbon atoms which may have a substituent, a monovalent aromatic hydrocarbon group having 6 to 20 carbon atoms which may have a substituent, a halogen atom, a cyano group, a nitro group, $-NR^{12}R^{13}$, or $-SR^{12}$, $Z^1$ and $Z^2$ may be bonded to each other to form an aromatic hydrocarbon ring which may have a substituent or an aromatic heterocyclic ring which may have a substituent, and $R^{12}$ and $R^{13}$ each independently represent a hydrogen atom or an alkyl group having 1 to 6 carbon atoms.

$A^1$ and $A^2$ each independently represent a group selected from the group consisting of —O—, $-NR^{21}$— ($R^{21}$ represents a hydrogen atom or a substituent), —S—, and —C(=O)—, X represents an oxygen atom (O), a sulfur atom (S), a carbon atom (C) to which a hydrogen atom or a substituent is bonded, or a nitrogen atom (N) to which a hydrogen atom or a substituent is bonded.

Ax represents an organic group having 1 to 30 carbon atoms which has at least one aromatic ring selected from the group consisting of an aromatic hydrocarbon ring and an aromatic heterocyclic ring, Ay represents a hydrogen atom, an alkyl group having 1 to 6 carbon atoms which may have a substituent, or an organic group having 1 to 30 carbon atoms which has at least one aromatic ring selected from the group consisting of an aromatic hydrocarbon ring and an aromatic heterocyclic ring, the aromatic ring of Ax and Ay may have a substituent, and Ax and Ay may be bonded to each other to form a ring which may have a substituent.

Further, $Q^2$ represents a hydrogen atom or an alkyl group having 1 to 6 carbon atoms which may have a substituent.

Further, * represents a bonding position with respect to $L^1$ or $L^2$.

With regard to the definition and the preferred range of each substituent in General Formulae (21-1) to (21-4), the description of $Y^1$, $Q^1$, and $Q^2$ for the compound (A) described in JP2012-21068A can be applied to $Y^1$, $Z^1$, and $Z^2$, the description of $A_1$, $A_2$, and X for the compound represented by General Formula (I) described in JP2008-107767A can be applied to $A^1$, $A^2$, and X, the description of $A^x$, $A^y$, and $Q^1$ for the compound represented by General Formula (I) described in WO2013/018526A can be applied to Ax, Ay, and $Q^2$ in General Formula (21-3), and the description of $A^a$, $A^b$, and $Q^{11}$ for the compound represented by General Formula (II) described in WO2013/018526A can be applied to Ax, Ay, and $Q^2$ in General Formula (21-4). The description of $Q^1$ for the compound (A) described in JP2012-21068A can be applied to $Z^2$.

It is preferable that X in General Formula (21-2) represents a carbon atom to which two substituents are bonded and that both $A^1$ and $A^2$ represent —S—. In General Formula (21-3), as the ring formed by Ax and Ay being bonded to each other and used to form a ring which may have a substituent, an alicyclic hydrocarbon ring, an aromatic hydrocarbon ring, or an aromatic heterocyclic ring is preferable, and an aromatic heterocyclic ring is more preferable. In General Formula (21-4), as the ring formed by Ax and Ay being bonded to each other and used to form a ring which may have a substituent, an unsaturated hydrocarbon ring is preferable.

It is preferable that $Ar^{21}$ in General Formula (1) represents an aromatic ring group represented by General Formula (21-2).

As the aromatic ring group represented by General Formula (21-2), an aromatic ring group represented by General Formula (21-2-1) is particularly preferable.

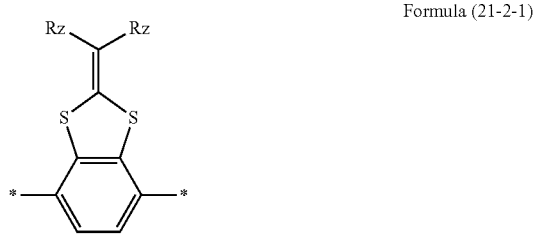

Formula (21-2-1)

In the formula, Rz represents a substituent. Examples of the substituent represented by Rz include substituents exemplified as the substituent of $Sp^d$ described below. Two Rz's may be the same as or different from each other. In addition, the two Rz's may be bonded to each other to form a ring. As the ring to be formed here, a 5-membered ring or a 6-membered ring is preferable, and a 5-membered ring or a 6-membered ring having a nitrogen atom or an oxygen atom as an atom constituting the ring is more preferable. In particular, a ring represented by any of the following formulae is preferable.

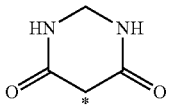

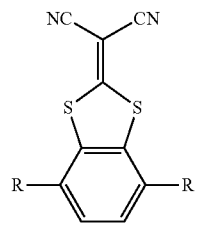

-continued

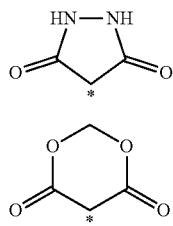

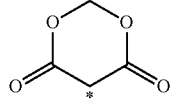

In the formulae, each * represents a position of the carbon atom to which the two Rz's are bonded in General Formula (21-2-1). In addition, the ring represented by any of the formulae may have a substituent in a nitrogen atom or a carbon atom. As the substituent in this case, an alkyl group having 1 to 6 carbon atoms is preferable, and a linear alkyl group having 1 to 4 carbon atoms is more preferable.

As the aromatic ring group represented by General Formula (21-2-1), an aromatic ring group in which at least one of Rz's represents a cyano group or an aromatic ring group in which two Rz's are bonded to each other to form a ring is preferable, and an aromatic ring group in which both Rz's represent a cyano group is more preferable.

The reason for this is because, in the adhesive for a lens which contains a compound represented by General Formula (1), having such an aromatic ring group, a more significant effect of increasing absorption in an ultraviolet region while maintaining a high transmittance in a visible light region can be obtained.

In General Formula (1), $L^1$ and $L^2$ each independently have the same definition as that for L described above, and the preferable ranges are the same as described above.

In General Formula (1), $Sp^e$ and $Sp^f$ each independently have the same definition as that for Sp described above, and the preferable ranges are the same as described above.

In General Formula (1), $Pol^1$ and $Pol^2$ each independently have the same definition as that for Pol described above, and the preferable ranges are the same as described above.

Specific examples of the structure of $Pol^1$-$Sp^e$-$L^1$- or $Pol^2$-$Sp^f$-$L^2$-include those exemplified as the structure of Pol-Sp-L- described above.

Hereinafter, specific examples of the compound represented by General Formula (1) which is preferably used in the adhesive for a lens of the present invention are shown below, but examples are not limited to the following compounds. In the following structural formulae, Me represents a methyl group, Et represents an ethyl group, nPr represents an n-propyl group, iPr represents an isopropyl group, nBu represents an n-butyl group, and tBu represents a t-butyl group.

-continued
R = 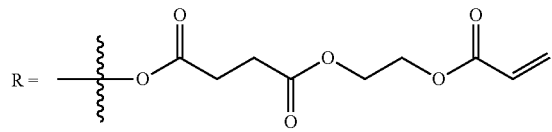 (I_X-1)
R = 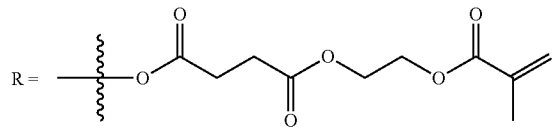 (I_X-2)
R = 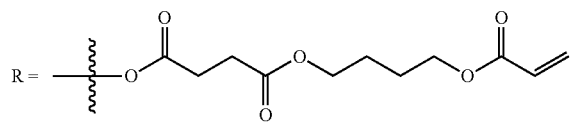 (I_X-3)
R = 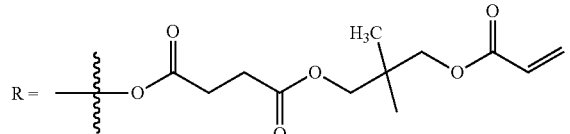 (I_X-4)
R = 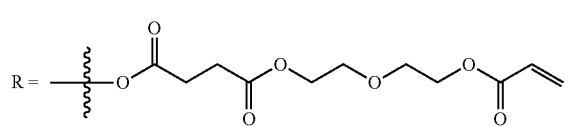 (I_X-5)
R = 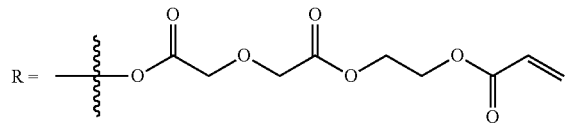 (I_X-6)
R = 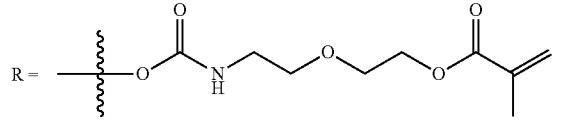 (I_X-7)
R = 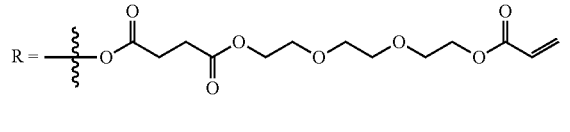 (I_X-8)
R = 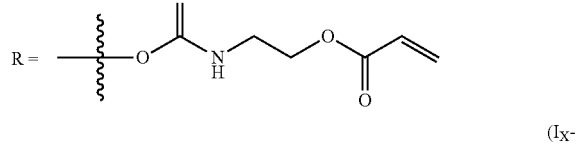 (I_X-9)
R = 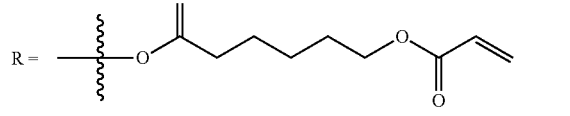 (I_X-10)
R = 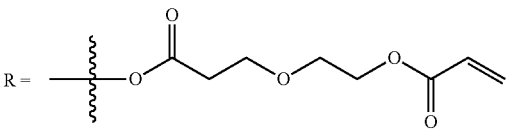 (I_X-13)
R = 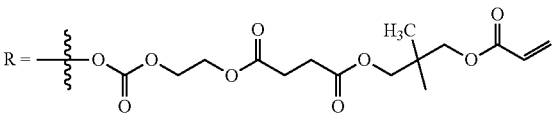 (I_X-14)
R = 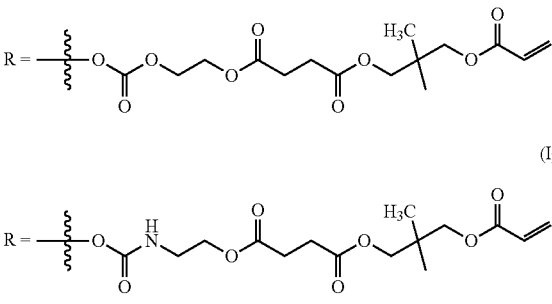 (I_X-15)
R = 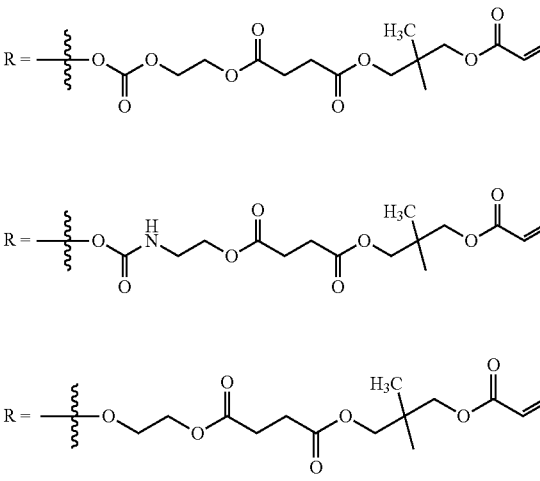 (I_X-16)
R = 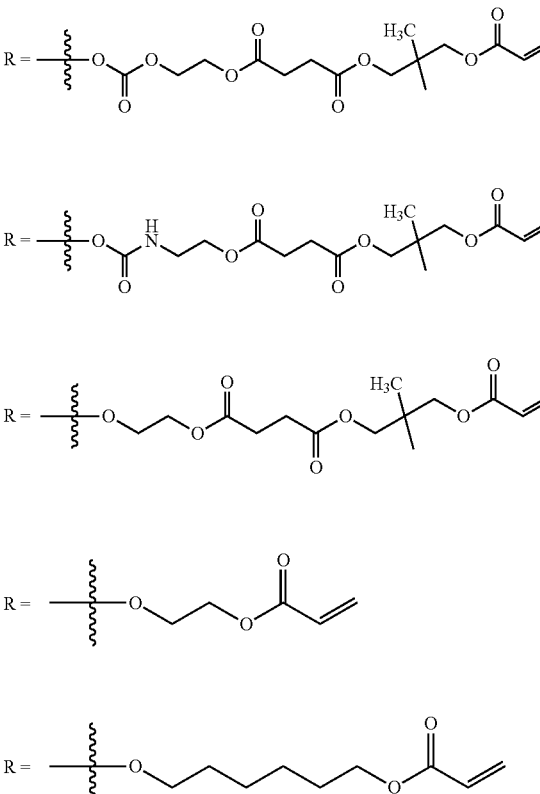 (I_X-17)
(I_X-18)
(I_X-19)
(I_X-20)
(I_X-21)
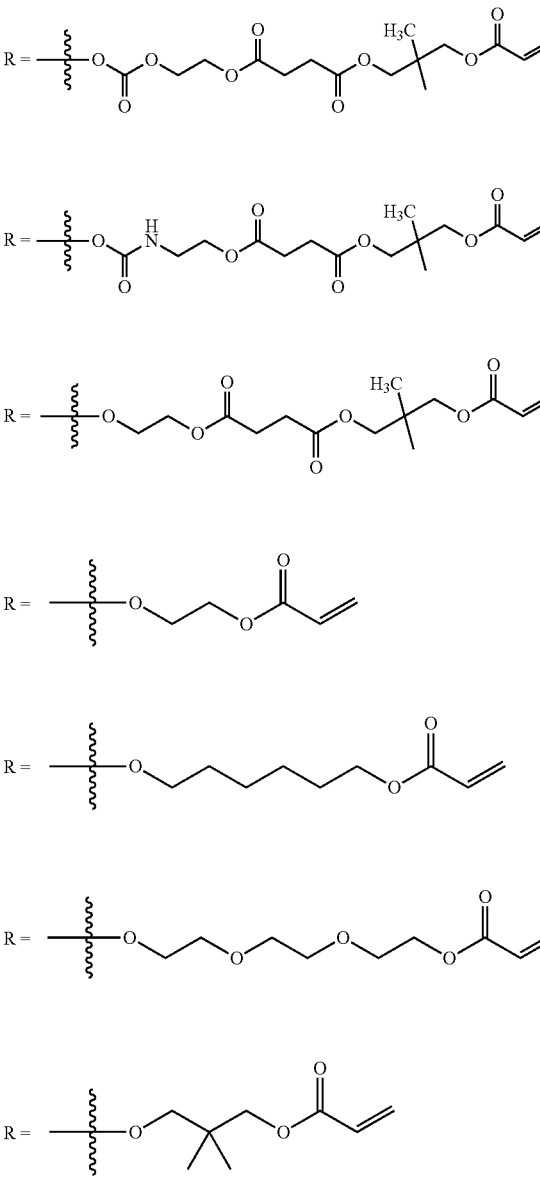
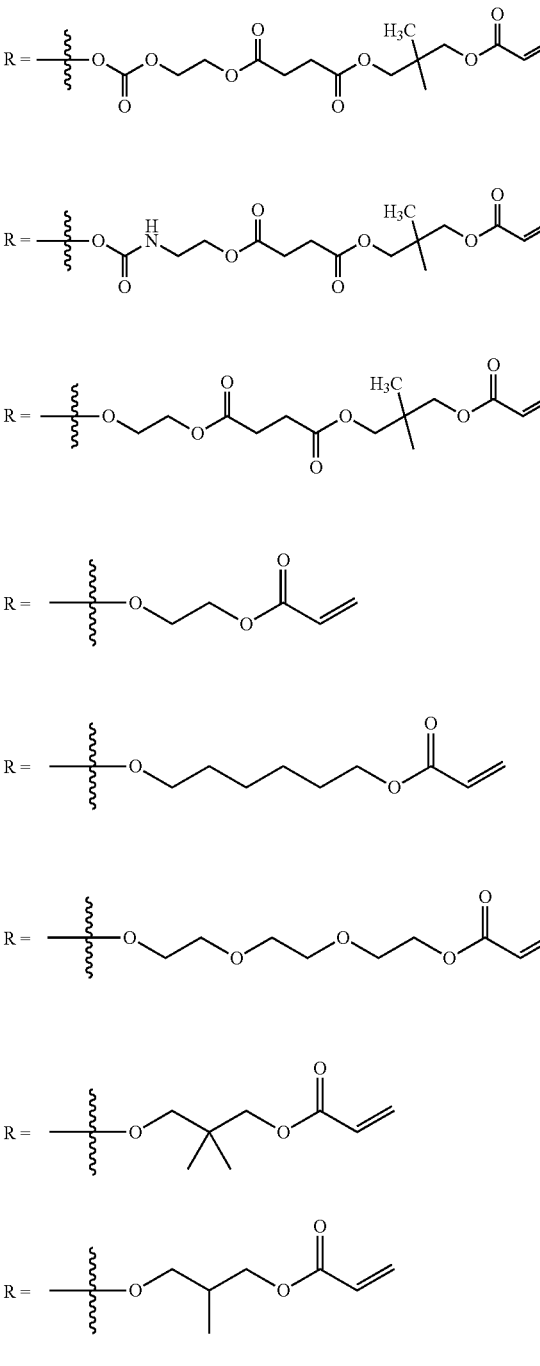
(I_X-22)

-continued
(I_X-11)
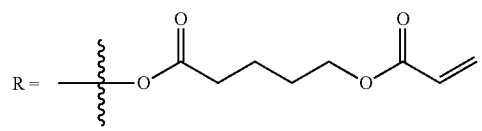
(I_X-23)
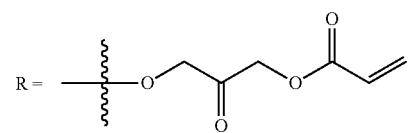
(I_X-12)
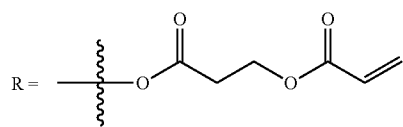
(I_X-24)
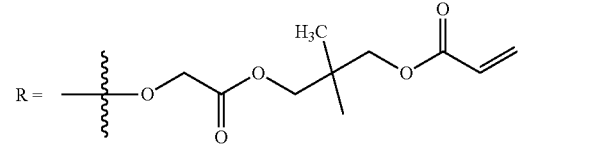
(III_X-1)
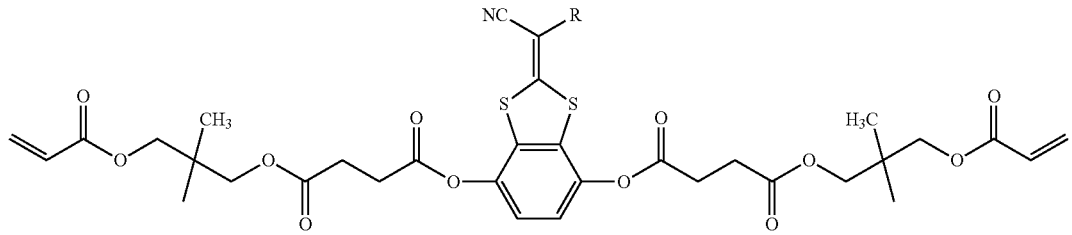
(III_X-2)
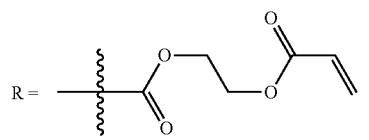
(III_X-5)
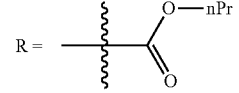
(III_X-3)
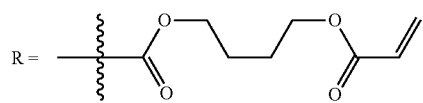
(III_X-6)
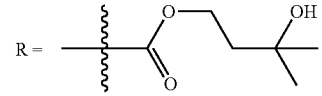
(III_X-4)
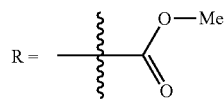
(III_X-7)
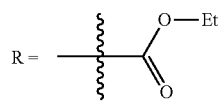
(III_X-8)
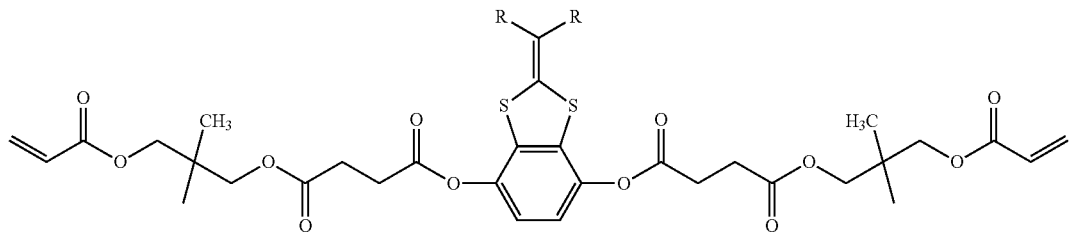
(III_X-9)
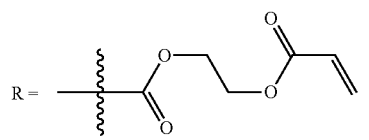
(III_X-12)
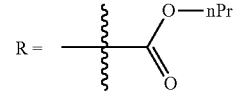
(III_X-10)
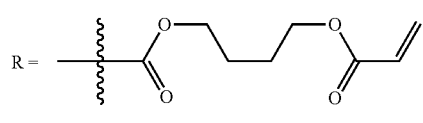
(III_X-13)
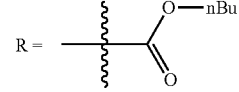
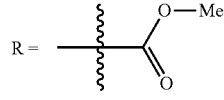
(III_X-14)
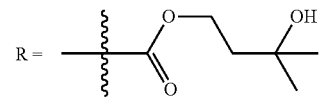

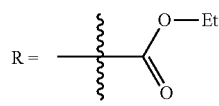
(III$_X$-11)
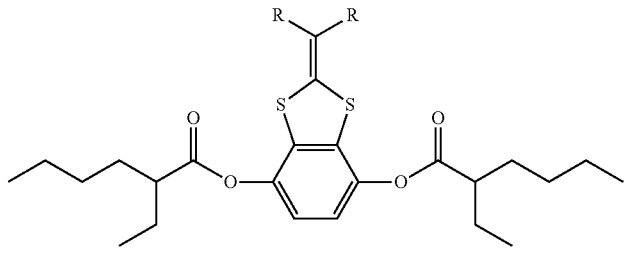
(III$_X$-15)
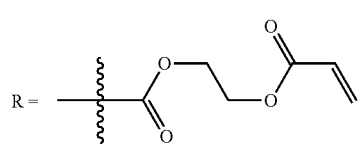
(III$_X$-16)
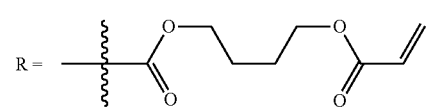
(III$_X$-17)
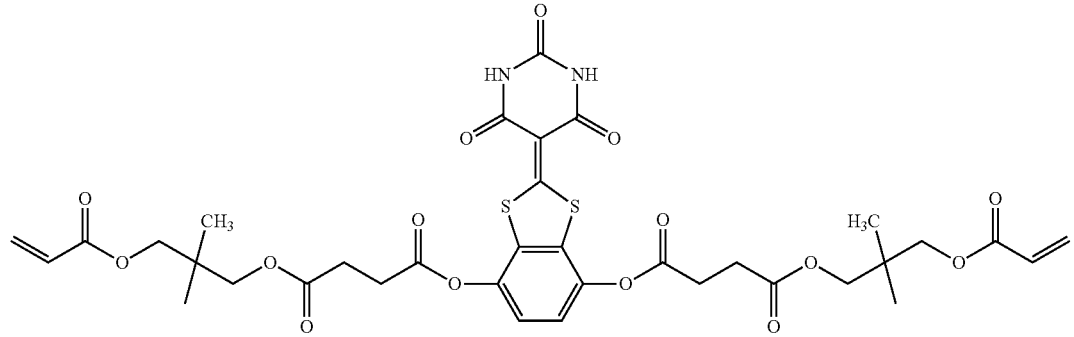
(III$_X$-18)
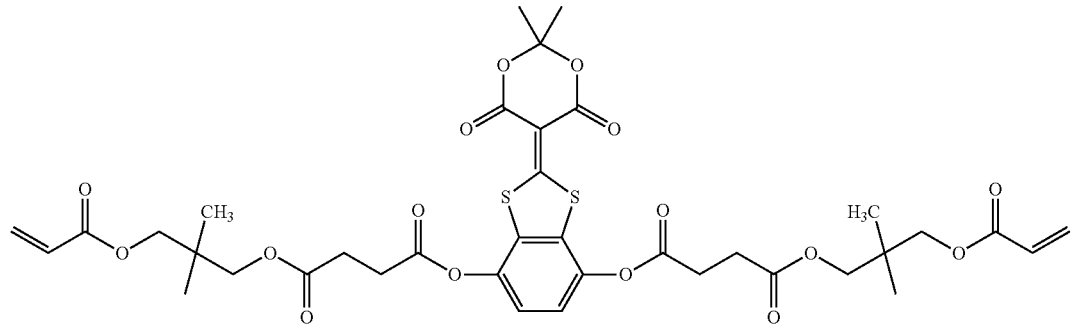
(III$_X$-19)
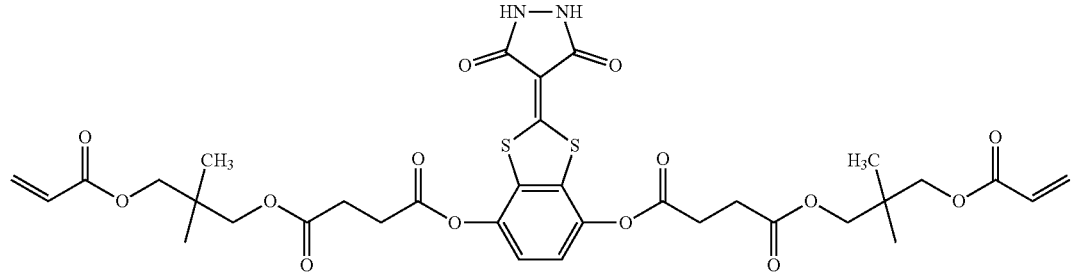

-continued
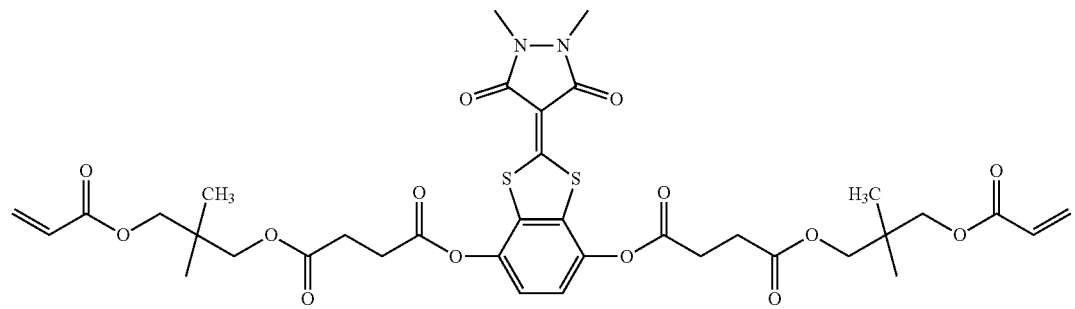
(III$_X$-20)
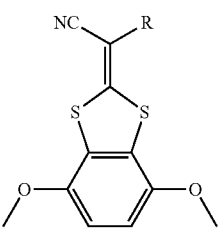
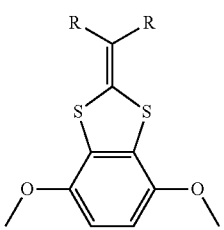
(III$_X$-21)
R = 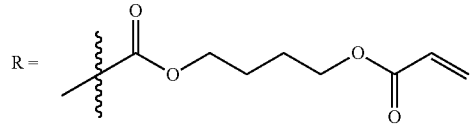
(III$_X$-24)
R = 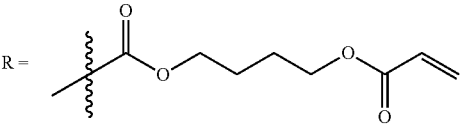
(III$_X$-22)
R = 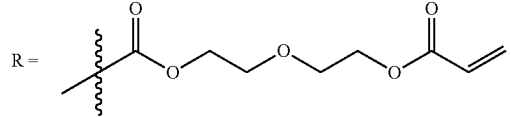
(III$_X$-25)
R = 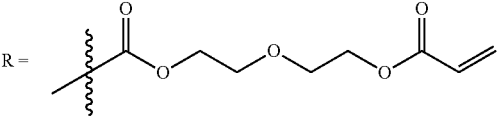
(III$_X$-23)
R = 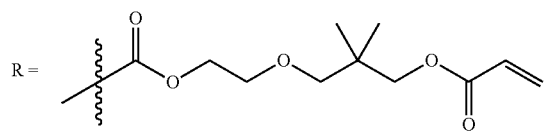
(III$_X$-26)
R = 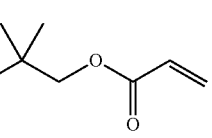
(III$_X$-27)
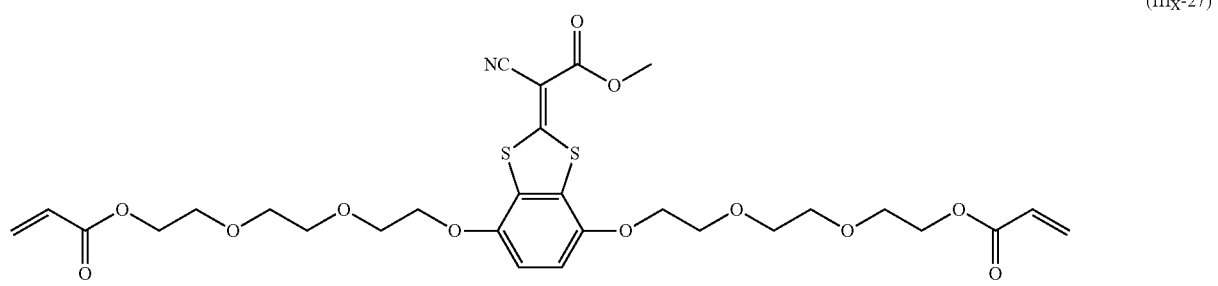
(III$_X$-28)
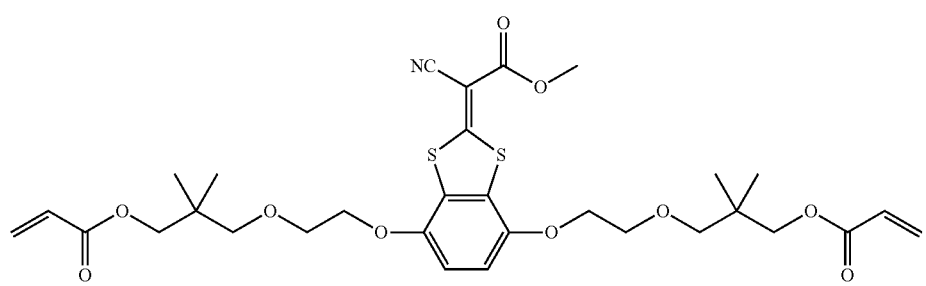

-continued
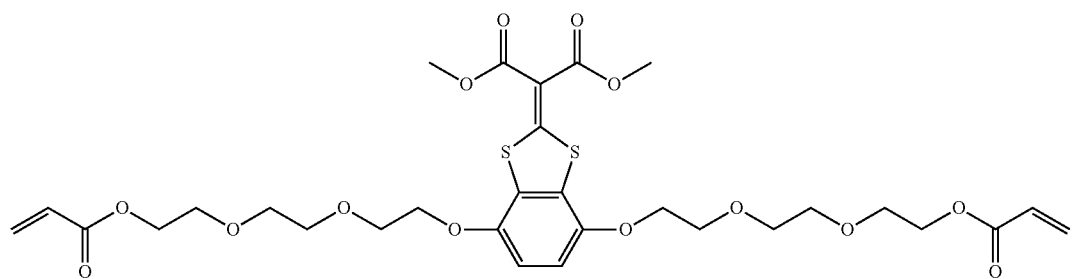
(III$_x$-29)
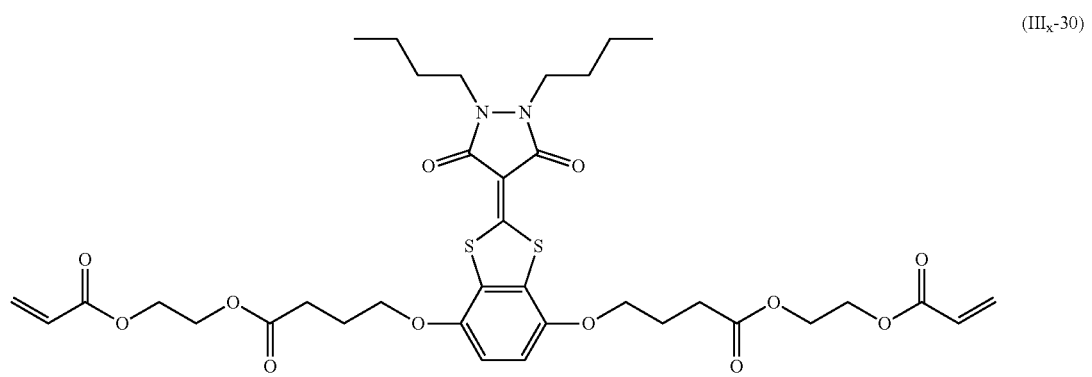
(III$_x$-30)
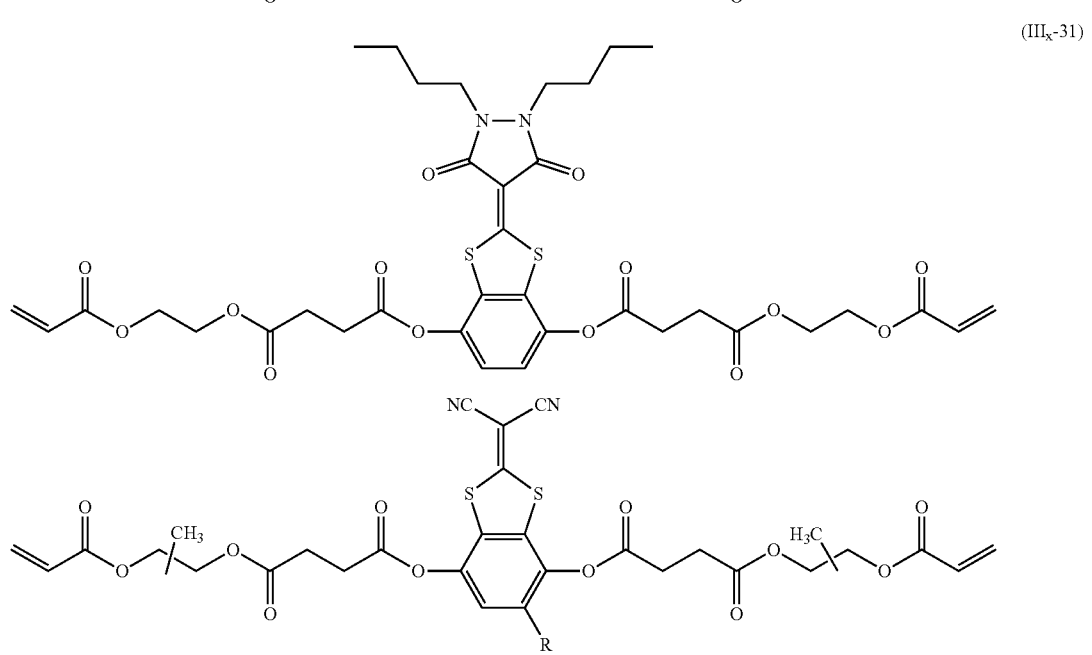
(III$_x$-31)
(IV$_x$-1)
R = —Me
(IV$_x$-2)
R = —Et R = 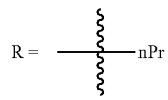nPr (IVx-3)
R = 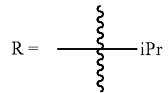iPr (IVx-4)
R = 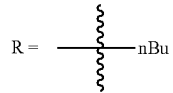nBu (IVx-5)
R = 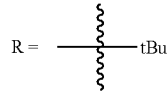tBu (IVx-6)
R = 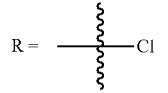Cl (IVx-7)
R = 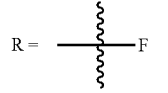F (IVx-8)
R = 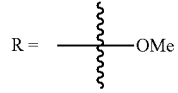OMe (IVx-9)
R = 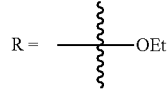OEt (IVx-10)
R = 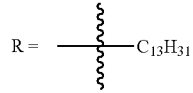C$_{13}$H$_{31}$ (IVx-11)
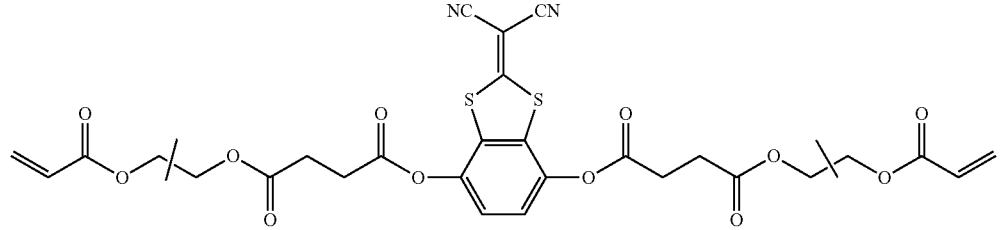
(IVx-12)
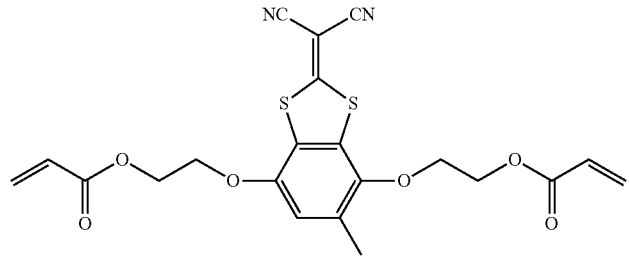
(IVx-13)

-continued
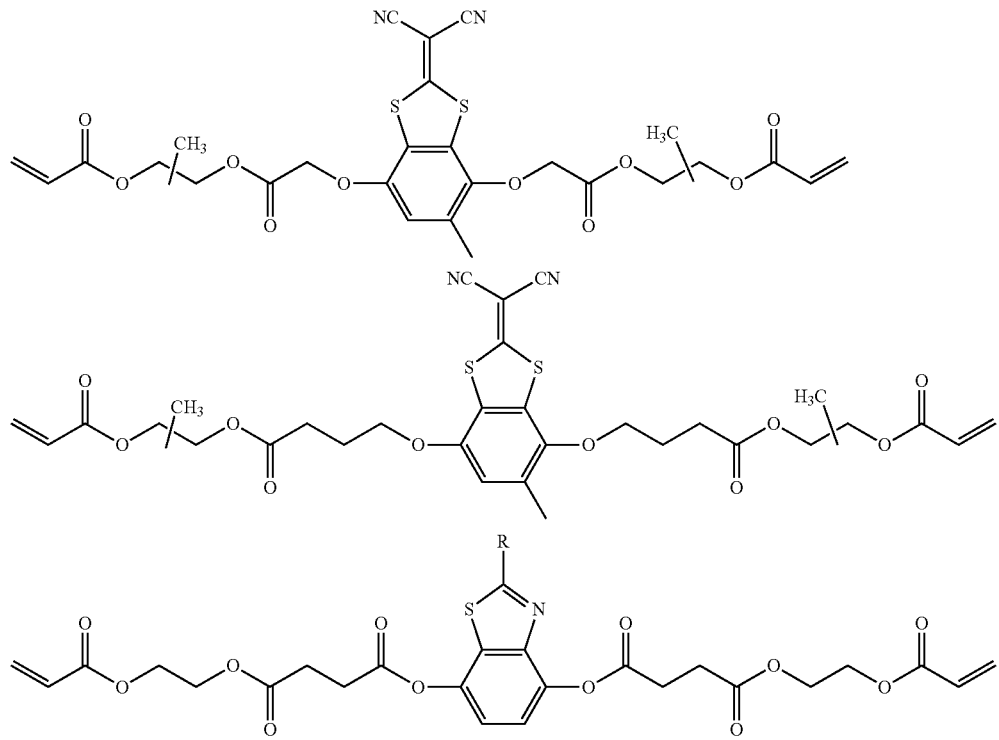
(IV$_x$-14)
(V$_x$-1)
R = 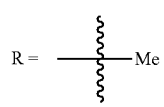—Me
(V$_x$-2)
R = 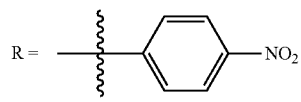
(V$_x$-3)
R = 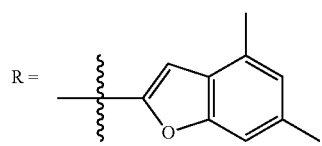
(V$_x$-4)
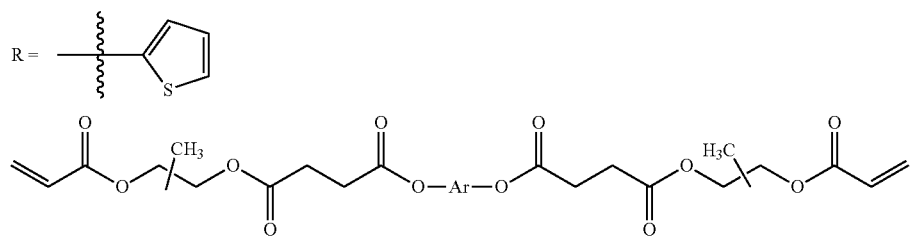

-continued
Ar = 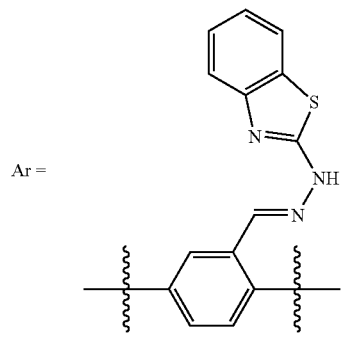 (VI$_x$-1)
Ar = 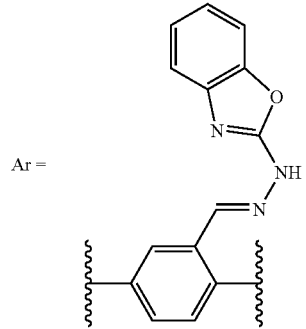 (VI$_x$-2)
Ar = 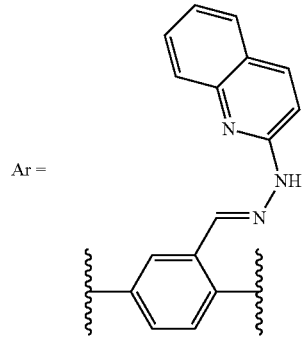 (VI$_x$-3)
Ar = 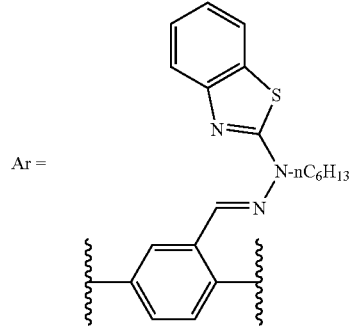 (VI$_x$-4)
Ar = 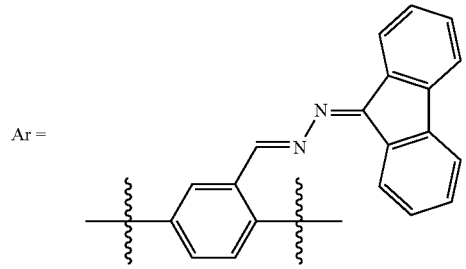 (VI$_x$-6)

Ar = 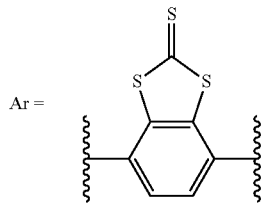

Further, the compound represented by General Formula (1) has one or two or more asymmetric carbons in some cases, any of the (R)-form or the (S)-form can be independently employed for the stereochemistry of asymmetric carbons. Further, the compound represented by Formula (A) may be a mixture of optical isomers or stereoisomers such as diastereoisomers. That is, the compound represented by Formula (A) may be any kind of stereoisomer, any mixture of stereoisomers, or a racemic body.

The content of the compound represented by General Formula (1) in the adhesive for a lens is preferably in a range of 10% to 90% by mass, more preferably in a range of 15% to 85% by mass, and still more preferably in a range of 20% to 80% by mass with respect to the total mass of the adhesive for a lens. The viscosity thereof can be set to be in the preferable range by setting the content thereof to 90% by mass or less.

The adhesive for a lens may contain two or more compounds represented by General Formula (1). In a case where the adhesive for a lens contains two or more compounds represented by General Formula (1), it is preferable that the total content thereof is in the above-described range.

(Polymer)

The adhesive for a lens may contain a polymer or an oligomer (hereinafter, also referred to as "polymer") for the purpose of adjusting the viscosity or the Young's modulus of the cured substance. The polymer is not particularly limited, but a polymer containing an ethylenically unsaturated group is preferable. The ethylenically unsaturated group may be contained in any of the inside of a main chain, a terminal of the main chain, or a side chain of the polymer. The ethylenically unsaturated group is not particularly limited, but an ethylenically unsaturated bond derived from butadiene or isoprene, or a (meth)acryloyl group is preferable.

As the polymer contained in the adhesive for a lens, a polymer selected from the group consisting of a conjugated diene-based polymer and a polyurethane resin containing an ethylenically unsaturated group is preferable, and a polymer having a polybutadiene structure, a polymer having a polyisoprene structure, and a polymer selected from the group consisting of urethane (meth)acrylate are more preferable.

Examples of commercially available products of the polymer having a polybutadiene structure include NIPOL BR Series (manufactured by Zeon Corporation), UBEPOL BR Series (manufactured by Ube Industries, Ltd.), NISSO-PB Series (manufactured by Nippon Soda Co., Ltd.), and KURARAY LIQUID RUBBER LBR Series and KURARAY LIQUID RUBBER L-SBR Series (manufactured by Kuraray Co., Ltd.).

Examples of commercially available products of the polymer having a polyisoprene structure include NIPOL IR Series (manufactured by Zeon Corporation), and KURARAY LIQUID RUBBER LIR Series and KURARAY LIQUID RUBBER UC Series (manufactured by Kuraray Co., Ltd.).

(VI$_x$-7)

Examples of commercially available products of the urethane (meth)acrylate include UV-3200, UV-3000B, UV-3700B, UV-3210EA, UV-2000B, and UV-3630 of SHI-KOH (registered trademark) Series (all manufactured by Nippon Synthetic Chemical Industry Co., Ltd.), EBECRYL 230 and EBECRYL 9227EA (manufactured by Daicel Psytech Co., Ltd.), and AU-3040, AU-3050, AU-3090, AU-3110, and AU-3120 of Hi-Cope AU (registered trademark) Series (all manufactured by TOKUSHIKI CO., Ltd.).

The molecular weight of the polymer is preferably 1,000 or greater, more preferably 3,000 or greater, and still more preferably 5,000 or greater in terms of the weight-average molecular weight (GPC, in terms of polystyrene). The molecular weight of the polymer is preferably 500,000 or less, more preferably 300,000 or less, and still more preferably 100,000 or less in terms of the weight-average molecular weight (GPC, in terms of polystyrene).

The content of the polymer is preferably 50% by mass or less, more preferably 40% by mass or less, and still more preferably 30% by mass or less with respect to the total mass of the adhesive for a lens.

((Meth)Acrylate Monomer)

The adhesive for a lens may contain a (meth)acrylate monomer. As the (meth)acrylate monomer, those exemplified in the section of the curable composition according to the embodiment of the present invention can be used.

Preferred examples of (meth)acrylate monomers contained in the adhesive for a lens include a monofunctional (meth)acrylate monomer having an aromatic ring, such as phenoxyethyl acrylate (the above-described monomer 1) or benzyl acrylate, a (meth)acrylate monomer having an aliphatic group, such as a monomer a (2-ethylhexyl acrylate), a monomer b (1,6-hexanediol diacrylate), or a monomer c (1,6-hexanediol dimethacrylate), and a (meth)acrylate monomer containing a hydroxy group such as a monomer d (2-hydroxyethyl acrylate), a monomer e (hydroxypropyl acrylate), or a monomer f (4-hydroxybutyl acrylate).

Monomer a

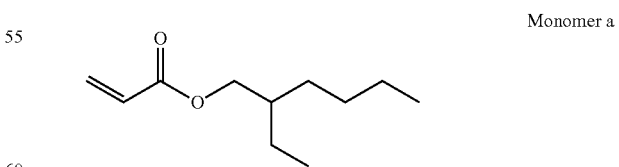

Monomer b

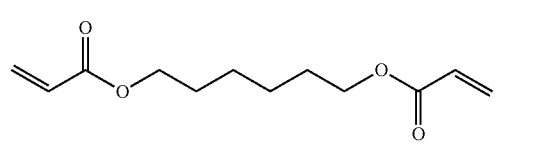

Monomer c

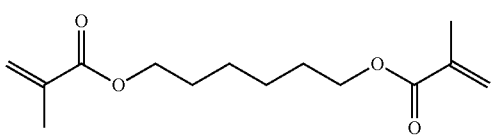

Monomer d

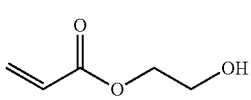

Monomer e

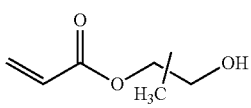

Monomer f

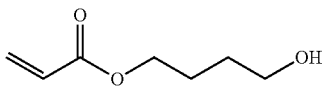

The method of obtaining the (meth)acrylate monomer is not particularly limited, and the (meth)acrylate monomer may be obtained commercially or produced synthetically. In a case where the compound is commercially available, preferred examples of the commercially available products thereof include VISCOAT #192 PEA (phenoxyethyl acrylate) (manufactured by Osaka Organic Chemical Industry Ltd.), VISCOAT #160 BZA (benzyl acrylate) (manufactured by Osaka Organic Chemical Industry Ltd.), 2EHA (monomer a) (manufactured by Toagosei Co., Ltd.), A-HD-N (monomer b) (manufactured by Shin-Nakamura Chemical Co., Ltd.), HD-N (monomer c) (manufactured by Shin-Nakamura Chemical Co., Ltd.), HEA (monomer d) (manufactured by Osaka Organic Chemical Industry Ltd.), LIGHT ESTER HOP-A (N) (monomer e) (manufactured by Kyoeisha Chemical Co., Ltd.), and 4-HBA (monomer f) (manufactured by Osaka Organic Chemical Industry Ltd.).

In a case where the adhesive for a lens contains a (meth)acrylate monomer, the content of the (meth)acrylate monomer is preferably in a range of 5% to 90% by mass, more preferably in a range of 10% to 85% by mass, and still more preferably in a range of 20% to 80% by mass with respect to the total mass of the adhesive for a lens. The function of relieving the stress in a case where the cured substance is thermally changed can be adjusted by adjusting the amount of the (meth)acrylate monomer in the adhesive for a lens.

(Polymerization Initiator)

It is preferable that the adhesive for a lens contains a photoradical polymerization initiator. The description of the component B and other photoradical polymerization initiators described in the section of the curable composition according to the embodiment of the present invention can be applied to the photoradical polymerization initiator.

Further, the adhesive for a lens may contain a thermal radical polymerization initiator in addition to the photoradical polymerization initiator. The curing of a region where light does not reach can be promoted by allowing the adhesive for a lens to contain a thermal radical polymerization initiator. As the thermal radical polymerization initiator, those exemplified in the section of the curable composition can be used in the same amount.

[Production of Cemented Lens]

The cemented lens can be obtained by superimposing two lenses using the adhesive for a lens and curing the adhesive to form the adhesive layer as described below. It is preferable that the curing is performed after removing air bubbles mixed into the adhesive after the superimposition.

The adhesive can be cured by performing irradiation with light or performing heating. It is preferable that the curing is performed by carrying out at least irradiation with light. In addition, a step of further heating the adhesive may be performed after the irradiation with light.

The thickness of the adhesive layer is preferably in a range of 10 to 50 μm and more preferably in a range of 20 to 30 μm. In a case where the thickness thereof is set to 10 μm or greater, an effect of absorbing ultraviolet rays can be sufficiently obtained. Further, in a case where the thickness thereof is set to 50 μm or less, the transmittance in a short wavelength range (400 to 430 nm) of visible light can be increased while high adhesiveness is exhibited.

The refractive index of the adhesive layer at a wavelength of 587 nm is preferably 1.51 or greater, more preferably 1.53 or greater, and still more preferably 1.55 or greater. The reason for this is because a difference in the refractive index between the adhesive layer and a lens to be cemented decreases.

Further, the cutoff wavelength of the adhesive layer having a film thickness of 30 μm is preferably 380 nm or less, more preferably 385 nm or less, and still more preferably 390 nm or less. Further, the wavelength at which the transmittance of the adhesive layer reaches 0.5% or less is defined as the cutoff wavelength. The transmittance of the adhesive layer can be measured using a spectrophotometer (for example, UV-2550, manufactured by Shimadzu Corporation).

The refractive index and the cutoff wavelength of the adhesive layer can be adjusted to be in the above-described ranges by the amount of the compound represented by General Formula (1) in the adhesive for a lens.

EXAMPLES

Hereinafter, the present invention will be described in more detail based on the following examples. The materials, the amounts of materials used, the proportions, the treatment details, the treatment procedure, and the like shown in the examples below can be appropriately changed within a range not departing from the gist of the present invention. Therefore, the scope of the present invention should not be limitatively interpreted by the following specific examples.

Further, a step of preparing a curable composition and a preservation step of using the prepared curable composition to prepare a cured substance were carried out in an environment where a yellow lamp was used as illumination.

Synthesis Example

A compound represented by General Formula (A) was synthesized as follows.

<Synthesis Example 1: Synthesis of Compound (VI-2)>

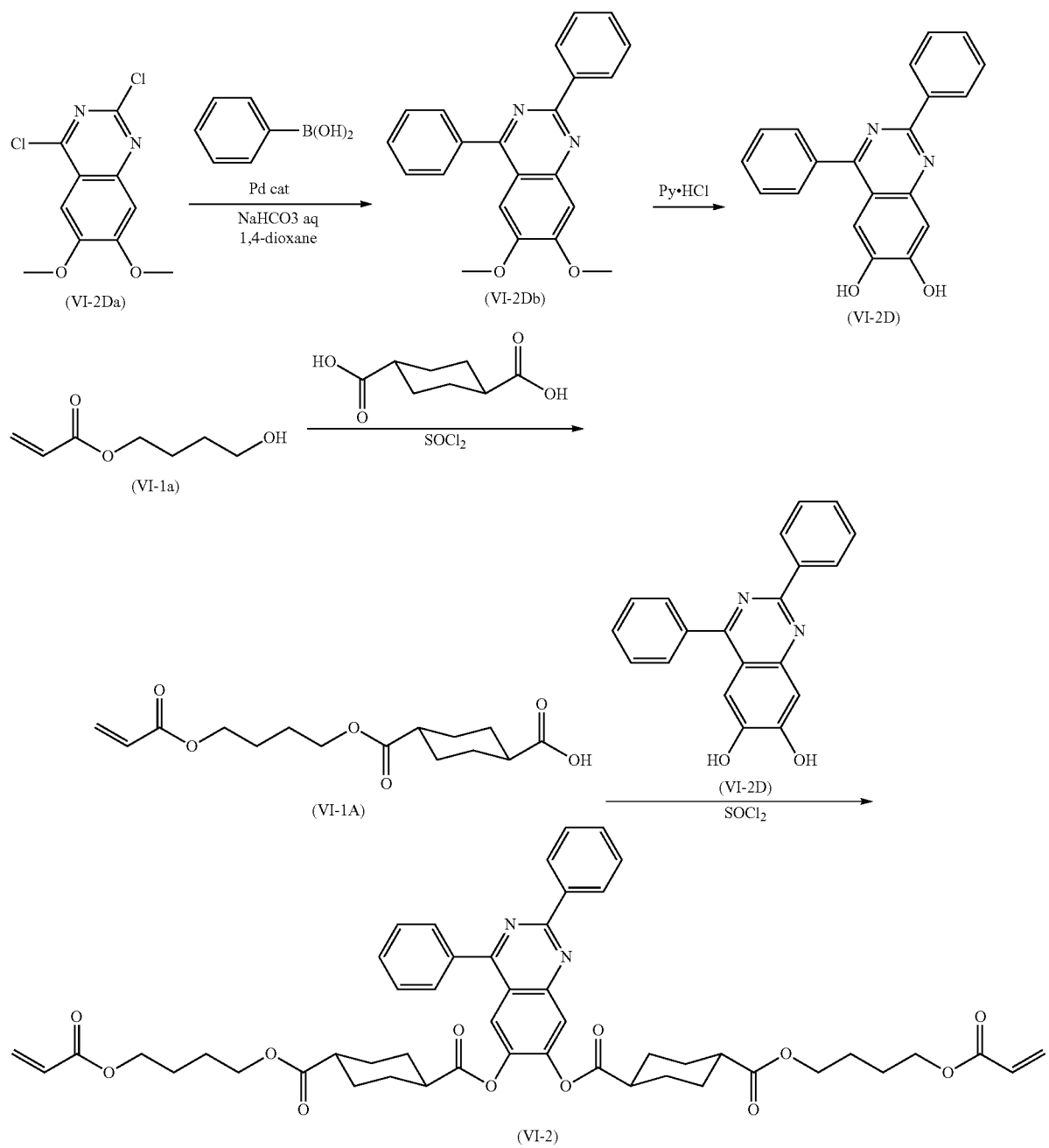

[Synthesis of Compound (VI-2db)]

5.0 g (19.3 mmol) of 2,4-dichloro-6,7-dimethoxyquinazoline (VI-2 Da), 7.1 g (57.9 mmol) of phenylboronic acid, 1.1 g of dichlorobis[di-t-butyl(p-dimethylamino)phenyl]phosphino] palladium (II), 100 mL of 1,4-dioxane, and 100 mL of a saturated sodium hydrogen carbonate aqueous solution were mixed in a nitrogen atmosphere. After the mixture was stirred at an internal temperature of 85° C. for 2 hours, the mixture was cooled to 25° C., 300 mL of ethyl acetate and 200 mL of water were added thereto, and the resulting mixture was washed and subjected to liquid separation. Thereafter, the mixture was concentrated and purified by column chromatography, thereby obtaining a compound (VI-2db) (yield of 77%).

[Synthesis of Compound (VI-2D)]

5.0 g of the compound (VI-2db) and 50 g of pyridine hydrochloride were mixed and stirred at 190° C. for 4 hours in a nitrogen atmosphere. Thereafter, 300 mL of water was added dropwise thereto at 80° C. to precipitate a solid, and the mixture was cooled to 25° C. The solid was filtered and washed with a mixed solvent of water and methanol at a volume ratio of 3:1, thereby obtaining a compound (VI-2D) (yield of 95%).

[Synthesis of Compound (VI-1A)]

A compound (VI-1A) was synthesized according to the method described in paragraph 0113 of JP2016-053149A.

[Synthesis of Compound (VI-2)]

20.1 g (67.4 mmol) of the carboxylic acid compound (VI-1A), 185 mL of ethyl acetate, 46 mL of N,N-dimethylacetamide, and 60 mg of 2,6-di-t-butyl-4-methylphenol were mixed and cooled to at an internal temperature of 0° C. 7.75 g (65.1 mmol) of thionyl chloride was added dropwise to the mixture at an internal temperature of 0° C. to 5° C. The mixture was stirred at 5° C. for 60 minutes, and a solution of 8.7 g (27.6 mmol) of the compound (VI-2D) and 52 mL of THF was added dropwise to the mixture at an internal temperature of 0° C. to 8° C.

Thereafter, 16.8 g of N,N-diisopropylethylamine was added dropwise thereto at an internal temperature of 0° C. to 10° C. After the mixture was stirred at an internal temperature of 20° C. to 25° C. for 1 hour, 40 mL of ethyl acetate, 165 mL of water, and 14 mL of concentrated hydrochloric acid were added thereto, and the resulting mixture was washed. The organic layer was washed with 140 mL of saturated saline, subjected to liquid separation, subsequently washed with 100 mL of saturated saline and 10 mL of 7.5 wt % aqueous sodium bicarbonate, and subjected to liquid separation. Thereafter, the resultant was concentrated to obtain an oily composition and purified by column chromatography, thereby obtaining a compound (VI-2) (yield of 38%).

$^1$H-NMR (300 MHz, CDCl$_3$): δ (ppm) 1.40-1.60 (m, 8H), 1.60-1.80 (m, 8H), 2.00-2.20 (m, 8H), 2.20-2.40 (m, 4H), 4.15 (T$^4$H), 4.24 (T$^4$H), 5.84 (dd, 2H), 6.05-6.15 (m, 2H), 6.40 (dd, 2H), 7.35 (s, 2H), 7.45-7.55 (m, 6H), 7.60-7.70 (m, 4H)

Synthesis Example 2: Synthesis of Compound (I-1)

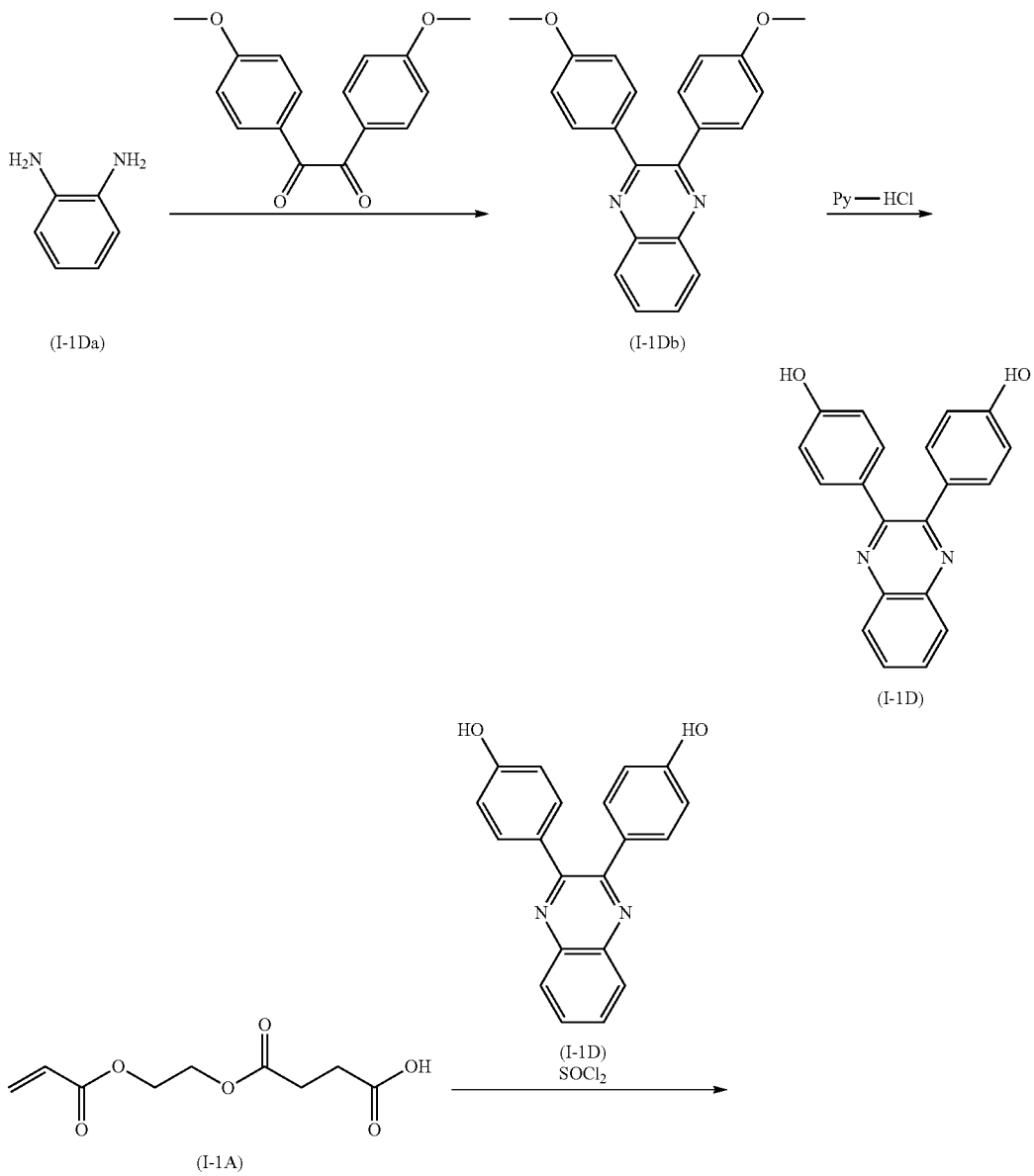

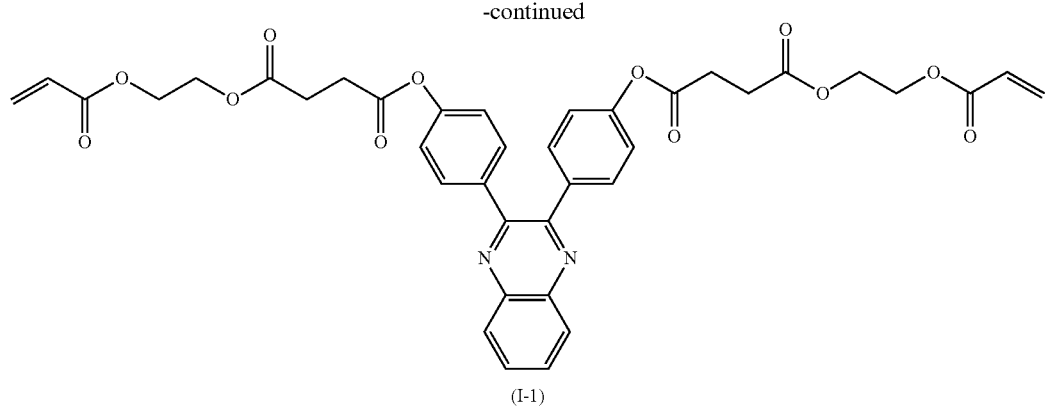

(I-1)

[Synthesis of Compound (I-1db)]

5.0 g (46.2 mmol) of 1,2-phenylenediamine (I-1 Da), 12.5 g (46.2 mmol) of p-anisyl, and 80 mL of acetic acid were mixed, and 125 mg of 2-iodoxybenzoic acid was added thereto. After the mixture was stirred at 25° C. for 2 hours, the precipitated compound (I-db) was filtered and washed with 50 mL of methanol (yield of 65%).

[Synthesis of Compound (I-1D)]

A compound (I-1D) was obtained by the same method as described above except that the compound (VI-2db) in the synthesis of the compound (VI-2D) of Synthesis Example 1 was changed to the compound (I-db) (yield of 93%).

[Synthesis of Compound (I-1)]

A compound (I-1) was obtained by the above-described scheme using the compound (I-1A) and the compound (I-1D) (yield of 75%).

$^1$H-NMR (300 MHz, CDCl$_3$): δ (ppm) 2.80 (T$^4$H), 2.92 (T$^4$H), 4.30-4.40 (m, 8H), 5.85 (d, 2H), 6.05-6.15 (m, 2H), 6.43 (d, 2H), 7.10 (d, 4H), 7.70 (d, 4H), 7.70-7.80 (m, 2H), 8.10-8.20 (m, 2H)

Synthesis Example 3: Synthesis of Compound (A-28)

A compound (A-28) was synthesized according to the description in paragraph 0139 of WO2017/115649A.

Synthesis Example 4: Synthesis of Compound (A-1)

[Synthesis of Intermediate 4]

An intermediate 4 was synthesized according to the description in paragraph 0133 of WO2017/115649A.

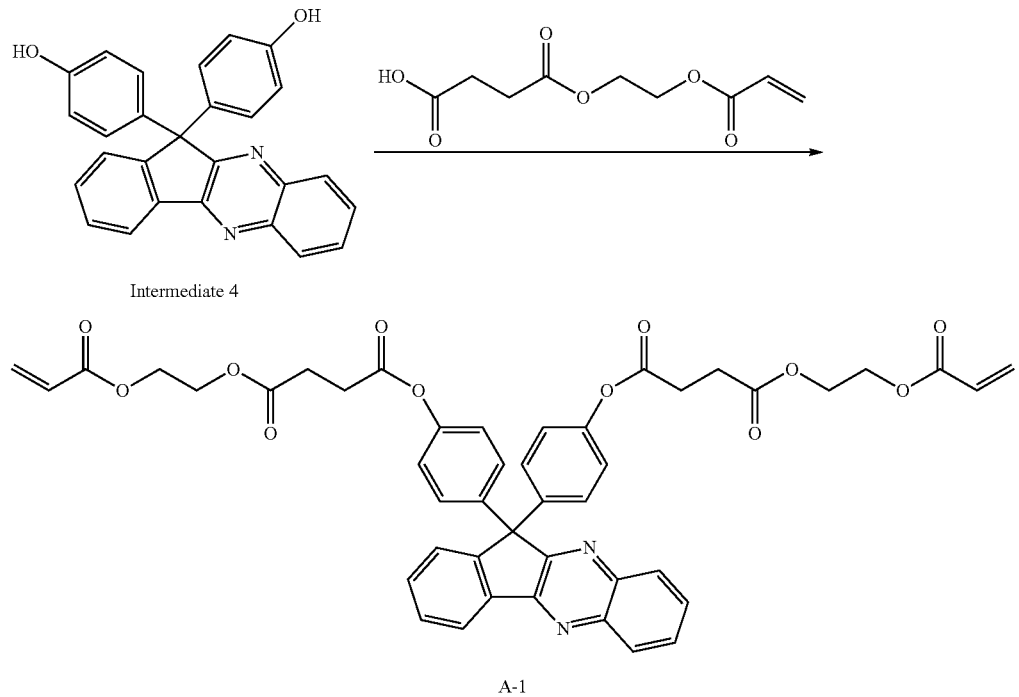

A-1

[Synthesis of Compound (A-1)]

4.8 g of the intermediate 4, 6.5 g of mono(2-acryloyloxyethyl) succinate, 140 mg of N,N-dimethylaminopyridine (DMAP), and 50 mL of dichloromethane added to a 200 mL three-neck flask and stirred in an ice bath for 10 minutes. 5.8 g of 1-(3-dimethylaminopropyl)-3-ethylcarbodiimide hydrochloride (EDAC·HCl) was added thereto, and the mixture was allowed to react at room temperature for 4 hours. The reaction solution was diluted with ethyl acetate, washed with water, a saturated sodium hydrogen carbonate aqueous solution, and saturated saline in this order, and the organic layer was dried over magnesium sulfate. After magnesium sulfate was removed by filtration, and purification was performed by silica gel column chromatography using hexane/ethyl acetate as a developing solvent, thereby obtaining 7.5 g of a compound (A-1). The $^1$H-NMR data of the compound (A-1) was as follows.

$^1$H-NMR (300 MHz, DMSO-$d_6$): δ2.60-2.70 ppm (m, 4H), 2.75-2.85 ppm (m, 4H), 4.25-4.35 ppm (m, 8H), 5.85-6.40 ppm (m, 6H), 7.00-7.10 ppm (d, 4H), 7.20-7.30 ppm (d, 4H), 7.55-7.70 ppm (m, 3H), 7.75-7.90 ppm (m, 2H), 8.05-8.15 ppm (d, 1H), 8.20-8.30 ppm (m, 2H)

Synthesis Example 5: Synthesis of Compound (A-2)

A compound (A-2) was obtained by the same method as described above except that mono(2-acryloyloxyethyl) succinate was changed to mono(2-methacryloyloxyethyl) succinate in the synthesis of the compound (A-1) of Synthesis Example 4.

$^1$H-NMR (300 MHz, DMSO-$d_6$): δ1.80 ppm (s, 6H), 2.60-2.70 ppm (m, 4H), 2.75-2.85 ppm (m, 4H), 4.25-4.35 ppm (m, 8H), 5.58 ppm (s, 2H), 5.97 ppm (s, 2H), 7.00-7.10 ppm (d, 4H), 7.20-7.30 ppm (d, 4H), 7.55-7.70 ppm (m, 3H), 7.75-7.90 ppm (m, 2H), 8.05-8.15 ppm (d, 1H), 8.20-8.30 ppm (m, 2H)

Synthesis Example 6: Synthesis of Compound (A-35)

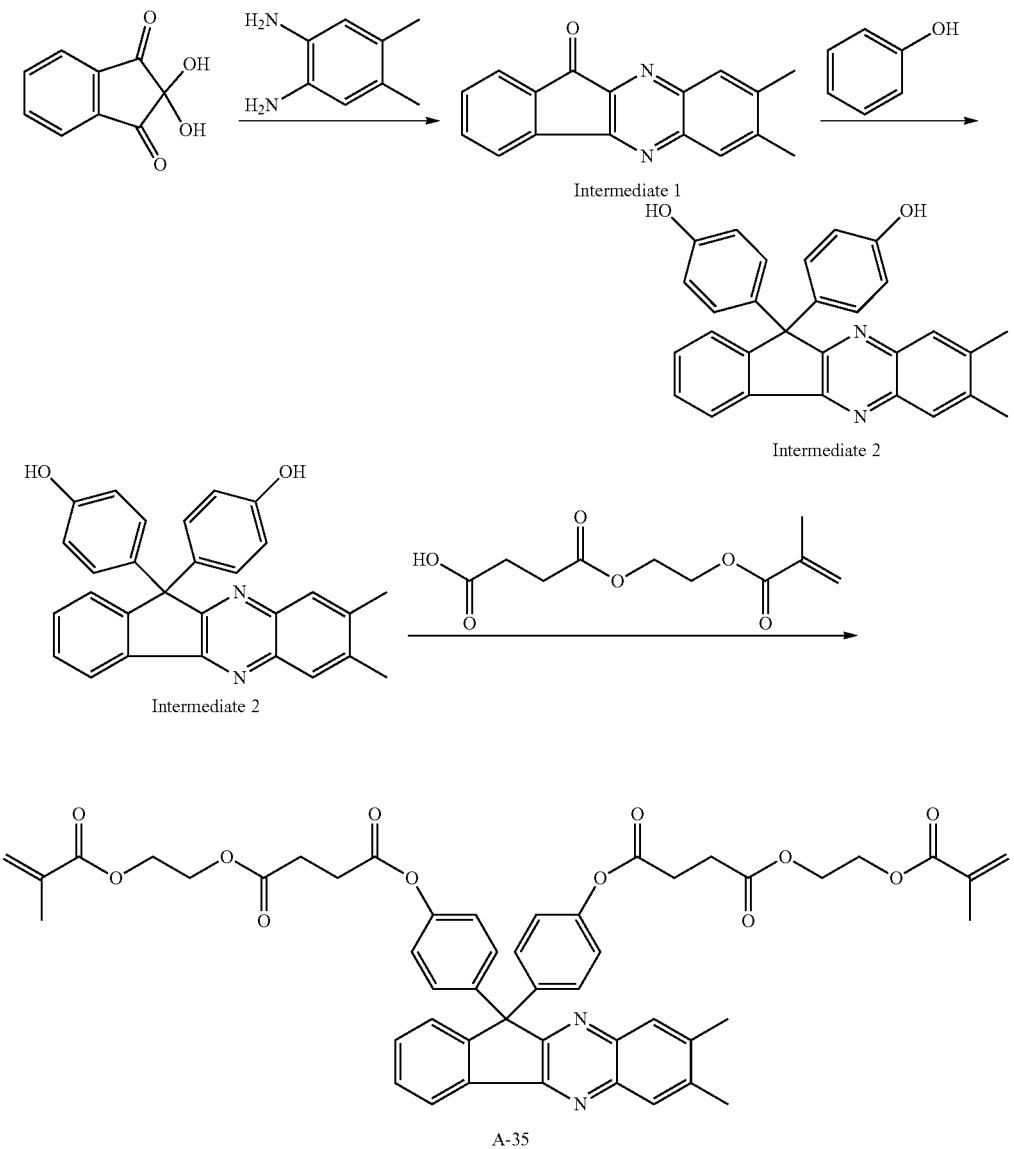

A-35

[Synthesis of Intermediate 1]

50 mL of methanol and 10 mL of acetic acid were added to 25.6 g of 4,5-dimethyl-1,2-phenylenediamine and 35.6 g of ninhydrin, and the mixture was allowed to react at 70° C. for 3 hours. The reaction solution was cooled to room temperature, and the precipitated crystals were collected by filtration, washed with ethanol, and dried, thereby obtaining 41.1 g of an intermediate 1.

$^1$H-NMR (300 MHz, CDCl$_3$): δ2.49 ppm (s, 3H), 2.51 ppm (s, 3H), 7.52-7.58 ppm (T$^1$H), 7.71-7.76 ppm (T$^1$H), 7.85-7.95 ppm (m, 3H), 8.02-8.08 ppm (d, 1H)

[Synthesis of Intermediate 2]

22 g of the intermediate 1 and 32 g of phenol were dissolved in 20 mL of methanesulfonic acid and 20 mL of acetonitrile. 0.3 mL of 3-mercaptopropionic acid was added to the reaction solution while the reaction solution was heated and maintained at 90° C. After the reaction solution was stirred for 3 hours, 200 mL of acetonitrile and 100 mL of water were added thereto, and the reaction solution was stirred in an ice bath for 2 hours. The precipitated crystals were collected by filtration, washed with methanol, and dried, thereby obtaining 26 g of an intermediate 2.

$^1$H-NMR (300 MHz, DMSO-d$_6$): δ2.47 ppm (s, 3H), 2.49 ppm (s, 3H), 6.61-6.67 ppm (d, 4H), 6.95-7.01 ppm (d, 4H), 7.52-7.62 ppm (in, 3H), 7.84 ppm (s, 1H), 7.93 ppm (s, 1H), 8.12-8.14 ppm (d, 1H), 9.40 ppm (bs, 2H)

[Synthesis of Compound (A-35)]

A compound (A-35) was obtained by the same method as described above except that the intermediate 4 was changed to the intermediate 2 and mono(2-acryloyloxyethyl) succinate was changed to mono(2-methacryloyloxyethyl) succinate in the synthesis of the compound (A-1) of Synthesis Example 4.

$^1$H-NMR (300 MHz, DMSO-d$_6$): δ1.80 ppm (s, 6H), 2.47 ppm (s, 3H), 2.49 ppm (s, 3H), 2.62-2.72 ppm (m, 4H), 2.80-2.90 ppm (m, 4H), 4.25-4.35 ppm (m, 8H), 5.58 ppm (s, 2H), 5.97 ppm (s, 2H), 7.00-7.10 ppm (d, 4H), 7.20-7.30 ppm (d, 4H), 7.55-7.70 ppm (m, 3H), 7.84 ppm (s, 1H), 7.93 ppm (s, 1H), 8.16-8.22 ppm (d, 1H)

Example 1: Curable Composition and Cured Substance Thereof (1) Preparation of Curable Composition The respective components were mixed to obtain the composition listed in the table below, and the mixture was uniformly stirred, thereby preparing a curable composition.

(2) Preparation of Photocuring Sample

The prepared curable composition was injected into a circular transparent glass mold (made of borosilicate glass whose surface was subjected to a hydrophobic treatment with dichlorodimethylsilane) having a diameter of 20 mm such that the thickness of the cured substance reached 1 mm. A short wavelength cut filter LU0422 (trade name, manufactured by Asahi Spectra Co., Ltd.) was disposed between a light source and the transparent glass mold using Execure 3000 (trade name, manufactured by HOYA Corporation) as the light source, and the transparent glass mold was irradiated with ultraviolet rays at an irradiation dose of 1000 mJ/cm$^2$ from above in an atmosphere where nitrogen substitution was carried out such that the oxygen concentration was set to 1% or less, thereby preparing a photocuring sample.

[Evaluation 1: Photocuring Sensitivity]

The photocuring sample obtained in the above-described manner was subjected to sensory evaluation in a case of contact with the sample surface (the surface closest to the ultraviolet irradiation device) in the glass mold, and the photocuring sensitivity was evaluated according to the following standards. In the present invention, "B" or higher is acceptable.

—Evaluation Standards—

A: Hard rubber-like (no stickiness)
B: Soft gel-like (sticky)
C: Poor curing (liquid)

(3) Preparation of Cured Substance

A cured substance was prepared by heating the photocuring sample obtained in the above-described manner at 200° C. for 30 minutes in an atmosphere with an oxygen concentration of 1% or less.

The curing reaction was completed by performing the heating step, and all cured substances were obtained as completely cured substances.

[Evaluation 2: Transmittance Before Irradiation Test]

The ultraviolet-visible transmittance of the central portion (diameter of 5 mm) of the obtained cured substance was measured using an ultraviolet-visible spectrophotometer UV-2600 (trade name, manufactured by Shimadzu Corporation), and the transmittance at a wavelength of 430 nm (before the irradiation test) was acquired.

[Evaluation 3: Transmittance after Irradiation Test]

The prepared cured substance was subjected to a xenon light irradiation test under the following conditions. The irradiation test corresponds to a light resistance acceleration test in a sunlight environment.

The transmittance (after the irradiation test) of the cured substance after the xenon light irradiation test at a wavelength of 430 nm was acquired by the method described in the section of "Evaluation 2: transmittance before irradiation test".

(Xenon Light Irradiation Conditions)

Device: xenon accelerated weathering tester Q-SUN Xe-1 (trade name, manufactured by Q-Lab Corporation)
Light source: xenon arc lamp
Optical filter: Extended UV Q/B (trade name, manufactured by Q-Lab Corporation)
Illuminance: 0.43 W/m$^2$ (340 nm illuminance meter)
Black panel temperature: 63° C.
Test time: 8 hours <Measurement of Optical Characteristics>

The "refractive index (nd)", "Abbe number (vd)", and "partial dispersion ratios (θg, F)" were measured using a Kalnew precision refractometer KPR-2000 (manufactured by Shimadzu Device Corporation) after a cured substance was prepared in the same manner as described above except that the curable composition prepared such that the thickness of the cured substance reached 2 mm was injected, and the cured substance was processed into a V-shaped block. The measurement was performed three times for each sample at 25° C., and the measurement result was obtained by calculating the average value thereof.

The "refractive index (nd)" is a refractive index at a wavelength of 587.56 nm. In addition, the "Abbe number (vd)" and the "partial dispersion ratios (θg, F)" are values calculated from the refractive index measurement values at different wavelengths according to the following equations.

$$vd=(nd-1)/(nF-nC)$$

$$\theta g, F=(ng-nF)/(nF-nC)$$

Here, nd represents a refractive index at a wavelength of 587.56 nm, nF represents a refractive index at a wavelength of 486.13 nm, nC represents a refractive index at a wavelength of 656.27 nm, and ng represents a refractive index at a wavelength of 435.83 nm.

All cured substances obtained from the curable compositions No. 101 to 117 had an Abbe number of 26 to 20, which was low, and a partial dispersion ratio of 0.72 to 0.86, which was high, and thus the abnormal dispersibility of the refractive index acquired for a chromatic aberration correction lens was satisfied.

TABLE 1-1

| | Curable composition No. | | 101 | 102 | 103 | 104 | 105 | 106 | 107 | 108 | 109 | 110 |
|---|---|---|---|---|---|---|---|---|---|---|---|---|
| Composition | Component A | A-28 | 70.1 | | | | | | | | | |
| | | VI-2 | | 70.1 | | | | | | | | |
| | | I-1 | | | 70.1 | | | | | | | |
| | | A-1 | | | | 70.1 | | | 70.1 | 70.1 | 70.1 | 70.1 |
| | | A-2 | | | | | 70.1 | | | | | |
| | | A-35 | | | | | | 70.1 | | | | |
| | Component B | Irg819 | 0.1 | 0.1 | 0.1 | 0.1 | 0.1 | 0.1 | 0.1 | | 0.4 | 0.7 |
| | | IrgTPO | | | | | | | | 0.1 | | |
| | Component C | C-3 | 0.2 | 0.2 | 0.2 | 0.2 | 0.2 | 0.2 | 0.2 | 0.2 | 0.2 | 0.2 |
| | | C-6 | | | | | | | | | | |
| | | C-1 | | | | | | | | | | |
| | Component D | D-1 | | | | | | | | | | |
| | | D-5 | | | | | | | | | | |
| | | D-7 | 6 | 6 | 6 | 6 | 6 | 6 | | | | |
| | | D-11 | | | | | | | | | | |
| | Other components | M-2 | 23.5 | 23.5 | 23.5 | 23.5 | 23.5 | 23.5 | 29.5 | 29.5 | 29.2 | 28.9 |
| | Thermal polymerization initiator | Perhexyl D | 0.1 | 0.1 | 0.1 | 0.1 | 0.1 | 0.1 | 0.1 | 0.1 | 0.1 | 0.1 |
| | Comparative photopolymerization initiator | Irg907 | | | | | | | | | | |
| | Ultraviolet absorbing agent | Tinuvin 99-2 | | | | | | | | | | |
| | | Tinuvin 405 | | | | | | | | | | |
| | | Tinuvin 120 | | | | | | | | | | |
| | | Total | 100 | 100 | 100 | 100 | 100 | 100 | 100 | 100 | 100 | 100 |
| Evaluation | | Photocuring sensitivity | A | A | A | A | A | A | A | B | A | A |
| | Transmittance of cured substance at wavelength of 430 nm | Before irradiation test | 83% | 82% | 84% | 85% | 85% | 86% | 84% | 84% | 82% | 80% |
| | | After irradiation test | 73% | 73% | 77% | 82% | 83% | 84% | 74% | 74% | 71% | 68% |
| | | Decrease before and after irradiation test | 10% | 9% | 7% | 3% | 2% | 2% | 10% | 10% | 11% | 12% |

TABLE 1-2

| | Curable composition No. | | 111 | 112 | 113 | 114 | 115 | 116 | 117 |
|---|---|---|---|---|---|---|---|---|---|
| Composition | Component A | A-28 | | | | | | | |
| | | VI-2 | | | | | | | |
| | | I-1 | | | | | | | |
| | | A-1 | 70.1 | 70.1 | 70.1 | 70.1 | 70.1 | 70.1 | 70.1 |
| | | A-2 | | | | | | | |
| | | A-35 | | | | | | | |
| | Component B | Irg819 | 0.1 | 0.1 | 0.1 | 0.1 | 0.1 | 0.1 | 0.1 |
| | | IrgTPO | | | | | | | |
| | Component C | C-3 | | | 0.8 | 1.2 | 0.2 | 0.2 | 0.2 |
| | | C-6 | 0.2 | | | | | | |
| | | C-1 | | 0.2 | | | | | |
| | Component D | D-1 | | | | | 6 | | |
| | | D-5 | | | | | | 6 | |
| | | D-7 | | | | | | | |
| | | D-11 | | | | | | | 6 |
| | Other components | M-2 | 29.5 | 29.5 | 28.9 | 28.5 | 23.5 | 23.5 | 23.5 |
| | Thermal polymerization initiator | Perhexyl D | 0.1 | 0.1 | 0.1 | 0.1 | 0.1 | 0.1 | 0.1 |
| | Comparative photopolymerization initiator | Irg907 | | | | | | | |
| | Ultraviolet absorbing agent | Tinuvin 99-2 | | | | | | | |
| | | Tinuvin 405 | | | | | | | |
| | | Tinuvin 120 | | | | | | | |
| | | Total | 100 | 100 | 100 | 100 | 100 | 100 | 100 |
| Evaluation | | Photocuring sensitivity | A | A | A | A | A | A | A |
| | Transmittance of cured substance at wavelength of 430 nm | Before irradiation test | 83% | 80% | 84% | 84% | 84% | 85% | 85% |
| | | After irradiation test | 71% | 68% | 73% | 70% | 78% | 77% | 82% |
| | | Decrease before and after irradiation test | 12% | 12% | 11% | 14% | 6% | 8% | 3% |

TABLE 1-3

| Curable composition No. | | c01 | r01 | c02 | c03 | c04 |
|---|---|---|---|---|---|---|
| Composition | Component A | A-28 | | | | | |
| | | VI-2 | | | | | |
| | | I-1 | | | | | |
| | | A-1 | 70.1 | 70.1 | 70.1 | 70.1 | 70.1 |
| | | A-2 | | | | | |
| | | A-35 | | | | | |
| | Component B | Irg819 | 0.1 | | 0.1 | 0.1 | 0.1 |
| | | IrgTPO | | | | | |
| | Component C | C-3 | | | | | |
| | | C-6 | | | | | |
| | | C-1 | | | | | |
| | Component D | D-1 | | | | | |
| | | D-5 | | | | | |
| | | D-7 | | | | | |
| | | D-11 | | | | | |
| | Other components | M-2 | 29.7 | 29.7 | 29.5 | 29.5 | 29.5 |
| | Thermal polymerization initiator | Perhexyl D | 0.1 | 0.1 | 0.1 | 0.1 | 0.1 |
| | Comparative photopolymerization initiator | Irg907 | | 0.1 | | | |
| | Ultraviolet absorbing agent | Tinuvin 99-2 | | | 0.2 | | |
| | | Tinuvin 405 | | | | 0.2 | |
| | | Tinuvin 120 | | | | | 0.2 |
| | Total | | 100 | 100 | 100 | 100 | 100 |
| Evaluation | Photocuring sensitivity | | A | C | A | A | A |
| | Transmittance of cured substance at wavelength of 430 nm | Before irradiation test | 83% | 80% | 83% | 82% | 82% |
| | | After irradiation test | 51% | 70% | 54% | 51% | 50% |
| | | Decrease before and after irradiation test | 32% | 10% | 29% | 31% | 32% |

<Notes in Tables>
Each component in the tables is as follows. The blending amount ratio of each component is on a mass basis.
(Component A)

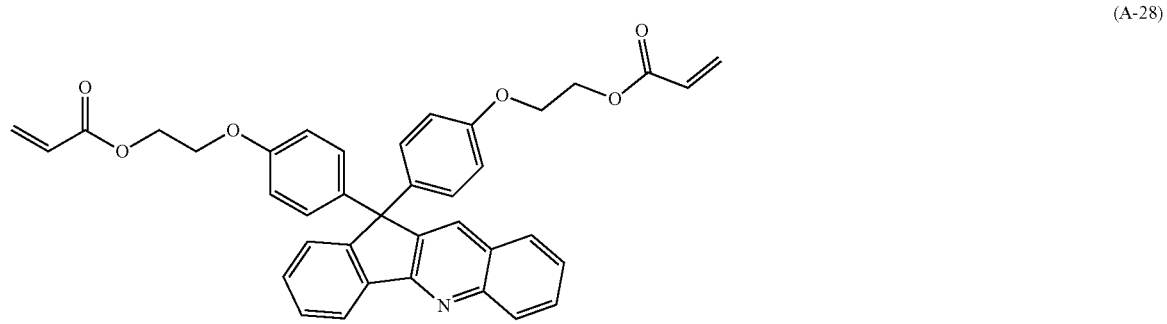

(A-28)

(VI-2)

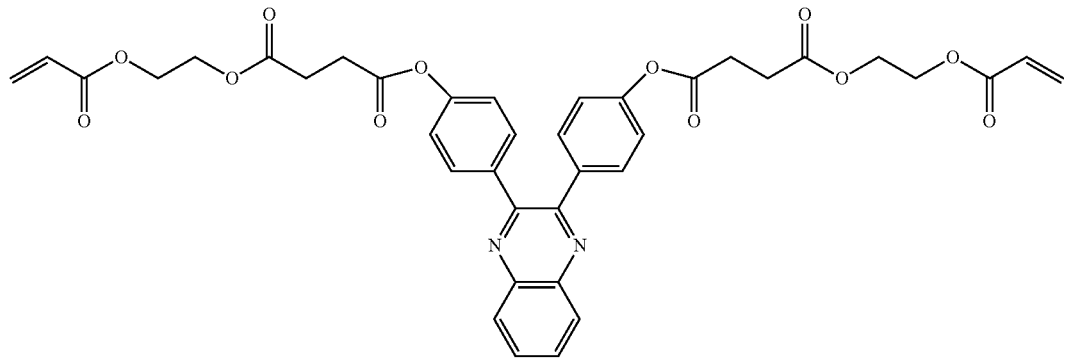
(I-1)
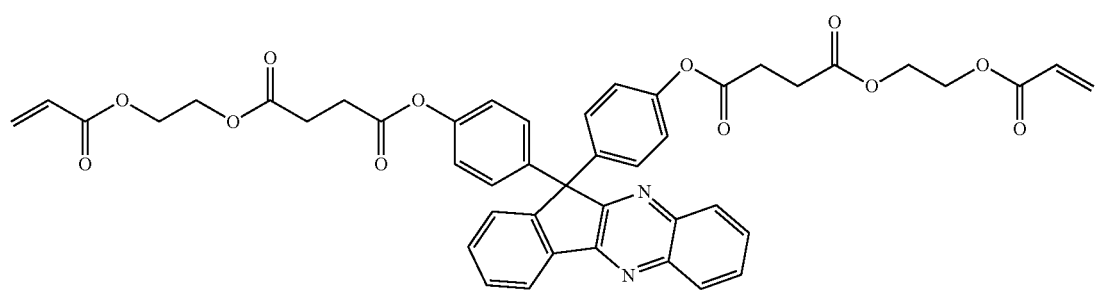
(A-1)
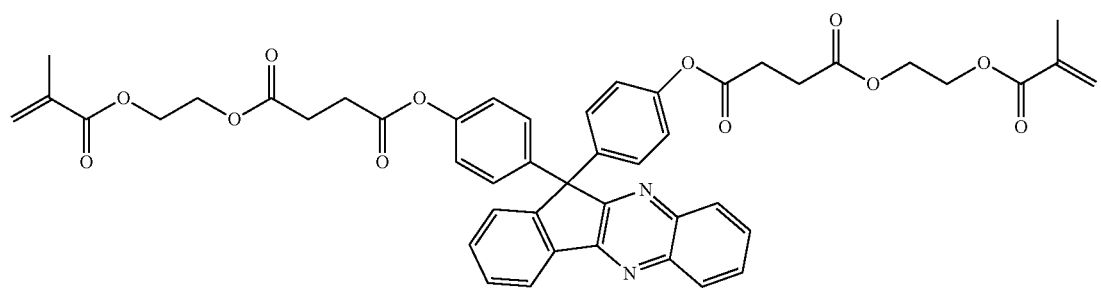
(A-2)
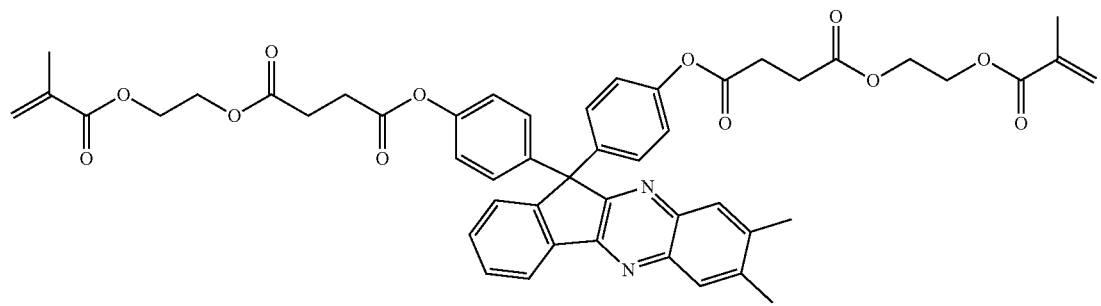
(A-35)

(Component B)

Irg819: Irgacure 819 (trade name, manufactured by BASF SE)

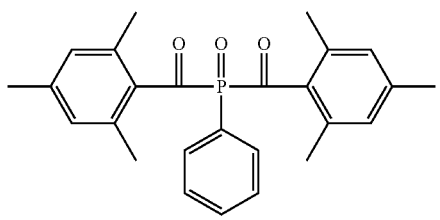
Irg819

IrgTPO: Irgacure TPO (trade name, manufactured by BASF SE)

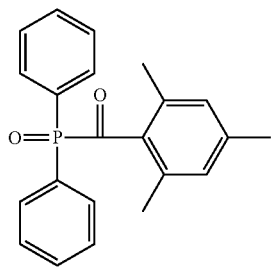
IrgTPO (Component C)

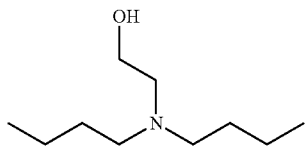
(C-3)

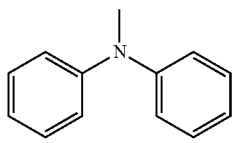
(C-6)

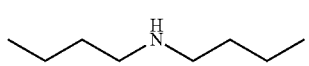
(C-1)

(Component D)

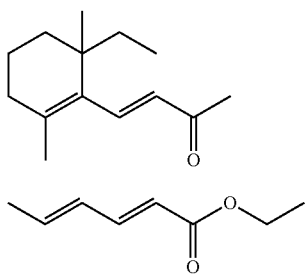
(D-1)

(D-5)

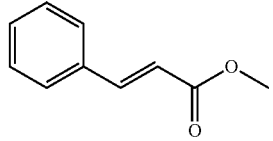
(D-7)

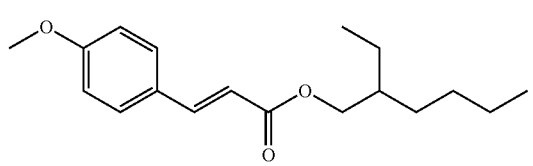
(D-11)

(Other Components)

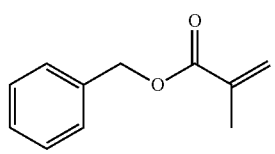
(M-2)

(Thermal Polymerization Initiator)

Perhexyl D: trade name, manufactured by NOF Corporation, di-tert-hexyl peroxide (Comparative Photopolymerization Initiator)

Irg907: Irgacure 907 (trade name, manufactured by BASF SE)

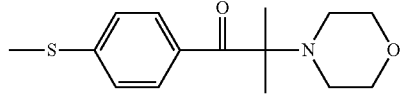
Irg907

(Ultraviolet Absorbing Agent)

Tinuvin 99-2: trade name, manufactured by BASF SE
Tinuvin 405: trade name, manufactured by BASF SE
Tinuvin 120: trade name, manufactured by BASF SE

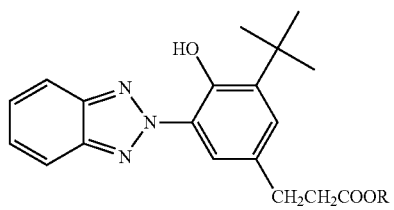
Tinuvin 99-2    R = $C_7H_{15}$ ~ $C_9H_{19}$

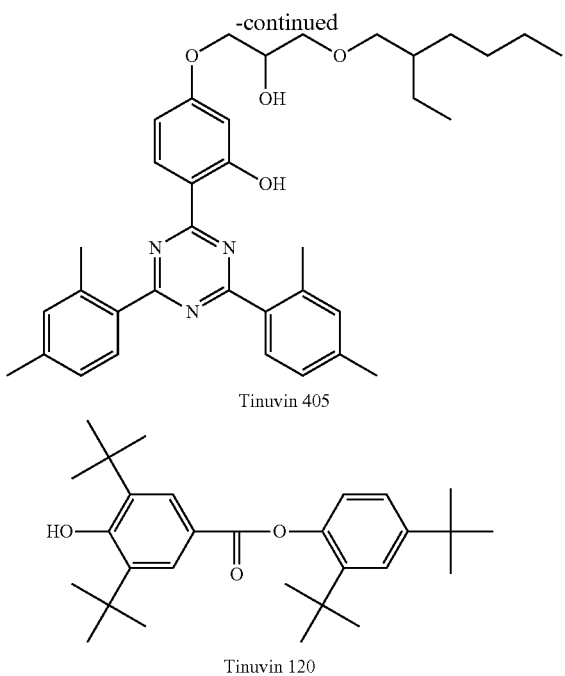

Tinuvin 405

Tinuvin 120

The following results were found based on the results listed in Table 1.

The comparative curable composition No. c01 is not the curable composition specified in the present invention in terms that the comparative curable composition does not contain an amine compound as the component C. It was found that the cured substance obtained from the comparative curable composition No. c01 had an excellent transmittance before the light irradiation test, but the transmittance was decreased by the light irradiation test. In addition, the comparative curable compositions Nos. c02 to c04 are not the curable compositions specified in the present invention in terms that a compound known as a light stabilizer is used in place of the amine compound as the component C. It was found that the cured substances obtained from the comparative curable compositions Nos. c02 to c04 did not show a difference in transmittance before and after the light irradiation test as compared with the cured substance obtained from the comparative curable composition No. c01 and the effect of suppressing a decrease in transmittance due to light irradiation was not obtained.

In addition, the curable composition No. r01 of the reference example contains a photopolymerization initiator different from the acylphosphine oxide photopolymerization initiator. The cured substance obtained from the curable composition No. r01 of the reference example showed a smaller decrease in transmittance due to the light irradiation test than that of the cured substance obtained from the comparative curable composition No. c01. Based on the comparison, it was found that a problem of a decrease in transmittance due to light irradiation occurred because of the combination of the polymerizable compound represented by General Formula (A) as the component A and the acylphosphine oxide photopolymerization initiator as the component B. In addition, the curable composition No. r01 of the reference example was inferior in the first place in terms of photocuring sensitivity. It is not preferable that the photocuring sensitivity is inferior from the viewpoints of insufficient mold transferability and mixture of air bubbles in a case of using the composition for preparation of a compound lens.

On the contrary, in all the cured substances obtained from the curable compositions No. 101 to 117 of the present invention, the transmittance of each cured substance before the light irradiation test was excellent, and even the transmittance thereof after the light irradiation test was also excellent, and thus it was found that the decrease in the transmittance was able to be suppressed.

As described above, since the cured substance obtained from the curable composition of the present invention has excellent light resistance, even in a case where the optical member and the lens which contain the cured substance as the constituent member are used in a light irradiation environment such as outdoors for a long period of time, coloring can be suppressed. Moreover, the curable composition of the present invention also has excellent photocuring sensitivity and thus can be suitably used for preparation of a compound lens Example 2: Preparation of Compound Lens L-1

A compound lens was prepared as follows with reference to the description of WO. 2017/115649A.

200 mg of the curable composition No. 104 was injected to a molding mold whose surface had been subjected to a chromium nitride treatment, the surface was coated with a transparent glass lens to cover the entire surface on a side where the curable composition was not in contact with the molding mold (glass material=BK7, convex lens with diameter: 33 mm, center thickness: 3 mm, radius of curvature of surface in contact with curable composition: 44.3 mm, and radius of curvature of surface not in contact with curable composition: 330.9 mm), and the glass lens was pressed and stretched such that the diameter of the curable composition reached 30 mm. After the glass lens entered this state, the glass lens was irradiated with ultraviolet rays at an irradiation dose of 300 m/cm$^2$ from above using Execure 3000 (manufactured by HOYA Corporation) as a light source. Here, a short wavelength cut filter LU0422 (manufactured by Asahi Spectra Co., Ltd.) was disposed between the light source and the glass lens.

Next, the curable composition was heated to 200° C. in a maintained state where the composition was sandwiched between the molding mold and the glass lens while a pressure of 0.196 MPa (2 kgf/cm$^2$) was applied to the composition. Thereafter, a compound lens L-1 was prepared by separating the cured substance of the curable composition and the molding mold at a speed of 0.05 mm/sec.

[Evaluation 4: Evaluation of Light Resistance of Compound Lens L-1]

Similar to Example 1, the ultraviolet-visible transmittance of the central portion (diameter of 5 mm) of the obtained lens L-1 was measured, and the transmittance at a wavelength of 430 nm was 84%. Further, the xenon light irradiation test was performed under the same conditions as in Example 1, and the transmittance at a wavelength of 430 nm was 82%. This means that the compound lens prepared by using the curable composition No. 104 of the present invention had excellent light resistance, which was comparable to the light resistance of the circular cured substance prepared by using the curable composition No. 104 of the present invention. Further, it was found that each compound lens prepared by using the curable compositions Nos. 101 to 103 and 105 to 117 had excellent light resistance, which was comparable to the light resistance of the circular cured substance prepared by using the corresponding curable composition in Example 1.

As described above, the compound lens prepared by using the curable composition of the present invention has excellent light resistance, which is comparable to the light resistance of the cured substance prepared by using the curable composition of the present invention.

The present invention has been described based on the embodiments, but the invention is not intended to be limited in any detail of the description unless otherwise specified and should be broadly interpreted without departing from the spirit of the invention shown in the appended claims.

What is claimed is:

1. A curable composition comprising:

a component A which is a polymerizable compound represented by General Formula (A);

a component B which is an acylphosphine oxide photopolymerization initiator; and a component C which is an amine compound, Ar—(-L-Sp-Pol)$_n$        Genera Formula (A)

in the formula, Ar represents an n-valent group containing a nitrogen-containing fused aromatic ring satisfying all items (i) to (iii), as a partial structure, (i) the nitrogen-containing fused aromatic ring has a fused ring structure in which two or more 6-membered rings are fused, (ii) the nitrogen-containing fused aromatic ring has at least one nitrogen atom as a ring-constituting atom, and (iii) all ring-constituting atoms have p-orbitals, and all the p-orbitals contribute to aromaticity, L represents a single bond, —O—, —S—, —C(=O)—, —OC(=O)—, —C(=O)O—, —OC(=O)O—, —NR$^{101}$C(=O)—, —C(=O)NR$^{102}$—, —OC(=O)NR$^{103}$—, —NR$^{104}$C(=O)O—, —SC(=O)—, or —C(=O)S—, R$^{101}$, R$^{102}$, R$^{103}$, and R$^{104}$ each independently represent -Sp$^a$-Pol$^3$ or a halogen atom, Sp and Sp$^a$ each independently represent a single bond or a divalent linking group, and Pol and Pol$^3$ each independently represent a hydrogen atom or a polymerizable group, n represents 1 or 2, and in a case where n represents 2, a plurality of Ls may be the same as or different from each other, a plurality of Sp's may be the same as or different from each other, and a plurality of Pol's may be the same as or different from each other, where the polymerizable compound represented by General Formula (A) contains at least one polymerizable group.

2. The curable composition according to claim 1, wherein the number of nitrogen atoms in the item (ii) is 2 or 3.

3. The curable composition according to claim 1 wherein Ar represents a group represented by any of General Formulae (A1) and (A2-1) to (A2-5),

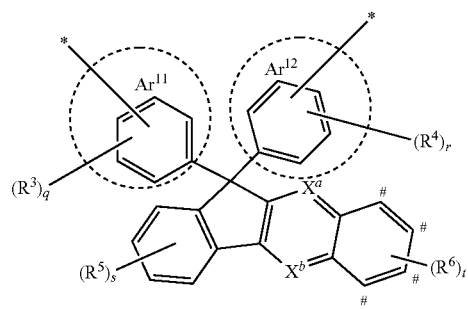

Formula (A1)

in the formula, Ar$^{11}$ and Ar$^{12}$ each independently represent an aromatic hydrocarbon group having a benzene ring surrounded by a broken line or an aromatic heterocyclic group having a benzene ring surrounded by a broken line as one ring constituting a fused ring, X$^a$ and X$^b$ represent a nitrogen atom or CH, and CH at a position of # may be substituted with a nitrogen atom, where two or three of CH's at positions of X$^a$, X$^b$, and # are nitrogen atoms, R$^3$ to R$^6$ each independently represent a substituent, and q, r, s, and t each independently represent an integer of 0 to 4, and

* represents a bonding position with respect to Pol-Sp-L-,

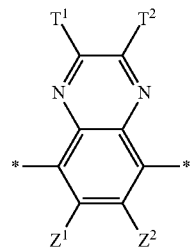

Formula (A2-1)

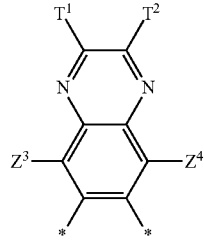

Formula (A2-2)

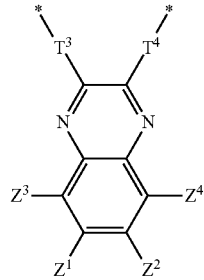

Formula (A2-3)

Formula (A2-4)

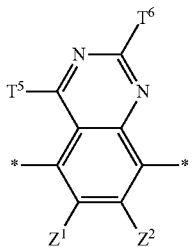

Formula (A2-5)

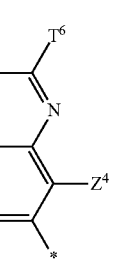

in the formulae, $Z^1$, $Z^2$, $Z^3$, and $Z^4$ each independently represent a hydrogen atom, an aliphatic hydrocarbon group having 1 to 20 carbon atoms which may have a substituent, an alkoxy group having 1 to 20 carbon atoms which may have a substituent, an alkoxycarbonyl group having 1 to 20 carbon atoms which may have a substituent, an alicyclic hydrocarbon group having 3 to 20 carbon atoms which may have a substituent, an aromatic hydrocarbon group having 6 to 20 carbon atoms which may have a substituent, a halogen atom, a cyano group, a nitro group, —$NR^{12}R^{13}$, —$SR^{12}$, or an aromatic heterocyclic group having 5 to 20 ring-constituting atoms which may have a substituent, $Z^1$ and $Z^2$ may be bonded to each other to form an aromatic hydrocarbon ring which may have a substituent or an aromatic heterocyclic ring which may have a substituent, $R^{12}$ and $R^{13}$ each independently represent a hydrogen atom or an alkyl group having 1 to 6 carbon atoms which may have a substituent, $T^1$, $T^2$, $T^5$, and $T^6$ each independently represent a halogen atom, a cyano group, a nitro group, -$L^6$-$Sp^b$-$Pol^6$, an alicyclic hydrocarbon group having 3 to 20 carbon atoms which may have a substituent, an aromatic hydrocarbon group having 6 to 20 carbon atoms which may have a substituent, an aromatic heterocyclic group having 5 to 20 ring-constituting atoms which may have a substituent, —$NR^{12}R^{13}$, or —$SR^{12}$, $T^1$ and $T^2$ may be bonded to each other to form an aromatic hydrocarbon ring which may have a substituent or an aromatic heterocyclic ring which may have a substituent, $L^6$ has the same definition as that for L, $Sp^b$ represents a single bond, a linear alkylene group having 1 to 30 carbon atoms which may have a substituent, or a linear alkylene group having 2 to 30 carbon atoms which may have a substituent and in which one or two or more non-adjacent —$CH_2$—'s are each independently substituted with a group selected from —O—, —S—, —C(=O)—, —OC(=O)—, —C(=O)O—, —OC(=O)O—, —$NR^{201}$C(=O)—, —C(=O)$NR^{202}$—, —OC(=O)$NR^{203}$—, —$NR^{204}$C(=O)O—, —SC(=O)—, and —C(=O)S—, $R^{201}$, $R^{202}$, $R^{203}$, and $R^{04}$ each independently represent -$Sp^c$-$Pol^4$ or a halogen atom, $Sp^c$ represents a single bond, a linear alkylene group having 1 to 30 carbon atoms which may have a substituent, or a linear alkylene group having 2 to 30 carbon atoms which may have a substituent and in which one or two or more non-adjacent —$CH_2$—'s are each independently substituted with a group selected from —O—, —S—, —C(=O)—, —OC(=O)—, —C(=O)O—, —OC(=O)O—, —NHC(=O)—, —C(=O)NH—, —OC(=O)NH—, —NHC(=O)O—, —SC(=O)—, and —C(=O)S—, $Pol^4$ and $Pol^6$ each independently have the same definition as that for Pol, $T^3$ and $T^4$ each independently represent a divalent aromatic hydrocarbon group having 6 to 12 carbon atoms which may have a substituent or a divalent aromatic heterocyclic group which may have a substituent, and

* represents a bonding position with respect to Pol-Sp-L-.

4. The curable composition according to claim 3, wherein Ar represents a group represented by General Formula (A1), both $X^a$ and $X^b$ represent a nitrogen atom, and no CH's at positions of # are substituted with a nitrogen atom.

5. The curable composition according to claim 1, further comprising:
a component D which is a compound represented by General Formula (D),

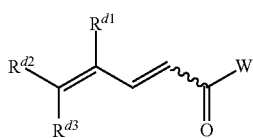

General Formula (D)

in the formula, $R^{d1}$, $R^{d2}$, and $R^{d3}$ each independently represent a hydrogen atom or a substituent, and W represents a hydrogen atom or a substituent, and $R^{d1}$ and $R^{d2}$ or $R^{d2}$ and $R^{d3}$ may be bonded to each other to form a ring which may have a substituent.

6. A cured substance of the curable composition according to claim 1.

7. An optical member comprising:
the cured substance according to claim 6.

8. A lens comprising:
the cured substance according to claim 6.

* * * * *